(12) United States Patent
Dillon

(10) Patent No.: US 7,412,455 B2
(45) Date of Patent: Aug. 12, 2008

(54) SOFTWARE FRAMEWORK THAT FACILITATES DESIGN AND IMPLEMENTATION OF DATABASE APPLICATIONS

(76) Inventor: David M. Dillon, 21923 E. Ontario Drive, No. 1521, Aurora, CO (US) 80016

( * ) Notice: Subject to any disclaimer, the term of this patent is extended or adjusted under 35 U.S.C. 154(b) by 440 days.

(21) Appl. No.: 10/836,580

(22) Filed: Apr. 30, 2004

(65) Prior Publication Data

US 2004/0220956 A1 Nov. 4, 2004

Related U.S. Application Data

(60) Provisional application No. 60/466,939, filed on Apr. 30, 2003.

(51) Int. Cl.
*G06F 17/30* (2006.01)
(52) U.S. Cl. .................. 707/102; 707/100; 707/101
(58) Field of Classification Search ............... 707/2, 707/102
See application file for complete search history.

(56) References Cited

U.S. PATENT DOCUMENTS

| | | | |
|---|---|---|---|
| 5,291,583 A | 3/1994 | Bapat | |
| 5,297,279 A | 3/1994 | Bannon et al. | |
| 5,426,780 A | 6/1995 | Gerull et al. | |
| 5,437,027 A | 7/1995 | Bannon et al. | |
| 5,615,367 A | 3/1997 | Bennett et al. | |
| 5,729,739 A | 3/1998 | Cantin et al. | |
| 5,966,707 A | 10/1999 | Van Huben et al. | |
| 6,061,515 A | 5/2000 | Chang et al. | |
| 6,101,502 A | 8/2000 | Heubner et al. | |
| 6,134,559 A | 10/2000 | Brumme et al. | |
| 6,163,776 A | 12/2000 | Periwal | |
| 6,169,993 B1 | 1/2001 | Shutt et al. | |
| 6,269,373 B1 | 7/2001 | Apte et al. | |
| 6,330,006 B1 | 12/2001 | Goodisman | |
| 6,418,451 B1 | 7/2002 | Maimone | |
| 6,505,211 B1 | 1/2003 | Dessloch et al. | |
| 6,505,228 B1 | 1/2003 | Schoening et al. | |
| 6,631,519 B1 | 10/2003 | Nicholson et al. | |
| 6,754,670 B1 | 6/2004 | Lindsay et al. | |
| 6,999,956 B2 * | 2/2006 | Mullins ....................... 707/2 |
| 7,020,641 B2 | 3/2006 | Leong et al. | |
| 7,058,939 B2 * | 6/2006 | Berg et al. ............... 717/165 |
| 7,080,084 B2 | 7/2006 | Yoshimura et al. | |
| 7,136,872 B2 | 11/2006 | Krishnamurthy et al. | |
| 7,177,878 B2 | 2/2007 | Wason | |
| 2002/0120603 A1 | 8/2002 | Thompson | |
| 2003/0030672 A1 * | 2/2003 | Hughes et al. ............. 345/765 |
| 2003/0055826 A1 | 3/2003 | Graham | |
| 2003/0163460 A1 | 8/2003 | Shinn et al. | |
| 2003/0208505 A1 | 11/2003 | Mullins et al. | |

* cited by examiner

*Primary Examiner*—Don Wong
*Assistant Examiner*—Sheree N Brown
(74) *Attorney, Agent, or Firm*—Hamilton, DeSanctis & Cha, LLP

(57) ABSTRACT

An intelligent framework is provided that is disposed between a high-level language environment and a database system environment. According to one embodiment, the framework programmatically receives information regarding definitions of data structures of objects participating in a software application and information regarding relationships among the objects. Based upon the particular request from the high-level language environment and upon the definitions and relationships, the framework programmatically and dynamically generates appropriate statements associated with the database system environment that accomplish the request. For example, the framework may issue statements to define the structure of a database, access information from the database, and/or manipulate information within the database.

45 Claims, 31 Drawing Sheets

SOFTWARE FRAMEWORK THAT FACILITATES DESIGN AND IMPLEMENTATION OF DATABASE APPLICATIONS

This application claims the benefit of Provisional Application No. 60/466,939, filed Apr. 30, 2003, which is hereby incorporated by reference in its entirety.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND

1. Field of Invention

Embodiments of the present invention generally relate to design and implementation of database applications. More particularly, embodiments of the present invention relate to methods and techniques of programmatically managing the creation of database structure, populating the database structure, and accessing and/or manipulating data stored in a database.

2. Description of the Related Art

Development of database applications currently involves two distinct skill sets typically requiring the involvement of both database engineers and software engineers. An example of current database modeling activities may include the following: (1) One or more database engineers capture the requirements of the database application in an entity relationship diagram (ERD); (2) manually or with the assistance of a database tool, such as Oracle9i Designer of Oracle Corporation, the database engineer(s) create an appropriate database schema to support the relationships presented by the ERD; (3) the database engineer(s) convey the requirements of the database application to one or more software engineers; (4) the software engineer(s) capture the requirements in an appropriate form, such as uniform modeling language (UML) diagrams, for development of needed data structures, e.g., class definitions; and (5) the software engineer(s) create the data structures. Other tasks, such as provisioning and providing for access and manipulation of the database typically require similar interactions among the database engineers and the software engineers.

As can be appreciated, a software development team composed of both database engineers and software engineers implementing the above database modeling process is costly both in terms of communication overhead and payroll. Consequently, a need exists to reduce the complexity of and/or automate database design and development tasks thereby allowing application developers with limited or no database skills to efficiently and effectively perform such tasks.

BRIEF DESCRIPTION OF THE SEVERAL VIEWS OF THE DRAWINGS

Embodiments of the present invention are illustrated by way of example, and not by way of limitation, in the figures of the accompanying drawings and in which like reference numerals refer to similar elements and in which.

SUMMARY

Figure 1:
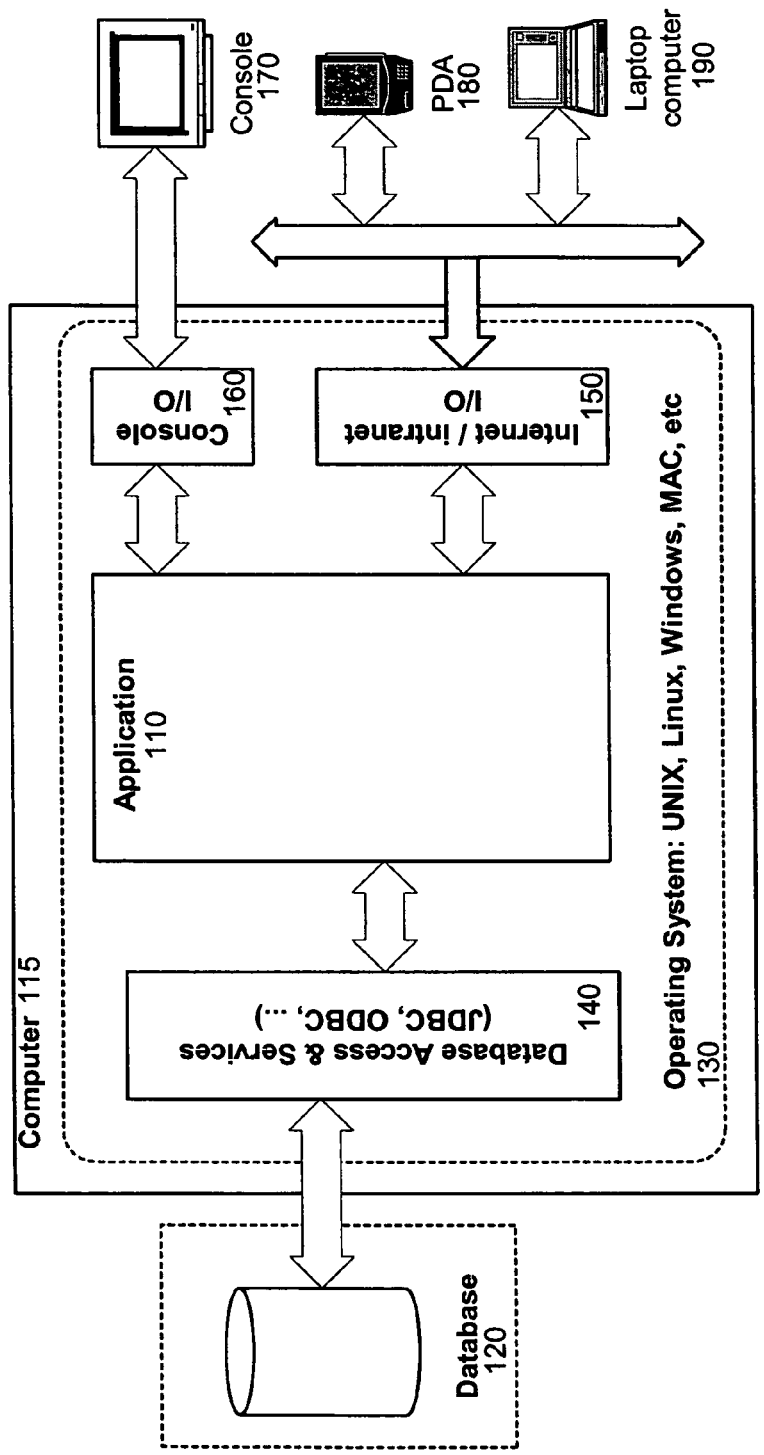
FIG. 1 is a block diagram that illustrates a typical architecture that may be used in many database applications and in connection with one or more embodiments of the present invention.

Apparatus and methods are described for providing a software framework that facilitates efficient design and implementation of database applications. According to one embodiment, a software framework creates a structure of a data store within a storage system by programmatically receiving information regarding definitions of data structures of objects participating in a software application and information regarding relationships among the data structures. Based upon the information regarding definitions and the information regarding relationships, the framework programmatically and dynamically generates appropriate statements associated with the database system environment that define the structure of a database. The framework then creates the structure of the database by issuing the statements.

According to one embodiment, a method is provided for the framework to accesses the data store by programmatically receiving information regarding definitions of data structures associated with objects participating in a software application and information regarding relationships among the data structures. In response to receipt of a request to read an object from the data store, the framework programmatically and dynamically generates one or more statements based at least in part upon the object's relationship with other objects. Then, the framework queries the data store by issuing to the storage system the one or more statements.

According to one embodiment, a method is provided for the framework to manipulate the data store by programmatically receiving information regarding definitions of data structures associated with objects participating in a software application and information regarding relationships among the data structures. In response to receipt of a request to manipulate an object, the framework programmatically and dynamically generates one or more statements based at least in part upon the object's relationship with one or more other objects. Then, the framework manipulates the data store by issuing to the storage system the one or more statements.

Other features of embodiments of the present invention will be apparent from the accompanying drawings and from the detailed description that follows.

DETAILED DESCRIPTION

Apparatus and methods are described for providing a software framework that facilitates efficient design and implementation of database applications. Broadly stated, embodiments of the present invention seek to automate the tasks of defining the structure, accessing and manipulating a database by abstracting the underlying syntax and semantics of the particular database system being employed. According to one embodiment, such abstraction is accomplished by providing an interface layer, referred to below as "Lentils," between a high-level programming language environment and the database environment provided by the particular database vendor. For example, a Lentils application programming interface (API) may be provided that programmatically and dynamically generates appropriate data definition, data query, and/or data manipulation expressions, which according to one embodiment may be one or more statements from a data definition language, data query language and/or data manipulation language associated with a database storage system, responsive to receipt of information concerning a desired operation and appropriate data structure definitions.

According to one embodiment, the Lentils API reduces or eliminates the need for the software developer that is coding in the high-level programming language environment to understand SQL. For example, storable objects may be read from a database by the software developer creating an instance of a specific type of storable object, called the pattern storable, optionally associating data values with primitive attributes, optionally creating and preparing a DBFilter, and making the appropriate API call including the pattern storable and optionally the DBFilter. Within the API call, appropriate DQEs are prepared based upon the state of the pattern storable and optional DBFilter, thus abstracting the complexities of direct interfaces with the underlying storage system.

In the following description, for the purposes of explanation, numerous specific details are set forth in order to provide a thorough understanding. It will be apparent, however, to one skilled in the art that the embodiments of the present invention may be practiced without some of these specific details. In other instances, well-known structures and devices are shown in block diagram form.

Embodiments of the present invention include various steps, which will be described below. Such steps may be performed by hardware components or may be embodied in machine-executable instructions, which may be used to cause a general-purpose or special-purpose processor programmed with the instructions to perform the steps. Alternatively, the steps may be performed by a combination of hardware and software or firmware.

Embodiments of the present invention may be provided as a computer program product which may include a machine-readable medium having stored thereon instructions which may be used to program a computer (or other electronic devices) to perform a process according to the methods and techniques described herein. The machine-readable medium may include, but is not limited to, floppy diskettes, optical disks, CD-ROMs, and magneto-optical disks, ROMs, RAMs, EPROMs, EEPROMs, magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

While, for convenience, embodiments of the present invention are described with reference to a relational database and Java™, the present invention is equally applicable to various other databases and high-level programming languages. For example, the teachings herein are useful in connection with design and development of database applications involving object oriented databases, extensible markup language (XML) databases and the like. Similarly, various other high-level languages may be employed to interface with Lentils, such as current or future versions of C, C++, C# and the like. While the implementation specifics may vary, conceptually, the embodiments described herein would function in the same manner. While an intermediate layer interposed between a high-level language and a database management system is a likely choice for implementation of embodiments of the present invention, it is also contemplated that the mechanisms described herein could be incorporated into semantics of a high-level language or incorporated into the database management system itself Terminology Brief definitions of terms, abbreviations, and phrases used throughout this application are given below.

Each table has a set of "ascendant tables", which is a collection of table objects having an order corresponding to the levels of inheritance of the storable class to which the owning table is associated with. The first table in the set corresponds to the most significant super-table.

The term "COMMITTED" generally refers to a state of a storable object that has been saved at least once before to the database.

The term "COMMITTING" generally refers to a state of a storable with respect to the database when the storable is undergoing transition. According to one embodiment, if the full save cycle is successful, the state of the storable will roll forward to COMMITTED.

The terms "connected" or "coupled" and related terms are used in an operational sense and are not necessarily limited to a direct physical connection or coupling.

The phrase "database application" generally refers to a software program that makes use of a database to store, access and/or manipulate information.

The phrase "data definition expression" or "DDE" generally refers to one or more language statements, such as data definition language (DDL) statements, that define structure or schema of a storage system.

The phrase "data manipulation expression" or "DME" generally refers to one or more language statements, such as data manipulation language (DML) statements, that are used to cause changes to a database. Exemplary DML statements include, but are not limited to, INSERT, UPDATE and DELETE.

The phrase "data query expression" or "DQE" generally refers to one or more language statements, such as data query language (DQL) statements that are used to extract information from a database.

According to one embodiment, a "dependent table" is any table whose associated storable class contains a dependent relational attribute, which includes, but is not limited to, parent and ForeignParent attributes.

Each table has a set of "descendant tables", which is a collection of table objects having an order corresponding to the levels of inheritance of the storable to which the owning table is associated with. The last table in the set corresponds to the most significant super-table.

The term "DELETED" generally refers to a state of a storable with respect to the database when a full delete cycle has been completed on the storable.

The term "DELETING" generally refers to a state of a storable with respect to the database when the storable is undergoing transition. According to one embodiment, if the full delete cycle is successful, the state of the storable will roll forward to DELETED.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

If the specification states a component or feature "may", "can", "could", or "might" be included or have a characteristic, that particular component or feature is not required to be included or have the characteristic.

An "object template" generally refers to an instance of a specific type of object of the class desired to be retrieved from a storage system and having a state (e.g., one or more data values) that are used to extract matching objects from the storage system. An example of an object template is a pattern storable.

According to one embodiment, an "orphan table" is used to create a sub-query that identifies super-records that are to be deleted. When a storable is deleted, the records that are deleted are based on the data values associated with a storable's attributes, and the class ID. When the records from a sub-table are deleted, there is no longer any information that might be necessary to identify which super-records should be deleted. According to one embodiment, a WHERE NOT IN clause is included in the Primary Key Specification (PKS), that identifies all still existing sub-records, and is then used in a NOT IN clause that identifies all the super-records that are orphaned. This technique depends on the inclusion of a clause that binds the CLASS column to the class ID value of the storable that is being deleted.

A "Primary Key Specification" or "PKS" generally refers to a SELECT sub-query, which when executed returns a set of rows from a table containing only primary key data. According to one embodiment, the structure of the PKS is as follows: SELECT primary keys FROM tables WHERE matching record specification. If current table corresponds to a storable that extends some storable, the PKS will include conditions where the primary columns of a sub-table equal the primary columns of the super-table. If the storable contains data values that are associated with primitive attributes via columns associated with the current table and super-tables, the PKS will include conditions where the columns must equal the data values in storable that are associated with the columns. If the orphan table is defined, the PKS will include conditions where the primary columns from the super-table are not in a list of existing records in the orphan table, which is otherwise referred to as a sub-table with respect to the previous iteration of the descendant tables. If the nested WHERE IN clause is defined, it is included as an additional clause in the PKS.

The term "programmatically" generally refers to an automated process the steps of which are executed by one or more computer programs.

The term "responsive" includes completely or partially responsive.

The phrase "storage system" generally refers to a data repository for persisting data. According to various embodiments of the present invention a storage system may be a relational database system (RDBS), an extensible Markup Language (XML) database, an object-oriented database or the like.

The term "TRANSIENT" generally refers to a state of a storable object that has never been saved to the database.

Overview

A software framework that intelligently and efficiently connects software applications to a database system is proposed. This intelligent connection simplifies some of the regular tasks that are commonly associated with designing and implementing database applications, such as database modeling, provisioning, and providing for access and manipulation. These functions are artfully abstracted within Lentils to reduce the skill level required to develop database applications and allow potential reduction in headcount required to staff such development efforts.

The Application

FIG. 1 is a block diagram that illustrates a typical architecture 100 that may be used in many database applications and in connection with one or more embodiments of the present invention. In the present example, the architecture 100 includes a database 120, a computer 115, a console 170, a personal digital assistant (PDA) 180 and a laptop computer 190.

On the computer 115 runs an operating system 130, such as UNIX, Linux, Windows, etc. An application 110, such as a database application or software application that relies upon a database to perform its tasks, runs within the operating system 130 and the operating system 130 supports a set of database access and services 140, such as a Java Database Connectivity (JDBC) API, an Open DataBase Connectivity (ODBC) database API, etc., which allows the application 110 to create, access, and manipulate data within the database 120 and otherwise interact with the database 120. A console input/output (I/O) interface 160 and an Internet/intranet I/O interface 150 faclitate interactions among the application and the console 170, PDA 180, and laptop computer 190.

Depending upon the particular implementation, the application 110 may be simple, like an address book, or complex, for example, an order entry application that automatically generates factory orders, downloads instructions to machines and schedules production.

As explained above, the application 110 runs on the operating system 130, which in turn runs on the computer 115. The application 110 may interact with users using some form of input/output (I/O) through the console terminal 170, connected directly to the computer 115, or through other devices connected to a network such as the Internet, a local intranet, or both.

Figure 2:
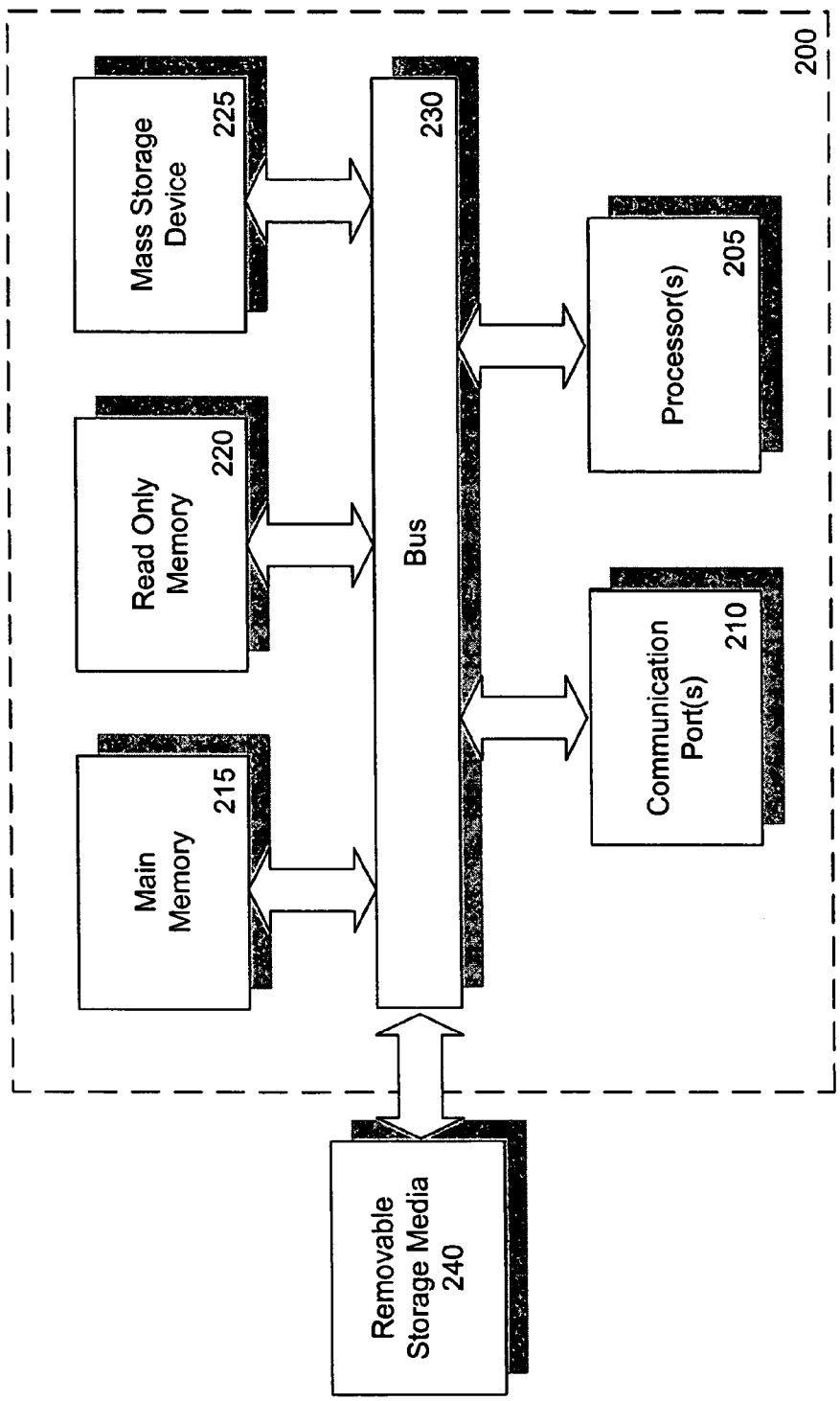
FIG. 2 is an example of a computer system with which embodiments of the present invention may be utilized.

An exemplary computer system 200, representing an exemplary computer 115, with which various features of the present invention may be utilized, will now be described with reference to FIG. 2. In this simplified example, the computer system 200 comprises a bus 230 or other communication means for communicating data and control information, and one or more processors 205, such as Intel® Itanium® or Itanium 2 processors, coupled with bus 230.

Computer system 200 further comprises a random access memory (RAM) or other dynamic storage device (referred to as main memory 215), coupled to bus 230 for storing information and instructions to be executed by processor(s) 205. Main memory 215 also may be used for storing temporary variables or other intermediate information during execution of instructions by processor(s) 215.

Computer system 200 also comprises a read only memory (ROM) 220 and/or other static storage device coupled to bus 230 for storing static information, such as instructions for processor(s) 205.

A mass storage device 225, such as a magnetic disk or optical disc and its corresponding drive, may also be coupled to bus 230 for storing information and instructions.

One or more communication ports 210 may also be coupled to bus 230 for supporting network connections and communication of information to/from the computer system 200 by way of a Local Area Network (LAN), Wide Area Network (WAN), the Internet, or the public switched telephone network (PSTN), for example. The communication ports 210 may include various combinations of well-known interfaces, such as one or more modems to provide dial up capability, one or more 10/100 Ethernet ports, one or more Gigabit Ethernet ports (fiber and/or copper) or other well-known network interfaces commonly used in internetwork environments. In any event, in this manner, the computer system 200 may be coupled to a number of other network devices, clients, and/or servers via a conventional network infrastructure, such as an enterprise's Intranet and/or the Internet, for example.

Finally, removable storage media 240, such as one or more external or removable hard drives, tapes, floppy disks, magneto-optical discs, compact disk-read-only memories (CD-ROMs), compact disk writable memories (CD-R, CD-RW), digital versatile discs or digital video discs (DVDs) (e.g., DVD-ROMs and DVD+RW), Zip disks, or USB memory devices, e.g., thumb drives or flash cards, may be coupled to bus 230 via corresponding drives, ports or slots.

Example Application

An example application is introduced for purposes of explaining and illustrating how one embodiment of Lentils may be used, and illustrating the advantages over traditional technologies. The example application is a web portal application. A web portal is an Internet (or intranet) application that limits user access to the application, and further restricts user access to specific pages in the application.

A user interacts with the application using a web browser. To access the application the user must log in, providing a domain name, username and password. A user is a person that belongs to an organization and has access to the application.

The domain name is a simple word, phrase, or sequence of characters that uniquely identifies an organization the user belongs to. For example, it may be the organization's Internet domain name.

An organization has many persons and demographic information. An organization may have multiple sub-organizations. An organization has many page groups. Page groups are described later in this document.

A user is associated with a collection of page groups, and has access to any page that belongs to the page groups in the collection. The application restricts the page groups a user may be associated with to the page groups belonging to the organization to which the user belongs.

The application monitors each time a user accesses the application by recording session information. A session begins when a user first logs in, and lasts until the user logs out, or times out.

The application provides features that are only available to a super user. A super user is a user, and typically has the responsibility of interacting with the applications most critical features.

Figure 3:
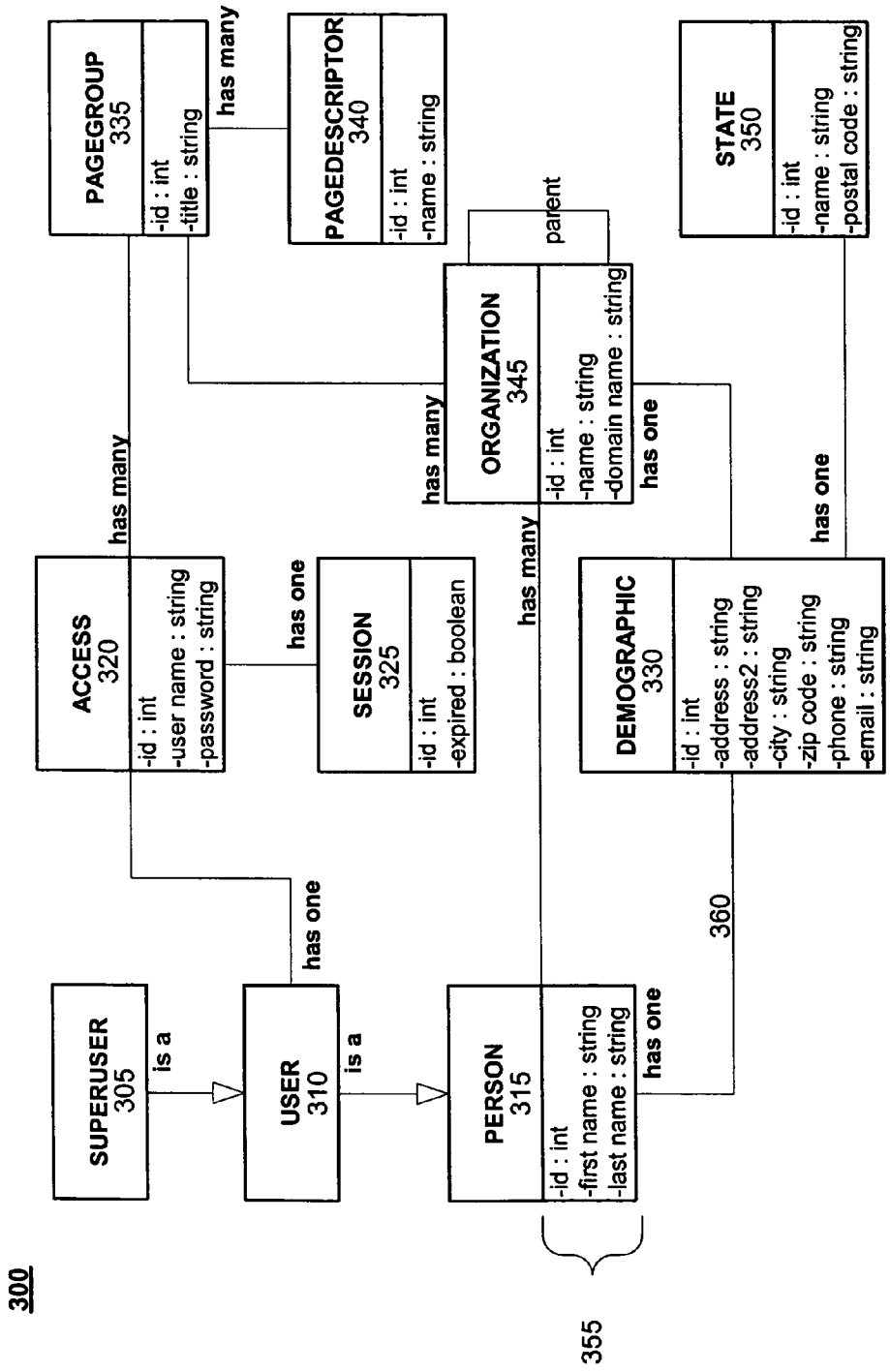
FIG. 3 is a UML diagram illustrating relationships between objects of an example web portal application.

FIG. 3 is a UML diagram 300 illustrating relationships between objects of an example web portal application. This type of diagram is well understood by those who are skilled in the art of object-oriented software development. Each of the boxes 305-350 in FIG. 3 represents a class. The classes are shown as containing data members (e.g., 355) and relationships (e.g., 360) to other classes. Instances of the classes are referred to as objects. While the present example is discussed with reference to classes and objects, it is to be understood that embodiments of the present invention are applicable to data structures generally and not limited to object oriented languages, applications, or databases.

Depending upon the embodiment, the information regarding relationships among the classes may be contained within the data structures representing the classes or may be provided via a separate configuration file. The configuration file may override or supplement relationships defined in classes or not otherwise provided by the classes.

Table 1 shows exemplary class definitions using pseudo code with syntax similar to that employed by Java or C++. These classes contain example members and references for implementing the models shown in FIG. 3.

TABLE 1

CLASS DEFINITIONS (I.E., JAVA, C++)

```
Class ACCESS                                     (320)
{
      Integer id;
      String username;
      String password;
      PAGEGROUP [] page groups;
};
Class DEMOGRAPHIC                                (330)
{
      Integer id;
      String address;
      String address2;
      String city;
      String zipcode;
      String phone;
      String email;
      STATE state;
};
Class ORGANIZATION                               (345)
{
      Integer id;
      String name;
      String domain;
      DEMOGRAPHIC profile;
      PERSON [] personnel;
      PAGEGROUP [] pageGroups;
      ORGANIZATION parent;
};
Class PAGEDESCRIPTOR                             (340)
{
      Integer id;
      String name;
};
Class PAGEGROUP                                  (335)
{
      Integer id;
      String title;
      PAGEDESCRIPTOR [] pages;
};
Class PERSON                                     (315)
{
      Integer id;
      String first;
      String last;
      DEMOGRAPHIC profile;
};
Class SESSION                                    (325)
{
      Integer id;
      Boolean expired;
      Access access;
};
```

TABLE 1-continued

CLASS DEFINITIONS (I.E., JAVA, C++)

```
Class STATE                                      (350)
{
      Integer id;
      String name;
      String abbreviation;
};
Class SUPERUSER extends USER                     (305)
{
};
Class USER extends PERSON                        (310)
{
      ACCESS passkey;
};
```

In the present example, the application is required to persist and/or otherwise save, update, read and delete objects, the relationships between objects to a storage system, and adhere to the implications of the relationships between the objects.

The storage system may be a relational database system (RDBS), an XML database, an object-oriented database or the like. Consistent with the intended purpose of this document, this example is explained with reference to a relational database system. Those skilled in the art will be able to apply the teachings contained herein to other storage system environments.

This example has been described first with a generic description, independent of the assumption that software would be used to implement the application, but then quickly transitions from a generic description to UML diagrams to supporting classes. This progression occurs frequently in industry as applications are developed. However, it is also a frequent occurrence that the progression starts with a generic description, and transitions into a database design space involving entity relationship diagrams (ERDs) and a schema. Once these elements are stable, then software is developed.

As described earlier in the background, this leads to a problem frequently experienced in industry. Applications that are both database and software intensive typically require individuals who are skilled in database technology, and individuals who are skilled in software development technologies.

Figure 4:
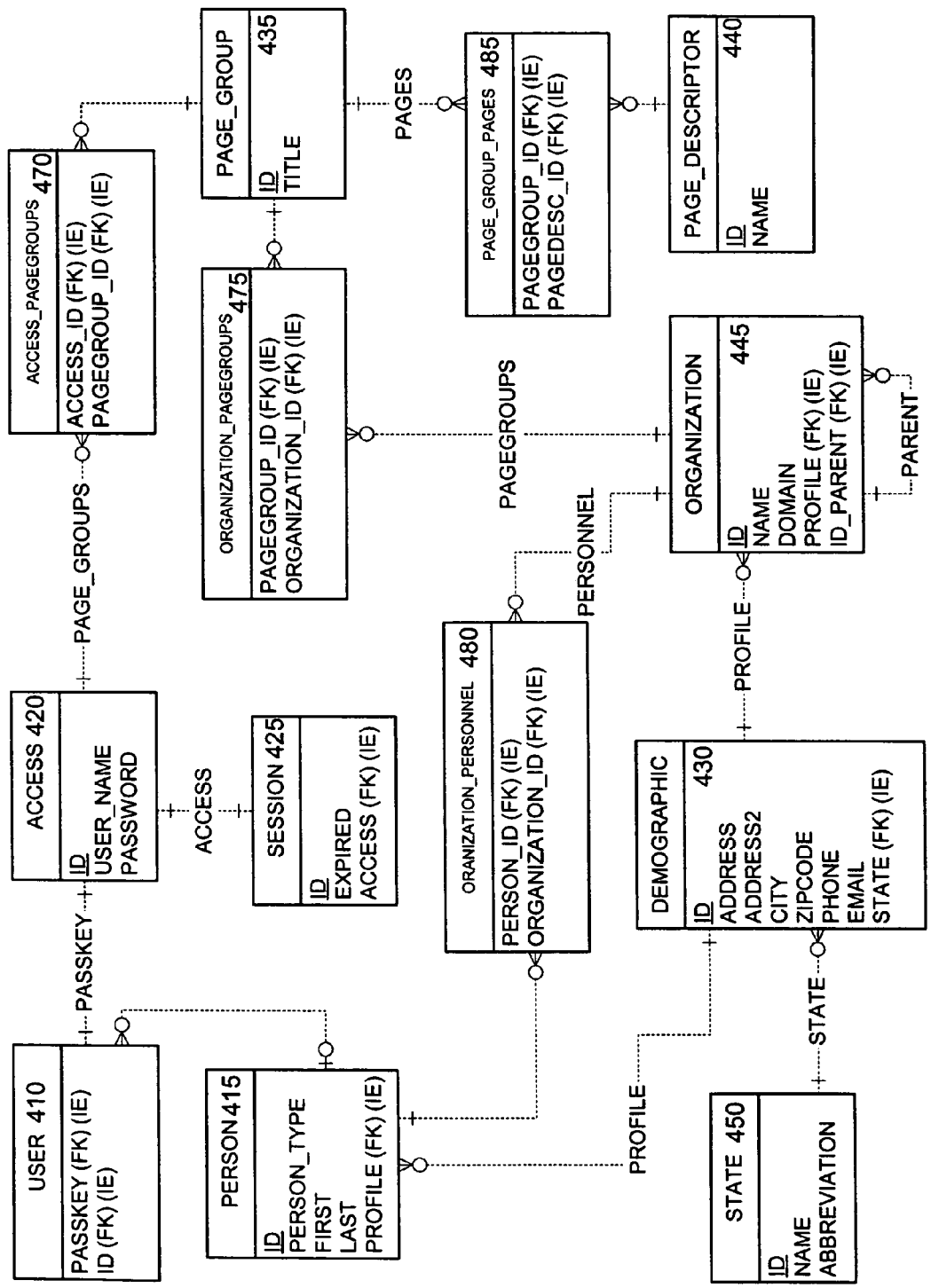
FIG. 4 is an entity relationship diagram for the example web portal application.

FIG. 4 is an entity relationship diagram (ERD) 400 for the example web portal application. Assuming the initial design model is software centric, FIG. 4 represents an example of what a resulting ERD 400 might look like for the web portal example. The ERD 400 is capable of supporting the application requirement for persisting data. Notice that there are more "boxes" (e.g., 470-485) in the ERD 400. This is because the relationships between the primary entities are modeled like primary entities themselves.

Note that if the design of the application was initiated from a database design space, the generic description would have to be augmented to support the relationship entities in the ERD 400. This is called artificial modeling, and tends to make it more difficult to understand the design. Using a software-centric design space, the generic description uses natural modeling, and is easier to understand.

Note that if a software developer initially developed the model from a generic description, to a UML model, to pseudo code, some time and coordination must be given for the software developer to communicate the elements of the design to a database developer, who then in turn after understanding the requirements, creates a schema in agreement with the needs of the software developer. The information that must be communicated includes the content of the objects, the relationships between the objects, and any constraints associated with the contents and relationships.

It is not always obvious from the ERD or UML diagram what kind of dependencies exists between two primary entities. For example, referencing FIG. 4, compare the relationship between ACCESS 420 and PAGE_GROUP 435, and ORGANIZATION 445 and PAGE_GROUP 435. Both of these relationships show an intermediate entity joining the two primary entities together. ORGANIZATION_PAGE-GROUPS 475 joins ORGANIZATION 445 and PAGE_GROUP 435, and ACCESS_PAGEGROUPS 470 joins ACCESS 420 and PAGE_GROUP 435. Structurally, the joining entities RGANIZATION_PAGEGROUPS and ACCESS_PAGEGROUPS are similar. However, there are differences implied by the relationship that govern the dependencies between the data. When an Organization is deleted, all Page Groups associated with the Organization should be deleted. When an Access is deleted, its relationship to the Page Groups deleted, but the Page Groups themselves should be left in tact.

What would be the benefits if the relationships and dependencies between classes could be annotated in a UML diagram, and implemented as properties of the classes that embody the relationships and dependencies? The information exchange between the software developer and the database developer could be conveyed programmatically.

Further, if the creation of a storage structure or schema, and query for, and manipulation of the data uses some structured process or language, the acts of creating the storage structure, and querying and manipulating data could be programmatically automated based on the properties of the classes participating in the application.

Relational database systems use SQL to create structure, and query and manipulate data, and thus is a prime candidate for programmatically automating these processes.

Scenarios

Included herein are a number of sample scenarios and a corresponding description of actions that occur within the example application and supporting RDBS. The purpose is to provide a sense of the complexities involved in accommodating the rules that govern the relationships between the classes and the constraints of the underlying RDBS.

Software implements the requirements of the applications and is the means of accommodating the rules that govern the relationships between the classes and the constraints of the underlying RDBS. The software is implicitly complex. According to one embodiment, Lentils may be employed to encapsulate the complexities. In the attached Appendix, two techniques for implementing the scenario of saving and organization are compared. The comparison demonstrates at least some of the benefits of using Lentils.

Creating a Schema

In simple terms, a database schema is a collection of database tables and columns. A schema is created by executing CREATE TABLE SQL statements. Other SQL statements may be used to establish indexes, foreign key constraints and other constraints or structures.

Saving an Organization

In accordance with the present example application, saving an organization follows a sequence that satisfies the constraints of the underlying database in accordance with the dependencies of the relationships, and the intent of "saving" the state of an object. The order of the sequence will be noted in a "lazy" fashion.

An organization must be saved. If an organization has a parent organization, the parent organization should be saved first. According to the present example, the parent organization is saved in accordance with the sequences outlined in this section.

An organization's demographic should be saved before the organization is saved. If there are new relationships between organization and page groups, the prior relationships between the organization and page groups are deleted.

Any page group in the prior relationships to organization that are not in the new relationships between organization and page groups are deleted.

Each page group in the new relationships between organization and page groups are saved.

The new relationships between organization and page groups are saved after the organization and page groups have been saved.

If there are new relationships between organization and persons, the prior relationships between the organization and persons are deleted.

Any person in the prior relationships to organization that are not in the new relationships between organization and persons are deleted.

Each person in the new relationships between organization and persons are saved. The new relationships between organization and persons are saved after the organization and persons have been saved.

For each person being deleted, if that person is a user, the user is deleted before the person is deleted.

For each user that is deleted, the user's access is deleted, after the user is deleted.

For each access that is deleted, any session belonging to the access is deleted before the access is deleted.

For each access that is deleted, the relationships between an access and page group is deleted before the access is deleted.

For each page group that is deleted, the relationship between the page group and page descriptors are deleted before the page group is deleted.

For each person being saved, the person's demographic is first saved.

For each person being saved, if the person is a user, the user is saved after the person is saved.

For each user being saved, the user's access is first saved.

For each access being saved, if there are any sessions associated with the access, the sessions are saved after the access is saved.

For each access being saved, if there are any pages groups associated with the access, the page groups and access are saved before the relationship between the access and page groups are saved.

Collections of data manipulation language (DML) SQL statements are used to cause the changes to the database. The DML statements may include, among other statements, INSERT, UPDATE and DELETE.

In general, if an object or corresponding record pre-exists in the database, the record is saved using an UPDATE SQL statement, otherwise the record is saved using an INSERT SQL statement. Objects/records are removed from the database using DELETE SQL statements.

Data values used in the SQL statements are obtained from the objects participating in the scenario.

Verifying User Login

This scenario provides an example where an object is reconstituted as a result of querying the database. In order to use the application, a user must provide a username, password and organization. The application verifies the user belongs to an organization and has access to the application.

The application reads exactly one Access object where an organization has the given domain name and the organization contains a person, that is a user, and the user has access having the given username and password.

Deleting an Organization

This scenario provides an example of how an object is deleted, and the complex actions that result. Deleting an organization must satisfy the constraints of the underlying database in accordance with the dependencies of the relationships and the intent of "deleting" an organization (i.e. object). The order of the sequence will be noted in "lazy" fashion.

An organization is deleted. If the organization has any child organizations, the child organizations are deleted first. According to the present example, the child organizations are deleted in accordance with the sequence outlined in this section.

An organization's demographic profile is deleted after the organization is deleted. Before the organization is deleted, its demographic profile should be referenced and cached by the application. The organization contains a reference to its demographic profile. The organization is removed from the database before the demographic profile is. The cached reference to the demographic profile is subsequently used to identify and delete the demographic profile.

Any person belonging to the organization is deleted. Before the organization is deleted, each person should be referenced and cached by the application. The relationship information is deleted from the database before the organization is deleted. When person is deleted, there are no inherent means to relate person to the organization. The cached reference to person is subsequently used to identify and delete the person.

For each person deleted, the relationship between organization and person is deleted before organization and person are deleted.

For each person being deleted, if that person is a user, the user is deleted before the person is deleted.

For each user that is deleted, the user's access should be deleted, after the user is deleted.

For each access that is deleted, any session belonging to the access is deleted before the access is deleted.

For each access that is deleted, the relationships between an access and page group should be deleted before the access is deleted.

Any page group belonging to the organization is deleted. Before the organization is deleted, each page group should be referenced and cached by the application. The relationship information is deleted before the organization is deleted. When page group is deleted, there are no inherent means to relate page group to the organization. The cached reference to page group is subsequently used to identify and delete the page group.

For each page group deleted, the relationship between organization and page group is deleted before organization and page group are deleted.

For each page group deleted, the relationship between page group and page descriptor are deleted, before the page group is deleted.

Compare & Contrast Implementation

Saving an Organization

Initial Conditions

It is assumed that a new organization object was created that has multiple persons, a demographic profile, and multiple page groups. The person is a user that has access to the application and through that access is associated with the same page groups as the organization.

Note the following weaknesses of a current state-of-the-art non-Lentils technique Different database vendors use different syntaxes to reference tables and columns. Consequently, migrating the application to a different vendor will break the application.

Automatic primary key generation is supported in different means by database vendors, or some not at all. This implementation assumes in favor of the example vendor, and somehow magically provides a means to get the primary key for the demographic ID. Migrating the application to a different vendor will break the application.

Different database vendors use different syntaxes to wrap string expressions. Migrating the application to a different vendor will break the application.

The listing in the attached Appendix illustrating an example of a non-Lentils technique requires the implementer/developer to have extensive knowledge of both software languages and SQL languages.

The implementer/developer must have extensive knowledge of the database constraints and use of foreign keys, to properly access the state ID and demographic profile ID.

If the insert of the DEMOGRAPHIC record fails, then the whole transaction must be aborted. Note that this non-Lentils implementation may not be sufficient to guarantee full integrity of the resulting data, and the example may need to be even more complex.

The non-Lentils example is insufficient to naturally accommodate relationships to persons and page groups. The non-Lentils technique would become extremely complicated.

The non-Lentils implementation is fragile and convoluted. If the composition of Organization, Demographic, Person, Page Group, State, or any related class changes, the non-Lentils implementation will fail.

The literal strings used to identify the tables and columns are hand coded. If the name of the tables and columns in the database are changed, the application will break.

The non-Lentils implementation assumes all values are specified. If the design allows any of the values to be undefined, then this example must be expanded to test whether a value has been defined or otherwise specified. As it is, the example tests whether the object ids are defined.

The non-Lentils implementation assumes the organization and all related objects do not yet exist in the database. Therefore, the SQL INSERT command is used. It is possible that one or more objects already exist in the database, in which case, the SQL UPDATE command should be used. If this is the case, then the example would fail to properly save organization.

If the example were required to discern between INSERT and UPDATE the non-Lentils implementation would grow in complexity and size, considerably. Quite possibly double in size. This is in part due to the fact that the structure and syntax of INSERT and UPDATE are very different from each other.

The non-Lentils implementation has in effect code to save demographics, person, user, access, page group, and more. The application may be required to save objects of these types independent of organization. Using a non-Lentils technique, similar code would have to be written. As such, the problems noted in the non-Lentils technique are compounded geometrically.

The non-Lentils implementation assumes the availability of DATABASE_SERVICE, and its ability to provide critical services, such as assigning IDs to primary keys, etc. This may not always be the case. Lentils inherently provides the features alluded to by DATABASE_SERVICE.

The non-Lentils implementation assumes each PERSON associated with an ORGANIZATION is a USER and casts as necessary to continue to save USER information, and objects related to USER, for example ACCESS objects, and more. If a PERSON is not a USER, the non-Lentils implementation will fail.

The non-Lentils implementation is hard coded to handle the currently defined example. As such, a two dimensional array is used to handle the nested relationships between organization and person/user and user/access and page group. If the application grows in complexity, and the number of nested relationships grows beyond 2, then the non-Lentils technique will fail.

The non-Lentils implementation assumes the implementer/developer fully understands the relationships between the data objects, the underlying constraints of the database so that the order is correct, the SQL syntax for the particular database vendor sufficient to write the code to satisfy the requirements of the application. Keep in mind that the Lentils toolkit is portable across different databases, from the inexpensive open source to more robust commercial databases. Consequently, the resulting applications are not bound to a specific tool or database.

There is considerably more code in the non-Lentils implementation. It is possible to reduce the total amount of code by introducing some technique for gathering the SQL, from object to object, but even then, the total amount of code written will be more. The Lentils technique can be accomplished in a single, simple line of code.

Because of the quantity of code, in the non-Lentils approach, there is a greater chance for error, and even error that may be undetected. For example, it is possible to inadvertently swap strings, or integers without an error being detected.

Deleting an Organization

Non-Lentils Weakness

The non-Lentils method, deleteOrganization, is required to check all fields of the given ORGANIZATION, even though the primary key is all that is needed to fully identify child records. All fields are required because the initial ORGANIZATION object may not have a primary key specified.

The non-Lentils technique uses the primary key to fully identify an object that is too be deleted. It is possible to use nested select statements to pass the information that uniquely identifies an object, or objects that is to be deleted, but the non-Lentils implementation would then become unmanageable. According to one embodiment, Lentils uses a primary key specification and avoids this problem.

The non-Lentils technique depends on the existence of a primary key. While this is the most common situation, there are times with a primary key is not used. For those kinds of circumstances the non-Lentils technique is insufficient.

The non-Lentils technique requires the implementer to know PERSON extends USER, and requires the "type" information to be queried. The implementation to use a "type" field is one of many possible ways to support inheritance. This is complicated and prone to error.

How Lentils Works

Storable Class

An understanding of how Lentils works begins with the storable class. According to one embodiment, storable is a base class that is extended to implement data classes, and is used to retain instances of primitive data and references to other storable objects corresponding to the requirements of a client application. In the example application, ACCESS, DEMOGRAPHIC, ORGANIZATION, PAGEDESCRIPTOR, PAGEGROUP, PERSON, SESSION, STATE, SUPERUSER and USER are all data classes that are derived from storable.

Data

Storable is used to retain instances of primitive data and references to other storable objects. According to one embodiment, data values and references are retained in a collection where the data values and references are associated with static attributes, or synergistic attributes, that are properties of storable sub-classes.

Attribute

A storable sub-class uses synergistic attributes to define its structure that includes primitive data, relationships to other storable classes, and other ancillary information that may be used to describe a relationship with a storage system. According to one embodiment of the present invention, a synergistic attribute is a static property of a derived storable class and has one or more of the following characteristics:

Name: Ancillary information providing an indication of the string expression that might be used to name an element within a storage system that corresponds to the attribute.

Size: Ancillary information providing an indication of how much space should be allocated by the storage system to store values associated with the attribute.

AttributeProfile: attributeProfile contains the ancillary information that may be used to describe a relationship with a storage system. This includes the following:

Primary: An indication of whether the corresponding instance data associated with the attribute should be used as a primary value to uniquely identify an object from among all objects that are instances of the specific storable class.

Unique: An indication of whether the corresponding instance data associated with the attribute can be used as a value to uniquely identify an object from among all objects that are instances of the specific storable class.

Nullable: An indication of whether the corresponding instance data associated with the attribute should exist as a non-null value for the state of the object to be considered whole, or complete.

Name Attribute: According to one embodiment, a special type of attribute is provided that may be used to infer the name of an element in a storage system that corresponds to the storable sub-class containing the Name attribute. For example, in a RDBS system, the name of a physical table may be equivalent to the name of the Name attribute.

Primitive Attribute: There is a special type of attribute that is used to describe primitive data called primitive. Primitive attributes is used to describe the common types of primitive data values which include, but are not limited to: NUMBER, VARCHAR, TIMESTAMP, CHAR. In the example application, a CHAR may be used to describe username in ACCESS, or NUMBER may be used to describe id in DEMOGRAPHIC.

Relational Attribute: According to one embodiment, a special type of attribute is provided that is used to describe relationships between storable classes, called relational. Relational attributes are recognized by the StorageAgent and are used to determine how the storage system should look and be constructed, and how to interact with the storage system when saving, reading and deleting object data. Relational attributes are defined in recognition of generic relationships found in a software object model, and structural constraints of a storage system used in support of the software object model. Relational attributes may include, but are not limited to the following:

Parent

A data structure or class, e.g., a storable class, that contains a parent attribute referencing another class is called the child of the referenced storable, and the referenced storable is called the parent. The existence of a child storable is dependent on the prior existence of a parent storable. A child storable derives its primary identity from its parent.

RecursiveParent

A data structure or class, e.g., a storable class, containing a RecursiveParent attribute, references itself through the RecursiveParent attribute. An instance of a storable class that contains a RecursiveParent attribute takes on a role of child to the storable referenced through the RecursiveParent attribute. If the AttributeProfile allows a null relationship, a child storable may exist, as whole, without reference to a parent, otherwise the existence of the child is dependent on the prior existence of a parent. In the example application, ORGANIZATION has a recursive parent relationship to itself.

ForeignParent

A data structure or class, e.g., a storable class, that contains a ForeignParent attribute referencing a different storable class is called a child, and the referenced storable class is called the foreign parent. The existence of a child storable is dependent on the prior existence of its foreign parent storable. A child storable provides its own primary identity. In the described embodiment, the child is intrinsically aware of the relationship to the foreign parent, but the foreign parent is not. In the example application, SESSION has a foreign child relationship to ACCESS.

Peer

A data structure or class, e.g., storable class, that contains a peer attribute referencing a different storable class is called the owner of a peer relationship to the referenced class. Storable objects with peer relationships may exist independent of each other. In the described embodiment, all storables associated with a peer relationship provide their own primary identity. In the example application, ACCESS owns a peer relationship to PAGEGROUP, and PAGEGROUP owns a peer relationship to PAGEDESCRIPTOR.

RecursivePeer

RecursivePeer relationships differ from peer relationships because the storable class with the RecursivePeer attribute is both the owner and subject of the relationship. Storable objects with RecursivePeer attributes may reference themselves. Storable objects with RecursivePeer attributes may exist independent of each other. All storable objects associated with a RecursivePeer relationship provide their own primary identity.

Children

A data structure or class, e.g., a storable class, that contains a children attribute referencing a different storable class is called the parent. Children relationships use a peer mechanism to implement the relationship, and as such the parent is also the owner of the peer relationship, and the child is the subject of the peer relationship. The existence of a child storable referenced by a parent storable is dependent on the existence of a parent storable. The child storable class provides their own primary identity. A child storable class is not intrinsically aware of its relationship to the parent storable class. In the example application, ORGANIZATION is the parent in a children relationship to PERSON.

ForeignChild

A data structure or class, e.g., a storable class, that contains a ForeignChild attribute referencing a different storable class is called the parent, and the referenced storable class is called the foreign child. The existence of a foreign child storable is dependent on the prior existence of a parent. In the described embodiment, a foreign child storable provides its own primary identification, but the parent also contains the identity of its foreign child. The parent is intrinsically aware of the foreign child, but the foreign child is not aware of its relationship to the parent.

Constant

A data structure or class, e.g., a storable class, that contains a Constant attribute referencing a different storable class considers objects of the referenced class constants. Instances of a storable class containing a Constant reference to a different class depend on the existence of the constant storable. The existence of a storable referenced through a Constant relationship is not dependent on the storable containing the Constant attribute. The storable containing the Constant attribute provides its own identity, but also contains the identity of the constant storable. In the example application, DEMOGRAPHIC has a constant relationship to STATE.

Extends

A data structure or class, e.g., a storable class, that contains an Extends attribute to a different class must literally extend the very same class. The storable that contains an Extends attribute is called an extended class, or sub-class. The class from which the storable class is extended is called the superclass. In the example application, USER extends PERSON, and SUPERUSER extends USER.

If a set of rules governing the relationship within a class or between two or more classes is identified, and the existing set of relational attributes, which reflect governing rules do not accommodate the identified rules, then a new relational attribute may be defined that reflects the governing rules. The Storage Agent is then extended or enhanced to accommodate and enforce the set of rules that govern the new relationship.

Table 2 illustrates exemplary Lentils classes that may be used in connection with the example application.

TABLE 2

Exemplary Lentils Classes for the Example Application

Class ACCESS extends IDStorable
{
    Attribute ACCESS = Name ( );
    Attribute ID = Primitive (NUMBER (5), AttributeProfile.Primary);
    Attribute USERNAME = Primitive (CHAR (15), AttributeProfile.UniqueNotNULL);
    Attribute PASSWORD = Primitive (CHAR (15), AttributeProfile.NotNULL);
    Attribute PAGEGROUPS = Peer (PAGEGROUP.class);
};

TABLE 2-continued

Exemplary Lentils Classes for the Example Application

```
Class DEMOGRAPHIC extends IDStorable
{
        Attribute DEMOGRAPHIC = Name ( );
        Attribute ID = Primitive (NUMBER (5), AttributeProfile.UniquePrimary);
        Attribute ADDRESS = Primitive (CHAR (80));
        Attribute ADDRESS2 = Primitive (CHAR (80));
        Attribute CITY = Primitive (CHAR (80));
        Attribute ZIPCODE = Primitive (CHAR (10));
        Attribute PHONE = Primitive (CHAR (20));
        Attribute EMAIL = Primitive (CHAR (80));
        Attribute STATE = Constant (STATE.class, AttributeProfile.NotNULL);
};
Class ORGANIZATION extends IDStorable
{
        Attribute ORGANIZATION = Name ( );
        Attribute ID = Primitive (NUMBER (5), AttributeProfile.UniquePrimary);
        Attribute NAME = Primitive (CHAR (80), AttributeProfile.NotNULL);
        Attribute DOMAIN = Primitive (CHAR (15), AttributeProfile.UniqueNotNULL);
        Attribute PERSONNEL = Children (PERSON.class);
        Attribute PROFILE = ForeignChild (DEMOGRAPHIC.class);
        Attribute PARENT = RecursiveParent (ORGANIZATION.class);
        Attribute PAGEGROUPS = Children (PAGEGROUP.class);
};
Class PAGEDESCRIPTOR extends IDStorable
{
        Attribute PAGEDESC = Name ( );
        Attribute ID = Primitive (NUMBER (5), AttributeProfile.UniquePrimary);
        Attribute NAME = Primitive (CHAR (32));
};
Class PAGEGROUP extends IDStorable
{
        Attribute PAGEGROUP = Name ( );
        Attribute ID = Primitive (NUMBER (5), AttributeProfile.UniquePrimary);
        Attribute TITLE = Primitive (CHAR (80), AttributeProfile.NotNULL);
        Attribute PAGES = Peer (PAGEDESCRIPTOR.class, AttributeProfile.NotNULL);
};
Class PERSON extends IDStorable
{
        Attribute PERSON = Name ( );
        Attribute ID = Primitive (NUMBER (5), AttributeProfile.UniquePrimary);
        Attribute FIRST = Primitive (CHAR (15), AttributeProfile.NotNULL);
        Attribute LAST = Primitive (CHAR (15), AttributeProfile.NotNULL);
        Attribute PROFILE = ForeignChild (DEMOGRAPHIC.class);
};
Class SESSION extends IDStorable
{
        Attribute SESSION = Name ( );
        Attribute ID = Primitive (NUMBER (5), AttributeProfile.Primary);
        Attribute ACCESS = ForeignParent (ACCESS.class);
        Attribute EXPIRED = Primitive (NUMBER (1));
};
Class STATE extends IDStorable
{
        Attribute STATE = Name ( );
        Attribute ID = Primitive (NUMBER (5), AttributeProfile.UniquePrimary);
        Attribute NAME = Primitive (CHAR (20));
        Attribute ABBREVIATION = Primitive (CHAR (2));
};
Class SUPERUSER extends USER
{
};
Class USER extends PERSON
{
        Attribute USER = Name ( );
        Attribute PASSKEY = ForeignChild (ACCESS.class);
};
```

Given the description of storable, attribute, primitive and the various relational attributes, exemplary Lentils storable classes for the example application are shown in Table 2. The classes shown in Table 2 assume the use of language reflection to obtain certain information. For example, language reflection is used to determine that SUPERUSER extends USER, and USER extends PERSON. The name of each of the attributes is set using language reflection using the member names associated with the attributes. In alternative embodiments, language reflection need not be employed and various other methods can be used. Consider the following examples:

Specifying the name of the TITLE Attribute in PAGEGROUP directly:
Attribute TITLE=Primitive("TITLE",CHAR(15),AttributeProfile.NotNULL);
Specifying a USER extends PERSON directly
Attribute placebo=EXTENDS(PERSON.class);

Later, when describing the Schema class, Schema obtains all attributes for a given storable sub-class. The classes shown in Table 2 assume the use of language reflection to allow Schema to obtain this information. In alternative embodiments, language reflection need not be employed. One technique may require all storables to declare an array containing references to all attributes. For example, USER may include the following method to provide an array:

```
Class USER extends PERSON
{
    Attribute USER = Name( );
    Attribute PASSKEY = ForeignChild (ACCESS.class);
    Attribute[] getAttributes ( )
    {
        return Attribute[] = {USER, PASSKEY};
    }
};
```

Also, Table 2, illustrates how primitive attribute may be used. Other embodiments may be preferred. For example, if STRING extends primitive, then FIRST attribute in PERSON may be declared in the following way:
Attribute LAST=STRING(15,AttributeProfile.NotNULL);
Or if NUMBER extends Primitive, then ID attribute in SESSION may be declared in the following way:
Attribute ID=NUMBER(5,AttributeProfile.NotNULL);

StorageAgent & DBAdmin

According to one embodiment, a storage agent acts as an intermediary between storable classes, storable objects and the storage system. The particular implementation of a storage agent varies and is dependent on the APIs or access mechanism provided by the storage system. DBAdmin is an instance of StorageAgent and serves an intermediary between storable classes and relational database systems (RDBS). The DBAdmin object generates SQL, programmatically and dynamically, in accordance with its responsibilities as a storage agent and the actions of the client application.

Creating a Schema

According to one embodiment, a relational database schema may be generated by invoking the create method of a DBAdmin object. Note that in this example it is assumed that the DBAdmin object implements StorageAgent. According to this example, the creation of a DBAdmin object requires a username, password and location for the database, and a Schema object. The creation of a Schema object requires an array of storable classes that are used by the application. Therefore, the DBAdmin uses a Schema that references the storable classes that are used by the application as illustrated below in Table 3.

TABLE 3

Exemplary Schema used by DBAdmin

Class [] schemaClasses =
{
    ACCESS.class,
    SESSION.class,

TABLE 3-continued

Exemplary Schema used by DBAdmin

PAGEDESCRIPTOR.class,
    PAGEGROUP.class,
    PERSON.class,
    USER.class,
    ORGANIZATION.class,
    STATE.class,
    DEMOGRAPHIC.class,
    SUPERUSER.class,
};
Schema schema = new Schema ( schemaClasses );
Storage dbAdmin = DBAdmin (username, password, url, schema);
dbAdmin.create ( );

Initializing Schema Object

In accordance with the present example, when a Schema object is instantiated, it creates for itself a collection of objects that are used to model the elements found in a database and the relationship between those elements and the storable classes participating in the application.

Figure 5:
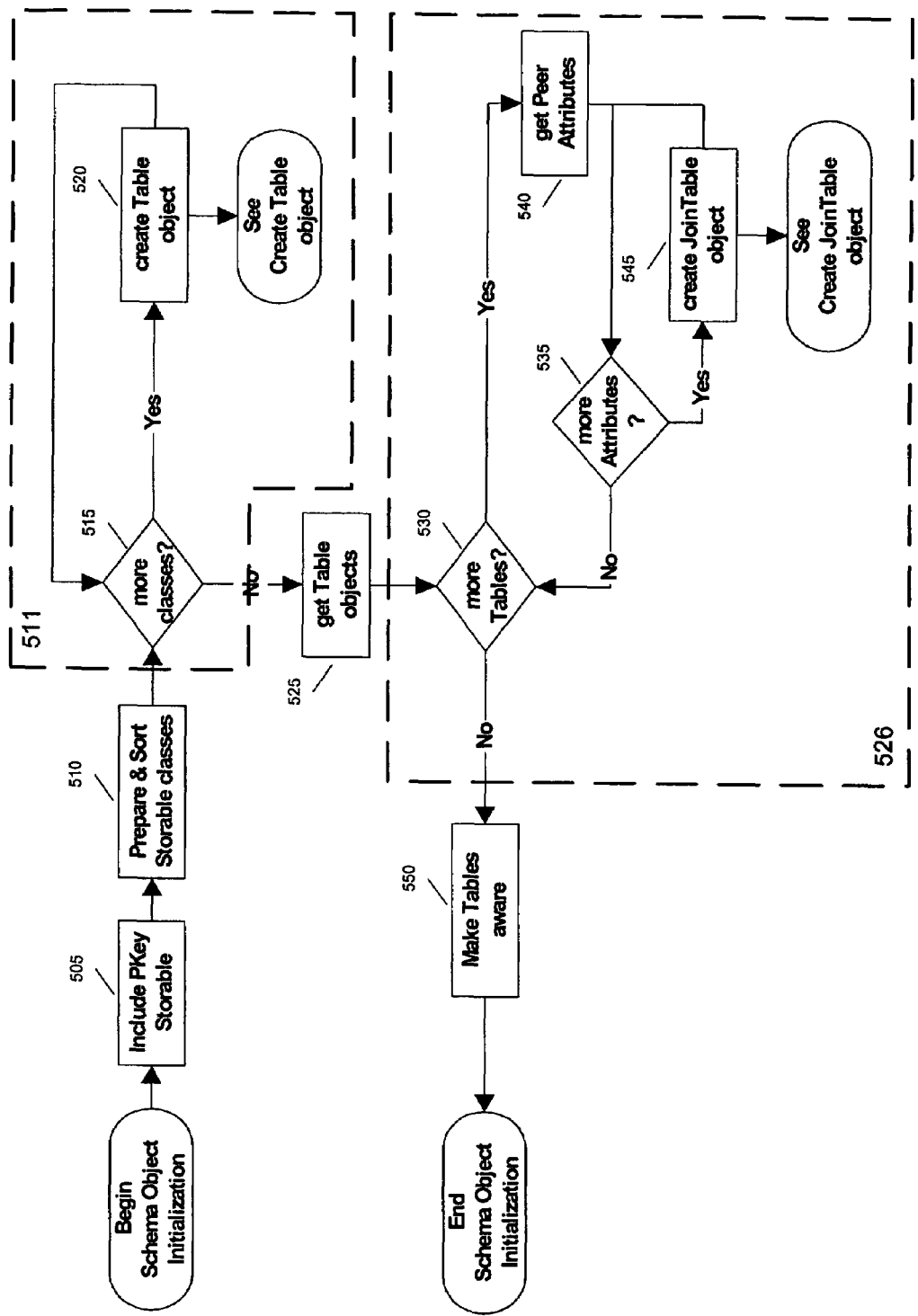
FIG. 5 is a flow diagram illustrating schema object initialization processing according to one embodiment of the present invention.

FIG. 5 is a flow diagram illustrating schema object initialization processing according to one embodiment of the present invention. For purposes of this example, prior to initialization, it is assumed the application has defined an array of storable classes.

At block 505, a storable class that is used in the assignment of primary keys is added to the collection of storable classes. The primary key storable, PKey, is used to record the values of primary keys that have been assigned automatically by Lentils during the runtime of the application.

At block 510, each storable class in the array is prepared and sorted. Certain embodiments assume language reflection is used to specify various properties of the storable class. This includes an ancillary name of the storable class, ancillary names of the attributes, and information as to whether a storable sub-class extends some other storable sub-class. The array of storable classes is sorted according to dependent relationships. Storable classes may contain relational attributes. A storable class containing a relational attribute that references some other storable class is located after the referenced storable class.

In block 511, for each storable class, a table object is created. At decision block 515, a determination is made regarding whether there are further storable classes to be processed. If so, at block 520, the table object is created for the next storable class. Details regarding table object creation are discussed below with reference to FIG. 6. Otherwise, if a table object has been created for each storable class, then processing continues with block 525.

At block 525, table objects are retrieved. In block 526, for each table object created, any JoinTables associated with the table are created. At decision block 530, a determination is made regarding whether there are further table objects to be processed. If so, at block 540, peer relationships are identified. Otherwise, if all table objects have been processed, then the processing flow continues with block 550.

For each peer relational attribute in a storable, a JoinTable will be created. At decision block 535, a determination is made regarding whether there are further peer relational attributes in the current storable to process. If so, a JoinTable object is created at block 545. Details regarding JoinTable object creation are discussed below with reference to FIG. 6. Otherwise, if all peer relational attributes in the current storable have been processed, then processing continues with decision block 530.

At block 550, the tables are made aware of their relationship to other tables. According to one embodiment, awareness includes knowledge of what tables are peers, providers, dependents, ascendants and descendants.

Figure 6:
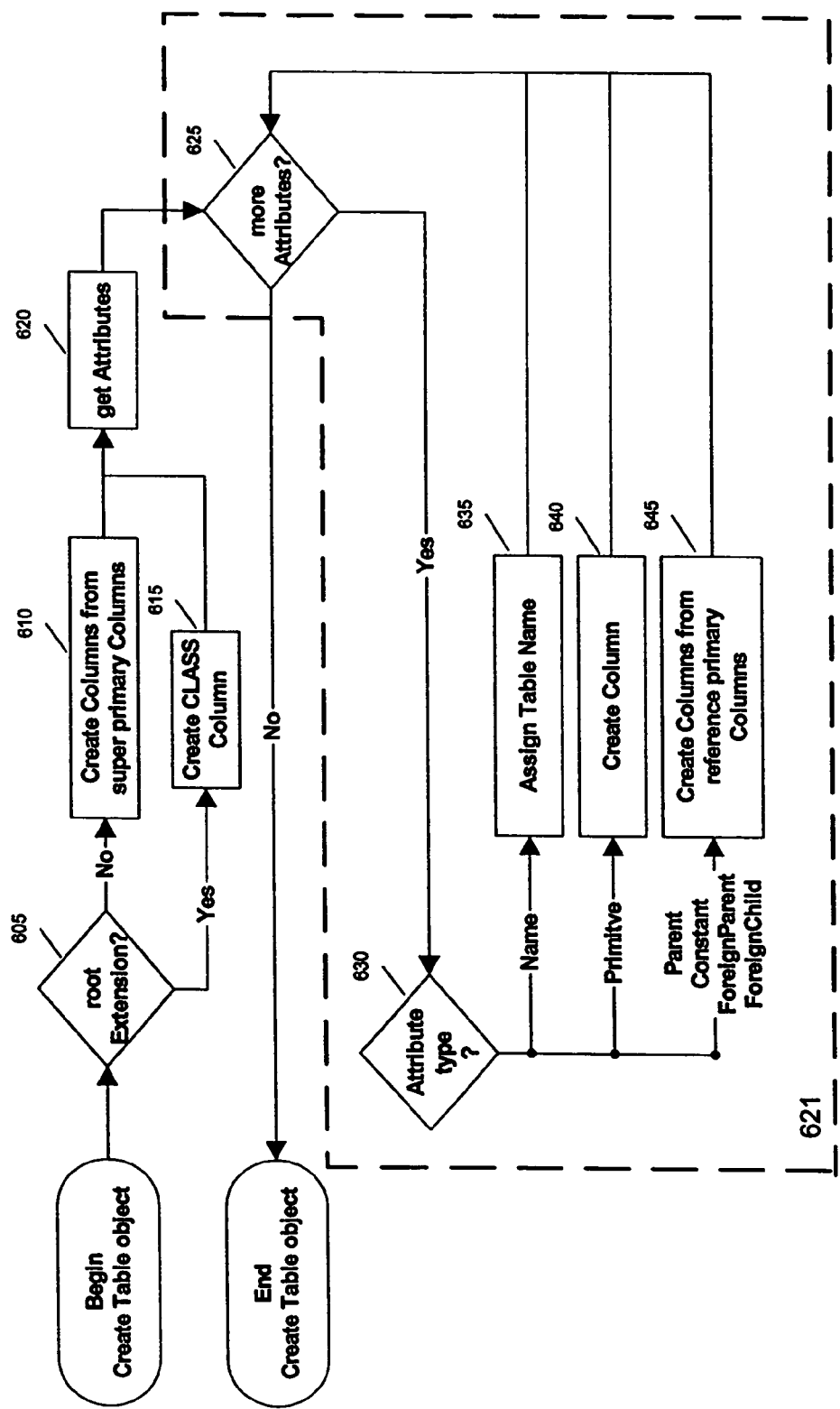
FIG. 6 is a flow diagram illustrating table object creation processing according to one embodiment of the present invention.

FIG. 6 is a flow diagram illustrating table object creation processing of block 520 according to one embodiment of the present invention. At decision block 605, a determination is made regarding whether the table is the root extension. If the table is the root extension, then at block 615 a CLASS column is created. The CLASS column models a physical column that contains a number that uniquely identifies the CLASS. This information is used when reading a storable to re-construct the correct type of storable.

If the table is not a root extension, then at block 610 for each primary column associated with the super table, a reference column is created with a foreign key reference to the super column.

At block 620, the attributes are obtained. In block 621, the attributes obtained for the specific storable class are iterated over. At decision block 625, a determination is made with regard to whether all attributes have been processed. If more attributes remain to be processed, the processing continues with decision block 630; otherwise, processing is complete.

At decision block 630, the attribute type is determined. If the attribute is of type Name, then the name of the table is assigned at block 635.

If the attribute is of type primitive, then at block 640 a column is created and assumes the properties of the attribute and AttributeProfile. This includes the name of the column, size if applicable, whether it is primary, unique or nullable.

If the attribute is one of the following provider types, Parent, Constant, ForeignParent or ForeignChild, then at block 645 for each primary column associated with the provider table, a reference column is created with a foreign key reference to the provider column.

Figure 7:
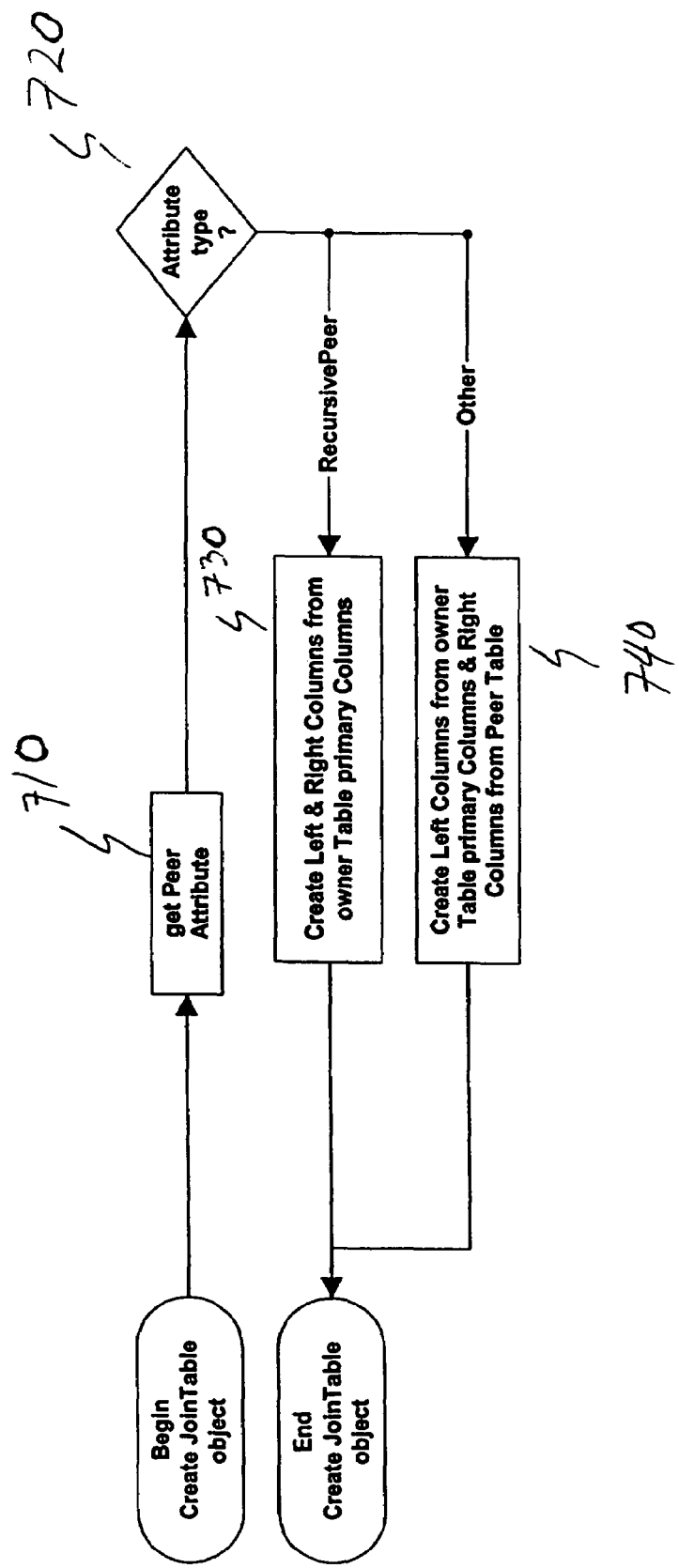
FIG. 7 is a flow diagram illustrating JoinTable object creation processing according to one embodiment of the present invention.

FIG. 7 is a flow diagram illustrating JoinTable object creation processing of block 545 according to one embodiment of the present invention. According to this example, a JoinTable is created for all peer attributes. According to one embodiment, the name of the JoinTable is the concatenation of the owner table, an underscore, and the name of the peer attribute. A JoinTable models a physical table in the database, and embodies a relationship between two tables.

At block 710, the peer attribute is obtained. At decision block 720, the attribute type is determined. If the peer attribute is of type RecursivePeer, then at block 730 for each primary column associated with the owner table a left and right column is created. Each of the left and right columns contain a foreign key reference to the provider column. According to one embodiment, for RecursivePeer columns, the name of the left column is the concatenation of the owning table name, an underscore, the name of the peer column, an underscore and the letter 'L'. Similarly, according to one embodiment, for RecursivePeer columns, the name of the right column is the concatenation of the owning table name, an underscore, the name of the peer column, an underscore and the letter 'R'.

For all other, or simple peer attributes, at block 740 for each primary column associated with the owner table a left column is created and contains a foreign key reference to the provider column. For each primary column associated with the peer table, a right column is created and contains a foreign key reference to the provider column. By convention, in the present example, the name of a simple peer column is the concatenation of the provider column's table name, an underscore and the name of the provider column. In alternative embodiments, other conventions may be employed for establishing the name of a peer column.

Figure 8:
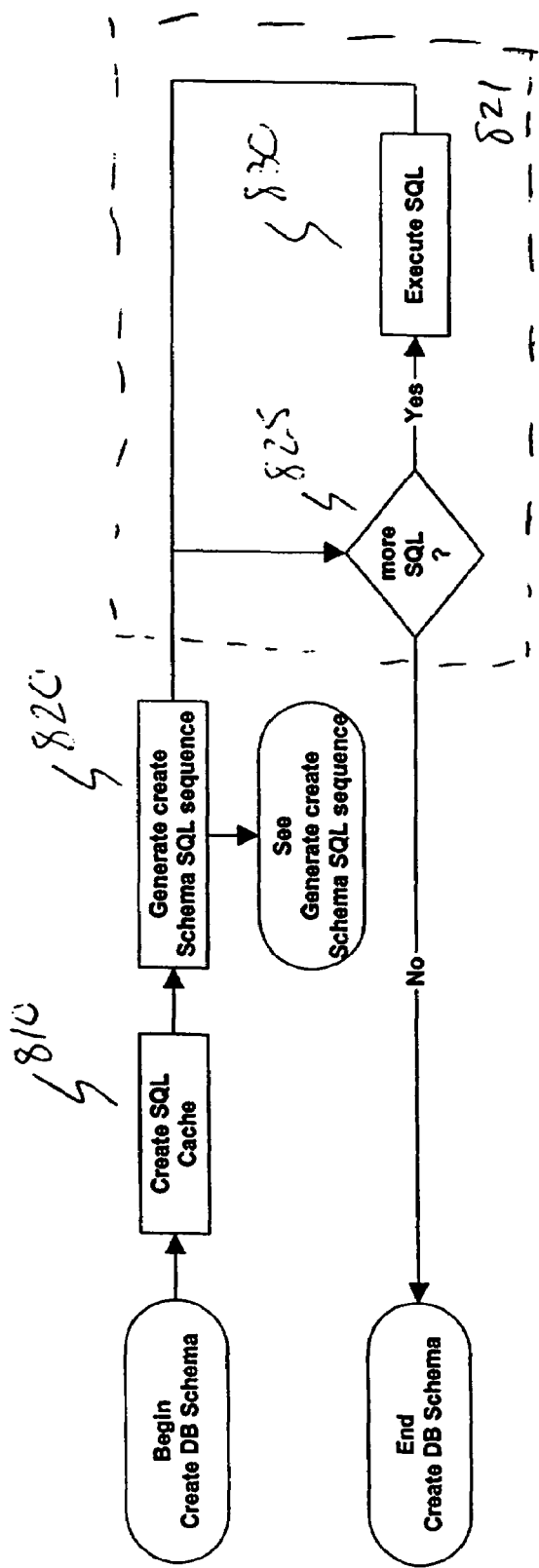
FIG. 8 is a flow diagram illustrating database schema generation processing according to one embodiment of the present invention.

FIG. 8 is a flow diagram illustrating database schema generation processing according to one embodiment of the present invention. According to the present example, a DB schema is created by executing a series of SQL statements which taken in their entirety, result in a fully manifested DB schema.

The process begins at block 810 by creating a SQL cache or FIFO. This cache is used to store SQL statements in the order they were placed into the cache.

At block 820, the process of generating SQL statements is performed. Details regarding the generation of the create schema SQL sequence are discussed below with reference to FIG. 9. Upon completion of block 820, the cache contains a collection of SQL statements.

In this example, in block 821, each SQL statement in the cache is then executed in the order the statements were place in the cache. At decision block 825, a determination is made regarding whether additional SQL statements remain in the cache to be executed. If one or more SQL statements remain in the cache, then at block 830 the next SQL statement is executed. If no further SQL statements remain in the cache, then processing is complete.

While in the above example, all SQL statements are cached in a FIFO in the natural order as a particular action, such as creating, deleting and saving an object, propagates through data and relationships according to an appropriate algorithm, in alternative embodiments one or more SQL statements may be executed out of this natural order and/or without adding them to the FIFO. For example, one or more SQL statements in the FIFO may be executed before completing the propagation. Additionally, any SQL statement generated as part of the action, that does not present a dependency on the generation of subsequent SQL or the effect of such subsequent SQL can be executed without being added to the FIFO cache; and any series of SQL statements contained in FIFO that do not present a dependency on the generation of subsequent SQL or the effect of such subsequent SQL can be executed without completing the propagation.

Figure 9:
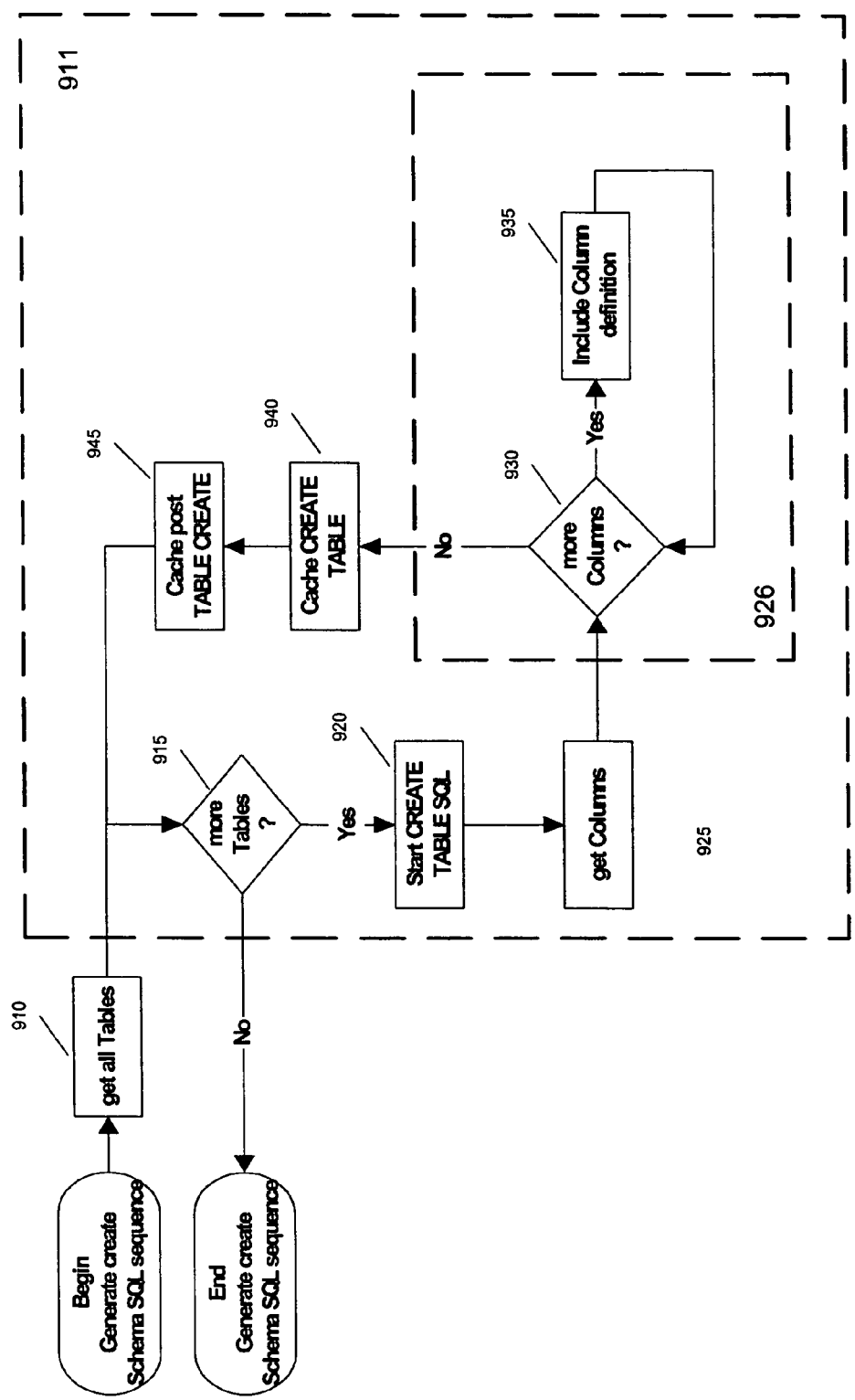
FIG. 9 is a flow diagram illustrating generation of a data definition expression to create tables according to one embodiment of the present invention.

FIG. 9 is a flow diagram illustrating block 820 of FIG. 8 according to one embodiment of the present invention. According to the present example, for each table in a Schema object, a CREATE TABLE statement is created. Note that a JoinTable extends, or is a table, and therefore CREATE TABLE statements are created for them as well.

At block 910, all tables are obtained. In block 911, all tables are iterated over. At decision block 915, a determination is made regarding whether all tables have been processed. If one or more tables remain to be processed, at block 920, generation of the appropriate sequence of one or more SQL statements for is started. According to one embodiment, the name of the table is used to define the table name in a CREATE TABLE SQL statement.

A table has columns. For each column associated with the table, a column definition is added to the CREATE TABLE statement. At block 925, the columns associated with the table are identified.

In block 926, all columns of the current table are iterated over. At decision block 930, a determination is made regarding whether one or more columns of the table remain to be processed. If one or more columns of the table remain to be processed, at block 935, the column definition is included within the CREATE TABLE definition. A column has characteristics that include name, data type, size, primary, unique, null, and foreign references. Each of these characteristics is manifested in the CREATE TABLE definition by some means. The exact syntax of the definition varies depending upon the vendor of the database system in use. If supported by the database vendor, for each column that is a primary key, the column definition will include an expression defining the column as a primary key. Some database vendors do not support the definition of a primary key using this technique. For those vendors, additional SQL is included in the cache during the post table create process (945).

The use of post table create step depends on the type of database vendor in use. For example, some database vendors prefer primary key definitions to be declared outside the CREATE TABLE statement. For those vendors, this section may create and cache a CREATE INDEX statement. Additionally, other database vendors may have their own unique syntax or variation that may be supported by embodiments of the present invention.

For example when provisioning the primary key column ID in table ACCESS. The following DDL statements illustrate the same effect for different database vendors.

Primary Key, Database Vendor A:
(1) CREATE TABLE "ACCESS" ("ID" INTEGER NOT NULL PRIMARY KEY)

Primary Key, Database Vendor B:
(1) CREATE TABLE [ACCESS] ([ID] INT NOT NULL UNIQUE)
(2) CREATE INDEX [ACCESS_PRIMARY] ON [ACCESS] ([ID]) WITH PRIMARY Or when provisioning primary key column ACCESS in table SESSION having a foreign key reference to column ID in ACCESS, the following DDL statements illustrate the same effect for different database vendors:

Foreign Key Database Vendor A:
CREATE TABLE "SESSION" ("P" INTEGER NOT NULL PRIMARY KEY REFERENCES "ACCESS" ("ID"))

Foreign Key, Database Vendor B:
CREATE TABLE [SESSION] ([ACCESS] INT NOT NULL UNIQUE CONSTRAINT SESSION_ACCESS REFERENCES [ACCESS](ID)
CREATE INDEX [ACCESS_PRIMARY] ON [SESSION] ([ACCESS]) WITH PRIMARY In similar ways, by specifying implicit, explicit and ancillary properties of storable classes and their attributes (i.e. primitive and relational), appropriate data definition expressions (DDE) are programmatically generated containing proper syntax for a given database vendor. The DDE are used to provision elements of a schema, including, but not limited to, tables, columns, column data types, column size, and integrity constraints including but not limited to primary keys, unique keys, foreign keys and whether null values are allowed; and performance characteristics, including, but not limited to, indexes.

Regardless of the database vendor, the creation of a table includes the appropriate combination of SQL statements to create a table, assign indexes to the columns having primary keys and declare foreign key references to provider columns. At block 940, once all columns have been processed, the appropriate combination of SQL statements generated by blocks 920-935 are cached in the FIFO for subsequent execution. At block 945, optional post TABLE CREATE SQL statements are cached in the FIFO for execution.

Figure 10:
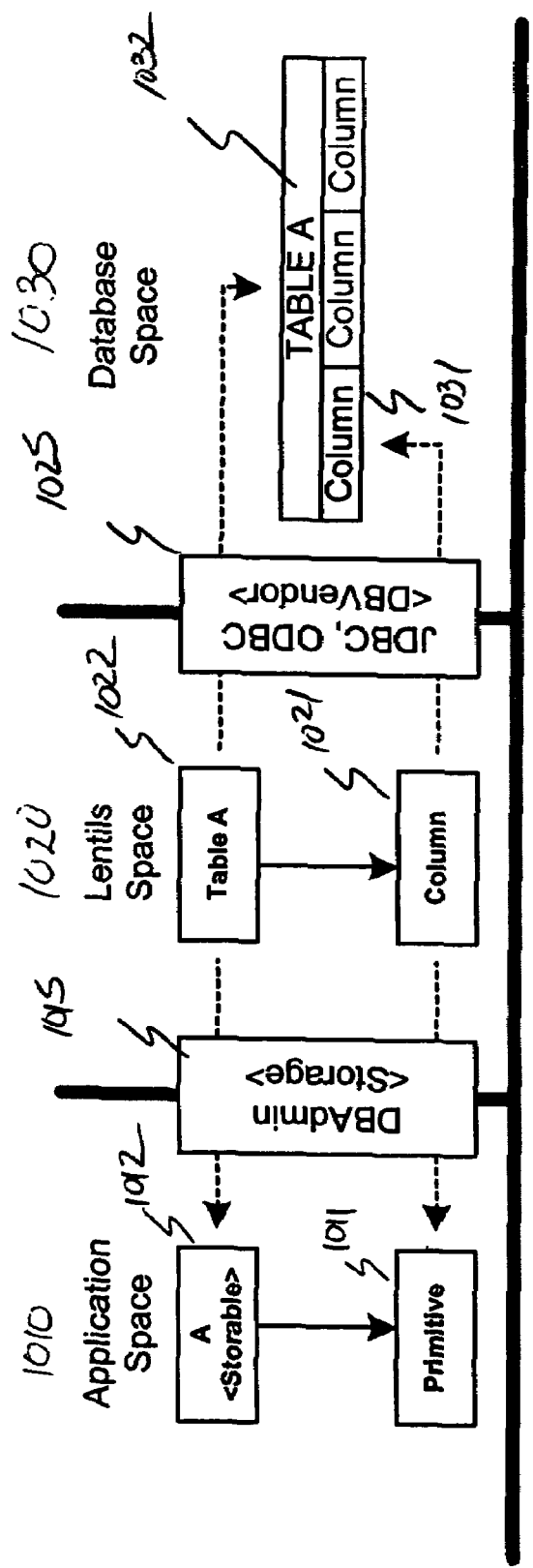
FIG. 10 conceptually illustrates structural relationships for primitive attributes according to one embodiment of the present invention.

FIG. 10 conceptually illustrates structural relationships for primitive attributes according to one embodiment of the present invention. According to one embodiment, generally, for each primitive attribute, e.g., primitive 1011, in a storable class, e.g., A 1012, a column 1031 is created in a table, e.g., table A 1032, associated with the storable class.

In this example, the structural relationship for a primitive attribute is illustrated in each of application space 1010, Lentils space 1020 and database space 1030. Application space 1010 refers to the context or perspective of a database application, e.g., a software application that utilizes Lentils to facilitate access to a database system. Lentils space 1020 refers to the context or perspective of the Lentils software. Database space 1030 refers to the context or perspective of the database system, e.g., an RDBS.

In application space 1010, a database application (not shown) has created an instance, A 1012, of a storable class (not shown). The storable class included a primitive attribute, primitive 1011. Lentils space 1020 programmatically receives the definition of the storable class from the database application via DBAdmin 1015 (an instance of a StorageAgent). In Lentils space 1020, the storable object, A 1012, is represented as a table, table A 1022, having a column 1021 corresponding to primitive 1011. Database space 1030 creates a table object, table A 1032, having a column reference, column 1031, responsive to appropriate instructions, e.g., one or more SQL statements or storage system API calls, by Lentils software.

Figure 11:
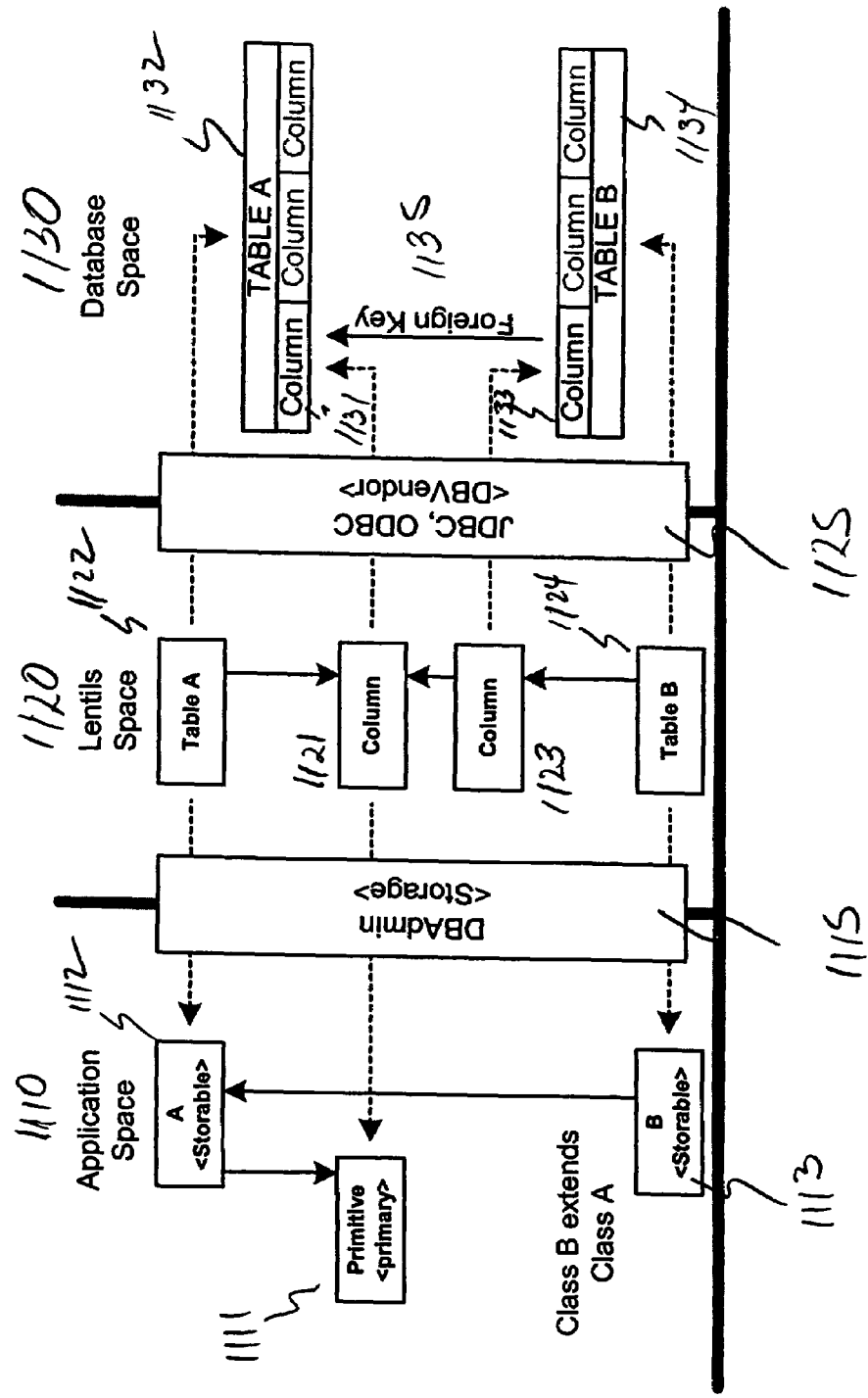
FIG. 11 conceptually illustrates structural relationships for inheritance according to one embodiment of the present invention.

FIG. 11 conceptually illustrates structural relationships for inheritance according to one embodiment of the present invention. Generally, for any storable class B that extends a storable class A, other than storable itself, then for each primary column (super-column) in the table associated with storable class A, a column is created in the table associated with storable class B, and the extended column contains a foreign key reference to the super-column in the table associated with the storable class A.

In the present example, in application space 111O, storable class B 1113 extends a storable class A 1112 having primitive attribute, primitive 1111. In Lentils space 1120, this is represented in an intermediate form as a first table object, table A 1122, corresponding to storable class A 1112 having a column reference 1121; and a second table object, table B 1124, corresponding to storable class B 1113, having a column reference 1123.

Finally, in database space 1130, two tables, table A 1132 and table B 1134, corresponding to table A 1122 and table B 1124, respectively, are created. An extended column 1133 corresponding to column reference 1123, is created in table 1134 which contains a foreign key reference 1135 to a primary column (super-column) 1131 of table A 1132, corresponding to the column reference 1121.

Figure 12:
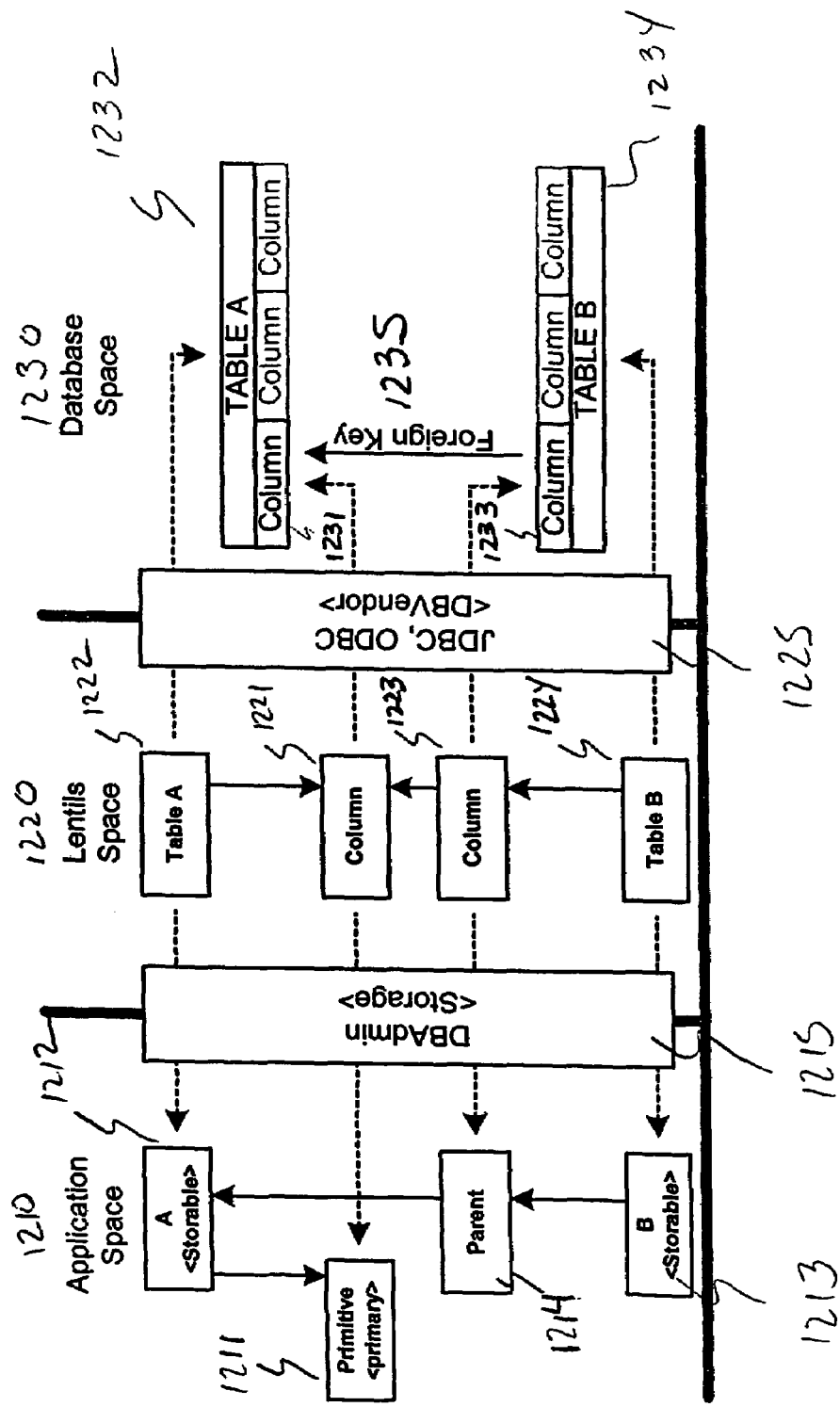
FIG. 12 conceptually illustrates structural relationships for parent attributes according to one embodiment of the present invention.

FIG. 12 conceptually illustrates structural relationships for parent attributes according to one embodiment of the present invention. Generally, for each parent attribute in storable class B referencing storable class A, then for each primary column in the table associated with storable A, a column is created in the table associated with the storable class B, and the column in the table associated with the storable class B contains a foreign key constraint referencing its corresponding column in the table associated with the storable class A.

In the present example, in application space 1210, a parent attribute 1214 of a storable class B 1213 references a storable class A 1212, which has a primary primitive attribute 1211. In Lentils space 1220, this is represented in an intermediate form as a first table object, table A 1222, corresponding to storable class A 1212 having a column reference 1221; and a second table object, table B 1224, corresponding to storable class B 1213, having a column reference 1223.

Finally, in database space 1230, two tables, table A 1232 and table B 1234, corresponding to table A 1222 and table B 1224, respectively, are created. A column 1233 is created in table 1234 that contains a foreign key reference 1235 to a primary column (super-column) 1231 of table A 1232, corresponding to the column reference 1221.

Figure 13:
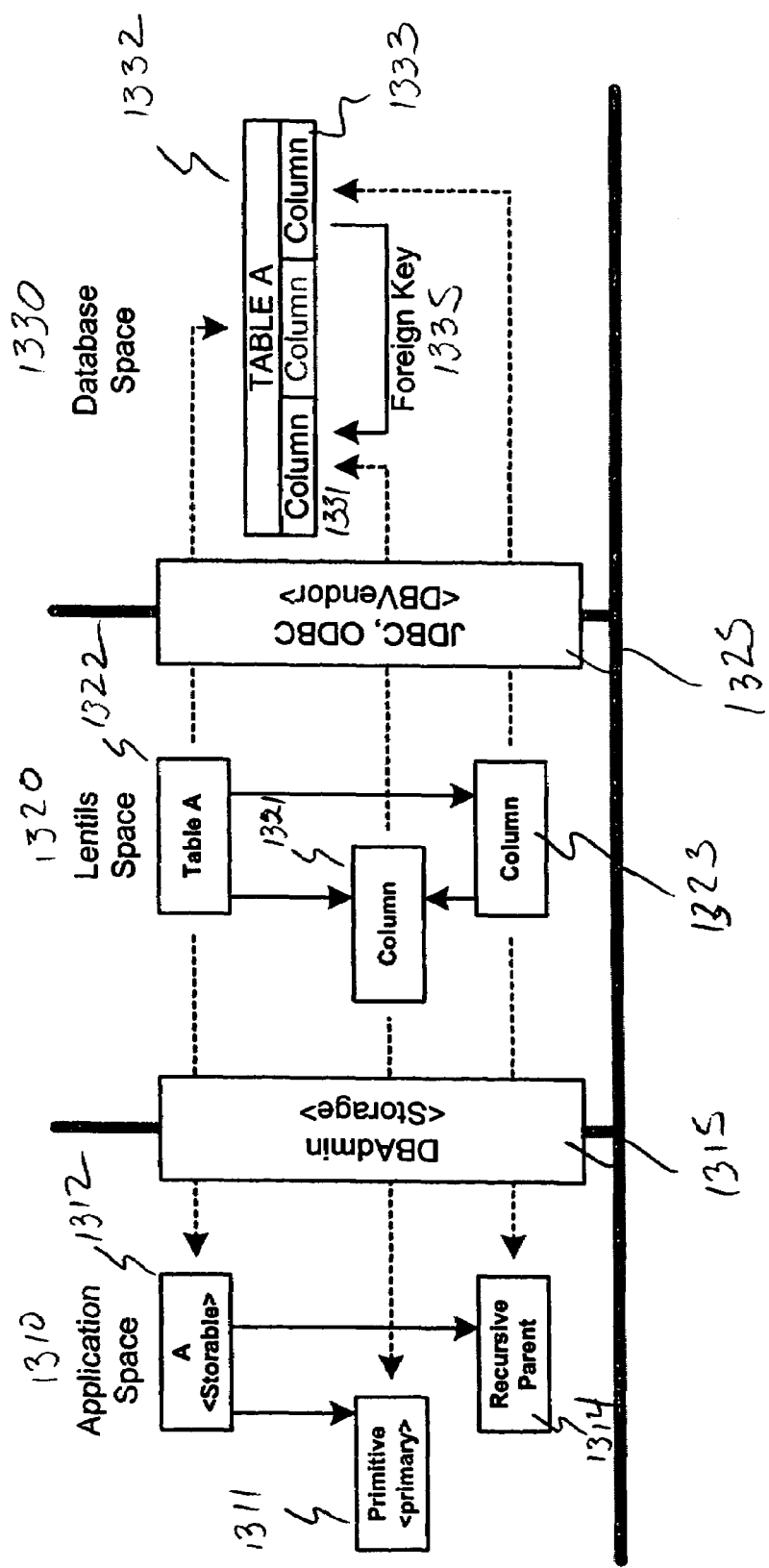
FIG. 13 conceptually illustrates structural relationships for recursive parent according to one embodiment of the present invention.

FIG. 13 conceptually illustrates structural relationships for recursive parent according to one embodiment of the present invention. Generally, for each RecursiveParent attribute in a storable class, then for each primary column in the table, a recursive column is created and contains a foreign key constraint to the primary column.

In the present example, in application space 1310, a storable class A 1312 has a RecursiveParent attribute 1314 and a primary primitive attribute 1311. In Lentils space 1320, this is represented in an intermediate form as a table object, table A 1322, having a first column reference 1321 corresponding to the primary primitive attribute 1311 and a second column reference 1323 corresponding to the RecursiveParent attribute 1314.

Finally, in database space 1330, a table A 1332 is created having a primary column 1331 corresponding to column reference 1321 and a recursive column 1333 corresponding to column reference 1323. The recursive column 1333 contains a foreign key constraint 1335 to the primary column 1331.

Figure 14:
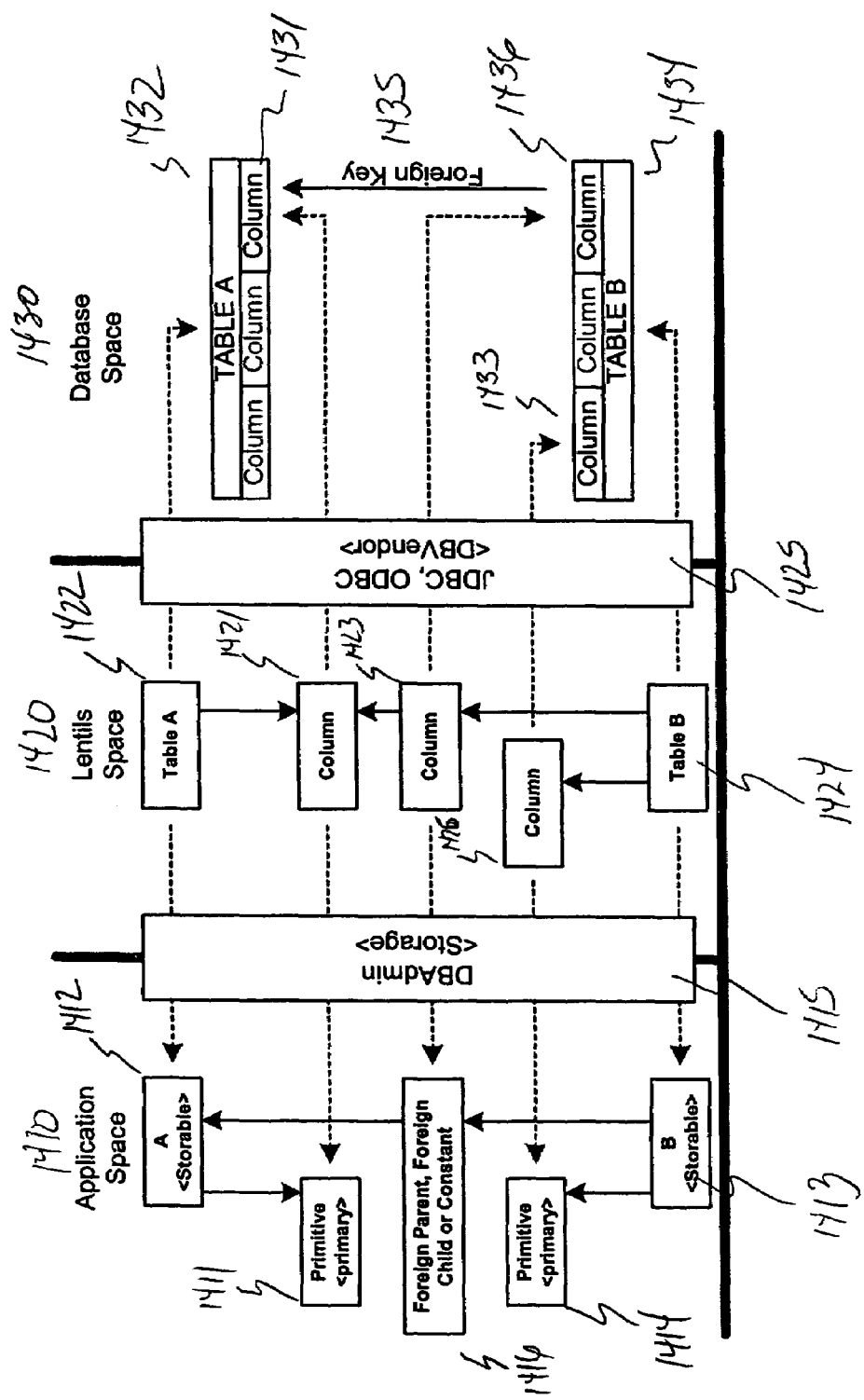
FIG. 14 conceptually illustrates structural relationships for Foreign Parent, Foreign Child or Constant according to one embodiment of the present invention.

FIG. 14 conceptually illustrates structural relationships for Foreign Parent, Foreign Child or Constant according to one embodiment of the present invention. Generally, for each ForeignParent, ForeignChild or Constant attribute in storable class B referencing storable class A, then for each primary column in the table associated with storable A, a reference column is created in the table associated with storable B, and the reference column contains a foreign key constraint to its corresponding column in the table associated with the storable class A.

In the present example, in application space 1410, a Foreign Parent, Foreign Child or Constant attribute 1416 of a storable class B 1413 references a storable class A 1412, which has a primary primitive attribute 1411. Storable class B 1413 also has a primary primitive attribute 1414. In Lentils space 1420, this is represented in an intermediate form as a first table object, table A 1422, corresponding to storable class A 1412 having a column reference 1421; and a second table object, table B 1424, corresponding to storable class B 1413, having a first column reference 1423 corresponding to the Foreign Parent, Foreign Child or Constant attribute 1416 and a second column reference 1426 corresponding to the primary primitive attribute 1414.

Finally, in database space 1430, two tables, table A 1432 and table B 1434, corresponding to table A 1422 and table B 1424, respectively, are created. A column is created in table A 1432 corresponding to the column reference 1421. A first column 1433 is created in table B 1434 corresponding to the column reference 1426 and a reference column 1436 is created in table B 1434 that contains a foreign key constraint 1435 to column 1431.

Figure 15:
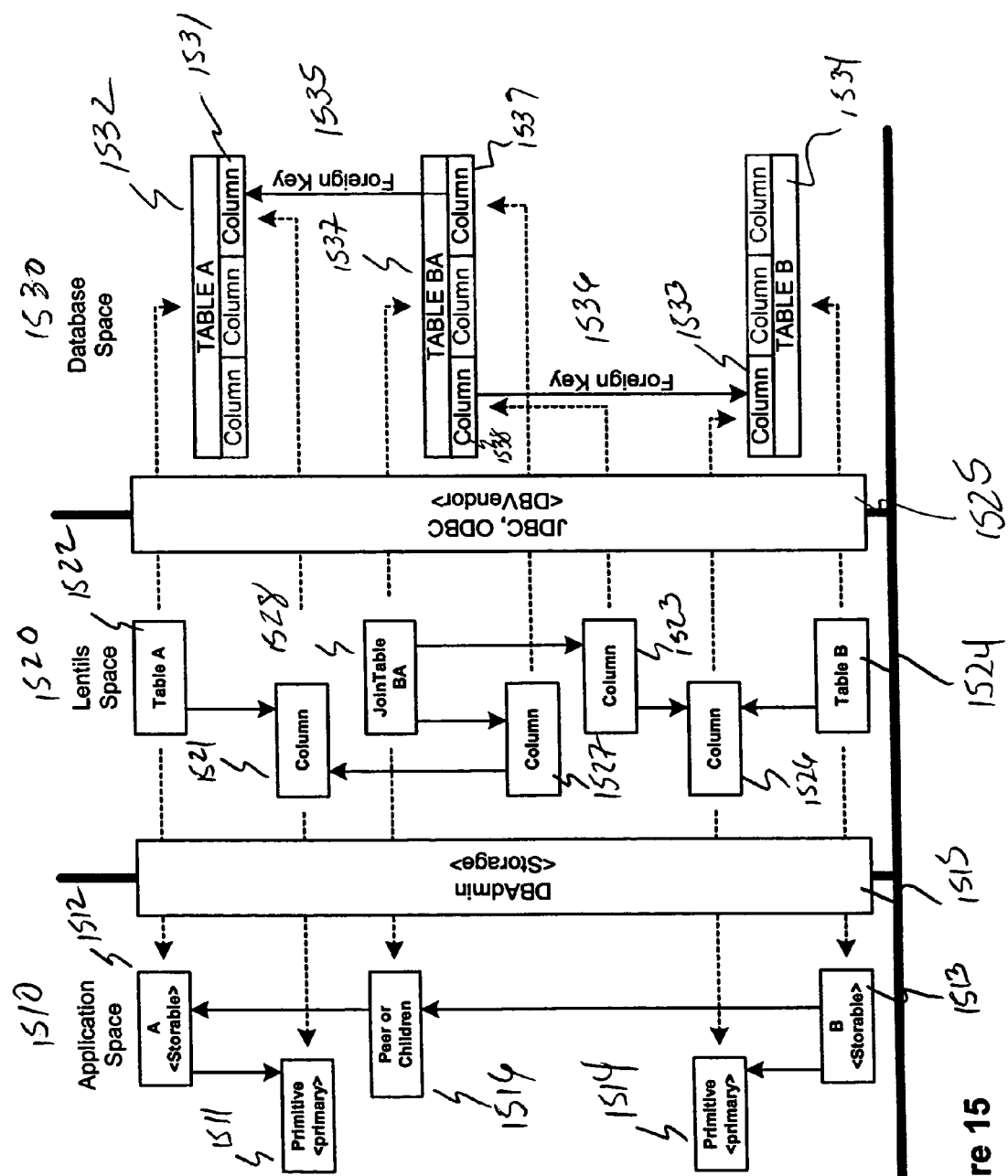
FIG. 15 conceptually illustrates structural relationships for peer or children according to one embodiment of the present invention.

FIG. 15 conceptually illustrates structural relationships for peer or children according to one embodiment of the present invention. Generally, for each peer or children attribute in storable class B referencing storable class A, a join table is created. In the join table, for each primary column in the table associated with storable class B, a column is created in the join table with a foreign key constraint referencing the column in the table associated with storable class B; and for each primary column in the table associated with storable class A, a column is created in the join table with a foreign key constraint referencing the column in the table associated with storable class A.

In the present example, in application space 1510, a peer or children attribute 1516 of a storable class B 1513 references a storable class A 1512, which has a primary primitive attribute 1511. Storable class B 1513 also has a primary primitive attribute 1514. In Lentils space 1520, this is represented in an intermediate form as a first table object, table A 1522, corresponding to storable class A 1512 having a column reference 1521 corresponding to the primary primitive attribute 1511, a second table object, table B 1524, corresponding to storable class B 1513, having a first column reference 1526 corresponding to the primary primitive attribute 1514, and a third table object, JoinTable BA 1528 having a first column reference 1527 corresponding to column reference 1521 and a second column reference 1523 corresponding to column reference 1526.

Finally, in database space 1430, three tables, table A 1532, table B 1534, and table BA 1537 corresponding to table A 1522, table B 1524 and JoinTable BA 1528, respectively, are created. A column 1531 is created in table A 1532 corresponding to the column reference 1521. A column 1533 is created in table B 1534 corresponding to the column reference 1526. A first column 1538 is created in table BA 1537 with a foreign key constraint 1536 referencing column 1533 of table B 1534 and a second column 1539 is created in table BA 1537 with a foreign key constraint 1535 referencing column 1531 of table A 1532.

Figure 16:
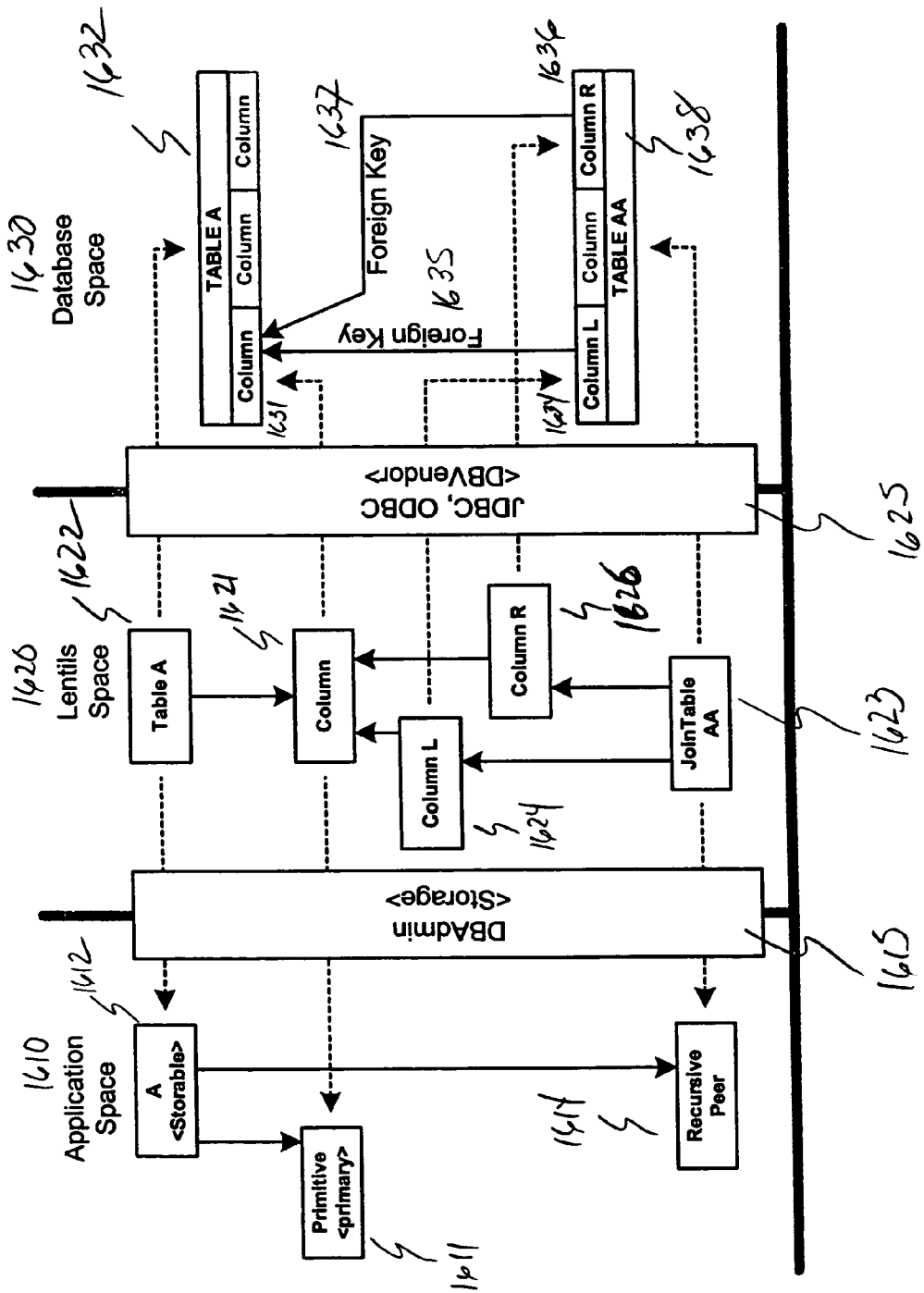
FIG. 16 conceptually illustrates structural relationships for recursive peer according to one embodiment of the present invention.

FIG. 16 conceptually illustrates structural relationships for recursive peer according to one embodiment of the present invention. Generally, for each recursive peer attribute in storable class A, a join table is created. In the join table, for each primary column in the table associated with storable class A, a left column is created with a foreign key constraint referencing the column in the table associated with storable class A; and a right column is created with a foreign key constraint referencing the column in the table associated with the storable class A.

In the present example, in application space 1610, a storable class A 1612 has a recursive peer attribute 1614 and a primary primitive attribute 1611. In Lentils space 1620, this is represented in an intermediate form as a table object, table A 1622, having a column reference 1621 corresponding to the primary primitive attribute 1611; and a join table object, JoinTable AA 1623, corresponding to the recursive peer attribute 1614, having a left column reference, i.e., column L 1624, and a right column reference, i.e., column R 1626, both referencing column reference 1621.

Finally, in database space 1630, two tables, table A 1632, corresponding to table A 1622, and table AA 1638, corresponding to JoinTable AA 1623, are created. A column 1631 is created in table A 1632 corresponding to column reference 1621. A left column 1634 is created in table AA 1638 corresponding to left column reference 1624 and having a foreign key constraint 1635 referencing column 1631 in table A 1632. A right column 1636 is created in table AA 1638 corresponding to right column 1626 and having a foreign key constraint 1637 referencing column 1631 in table A 1632.

Saving an Object

Table 4 shows exemplary pseudo code for saving a storable object.

TABLE 4

Saving a Storable Object

Figure 17:
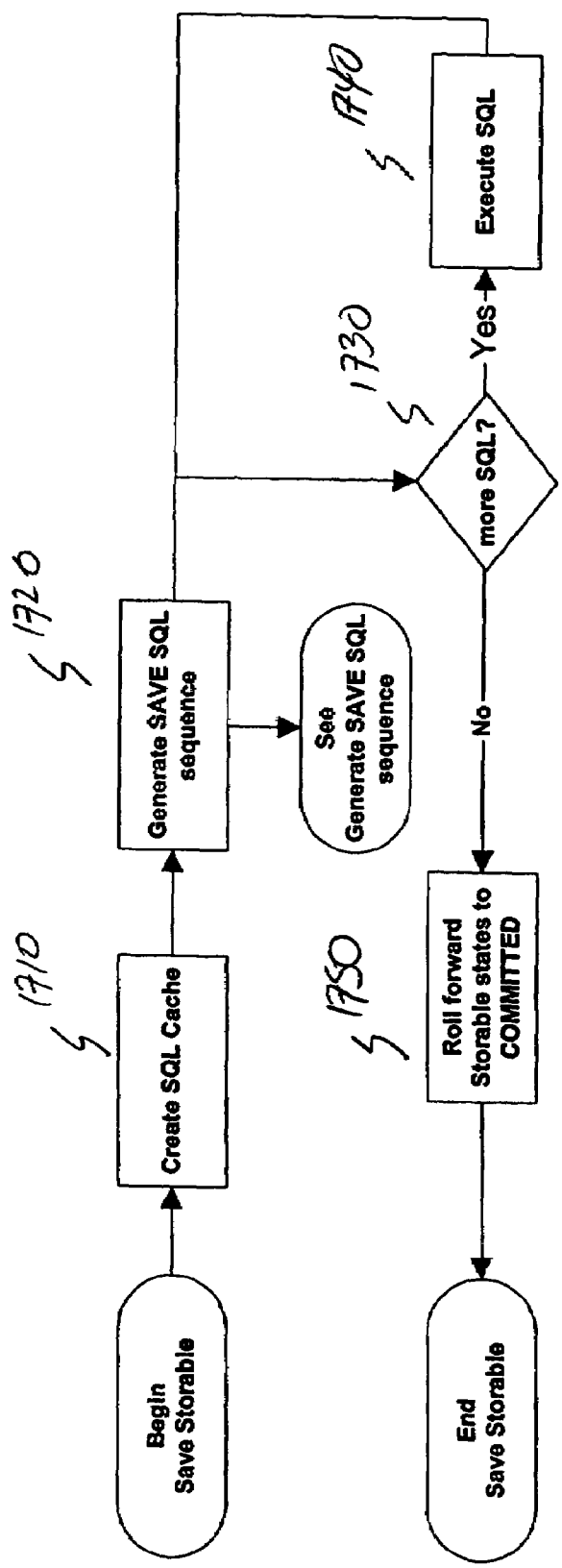
FIG. 17 is a flow diagram illustrating processing associated with saving an object according to one embodiment of the present invention.

Storable storable = // Some Storable object, ORGANIZATION for example...
Storage dbAdmin = DBAdmin (username, password, url, schema);
dbAdmin.save ( storable );

FIG. 17 is a flow diagram illustrating processing associated with saving an object according to one embodiment of the present invention. According to the present example, a storable object is saved by executing a series of SQL statements which taken in their entirety, result in a specific set of records in the database that contain information reflecting the state of the storable, all instances of relationships between other storables, and the state of the other storables.

The process begins at block 1710 where a SQL cache or FIFO is created. This cache is used to store SQL statements in the order they were placed into the cache.

At block 1720, the process of generating SQL statements to save the storable is performed. Details regarding generation of data manipulation language statements to save the state of a storable object are discussed below with reference to FIG. 18. Similar statement generation methodologies may be employed for other forms of data manipulation expressions.

After block 1720, the cache contains a collection of SQL statements and each SQL statement in the cache is executed in the order the statements were place in the cache. At decision block 1730, a determination is made regarding whether more SQL statements remain in the cache. If so, at block 1740, the next SQL statement is executed. Otherwise, if there are no further SQL statements in the cache to be executed, then processing continues with block 1750 where the rollback states of the storables are set to COMMITTED.

Figure 18:
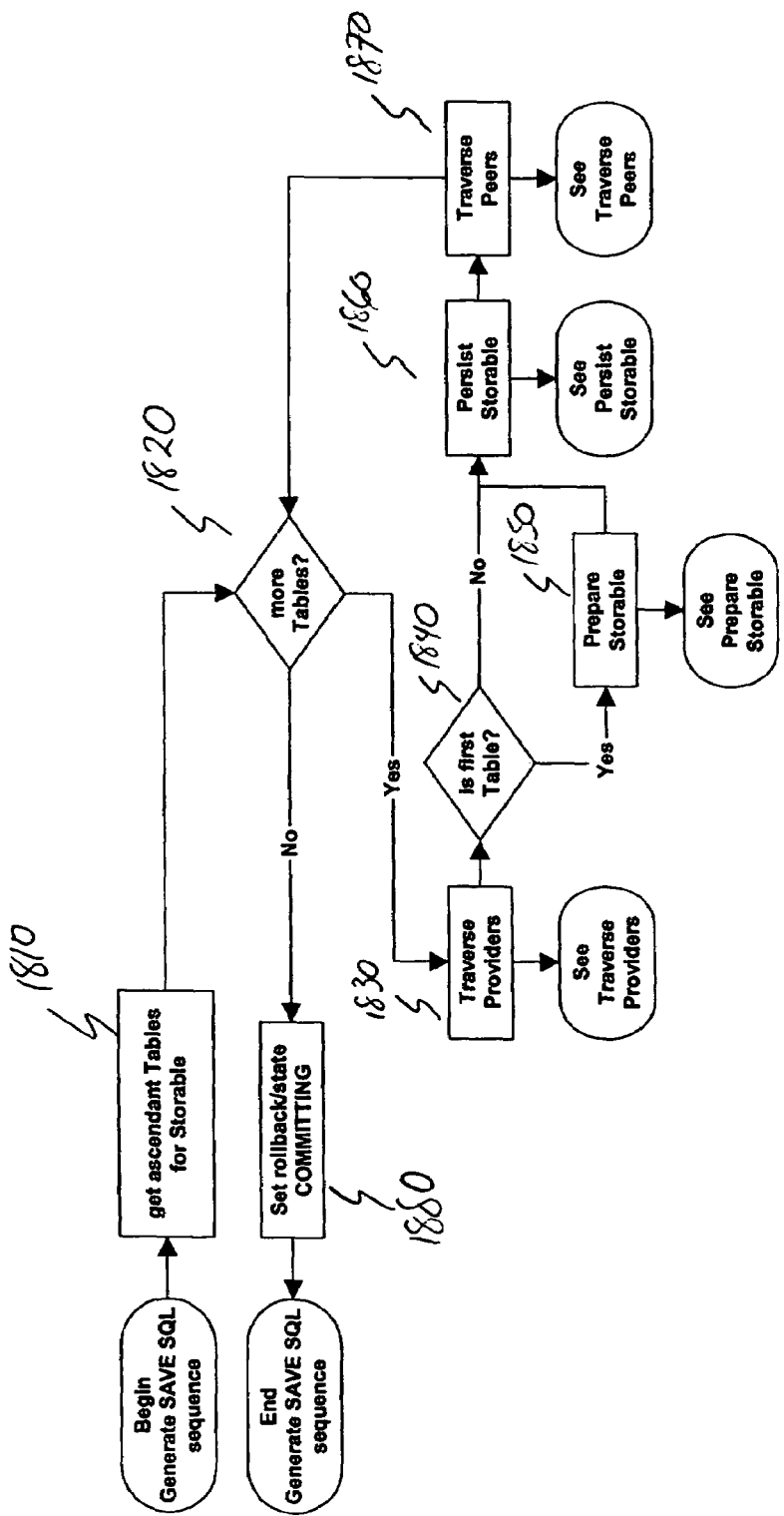
FIG. 18 is a flow diagram illustrating generation of data manipulation language statements to save the state of a storable object according to one embodiment of the present invention.

FIG. 18 is a flow diagram illustrating data manipulation language statement generation of blocks 1720, 1950 and 2245 according to one embodiment of the present invention. In the present example, the save process creates a sequence of SQL statements to save the state of the storable, all relationships between other storables, and the state of other storables, and which aligns with the physical constraints with the database and supporting physical tables and columns.

At block 1810, the process begins by obtaining a set of ascendant tables for the current storable. The current storable is of a certain type, and Schema maps the class type to the table.

The ascendant tables are iterated over. The current table corresponds to the table of a given iteration cycle. At decision block 1820, a determination is made regarding whether more ascendant tables remain to be processed. When all ascendant tables have been processed, processing branches to block 1880 where the rollback state of the current storable is set to COMMITTING.

If one or more ascendant tables remain to be processed, then at block 1830, the provider relationships are traversed. According to one embodiment, a provider has its records manipulated before any dependent records are manipulated to satisfy foreign key constraints. Details regarding provider traversal processing are discussed below with reference to FIG. 19.

At decision block 1840, a determination is made regarding whether the current table is the first table in the ascendant collection. If the current table is the first table in the ascendant collection, then the current storable is prepared at block 1850. After block 1850 and for each subsequent table in the ascendant collection processing continues with block 1860.

At block 1860, the current storable is persisted. Persisting a storable may result in the creation of an INSERT or UPDATE SQL data manipulation language statement, depending on the state of the storable. Details regarding processing relating to persisting a storable are discussed below with reference to FIG. 20. Similar persisting processing statement generation methodologies may be employed for other forms of data manipulation expressions.

At block 1870, peer relationships are traversed. Details regarding processing relating to peer relationship traversal are discussed below with reference to FIG. 22.

Figure 19:
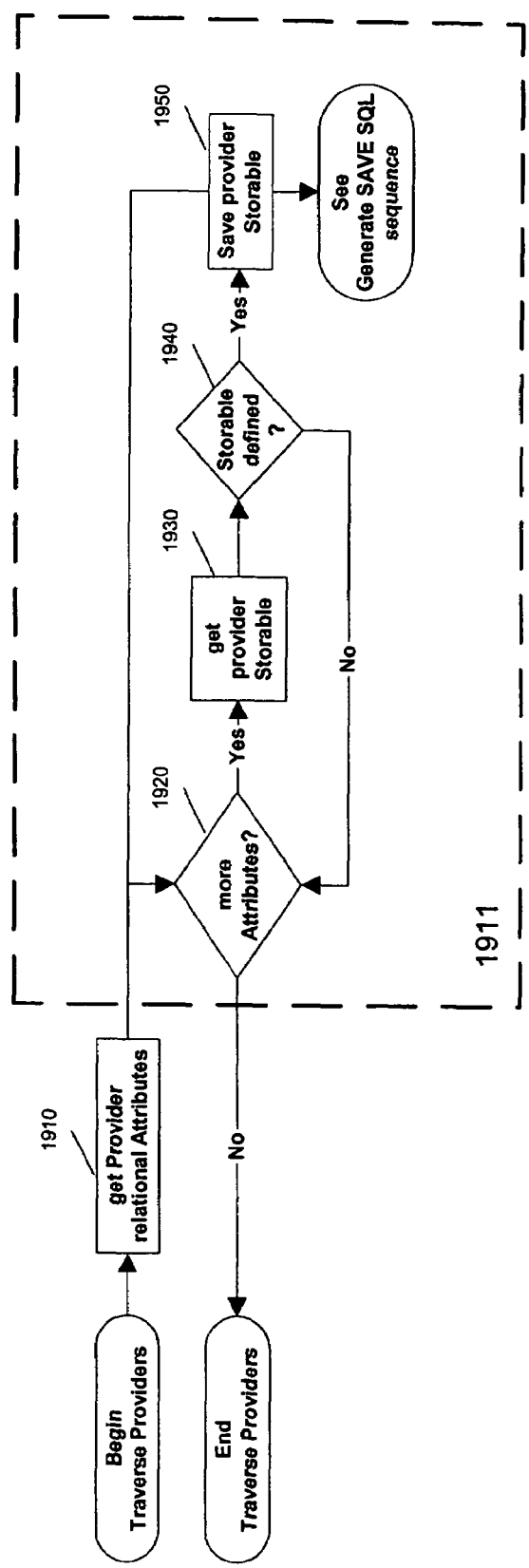
FIG. 19 is a flow diagram illustrating provider traversal processing used in connection with a save algorithm according to one embodiment of the present invention.

FIG. 19 is a flow diagram illustrating provider traversal processing of block 1830 according to one embodiment of the present invention. According to one embodiment, a provider attribute represents or implies one or more records must exist in the database before a dependent record can be inserted. Exemplary provider attributes include Parent, ForeignParent, ForeignChild and Constant.

At block 1910, all provider attributes for the current table are obtained. The attributes are only those that belong to the specific storable class, corresponding to the current table. All provider attributes are then iterated over.

In block 1911, all attributes are iterated over. At decision block 1920, a determination is made regarding whether all attributes have been processed. If one or more provider attributes remain to be processed, then processing continues with block 1930 where, the provider storable for the current storable is obtained. At decision block 1940, a determination is made regarding whether the current storable has a provider storable. If so, the provider storable is saved at block 1950. As above, the current SQL cache is used to collect SQL statements necessary to save the provider storable. If the current storable does not have a provider storable, then processing continues with decision block 1920.

When all attributes have been iterated over, then provider traversal processing is complete.

Figure 20:
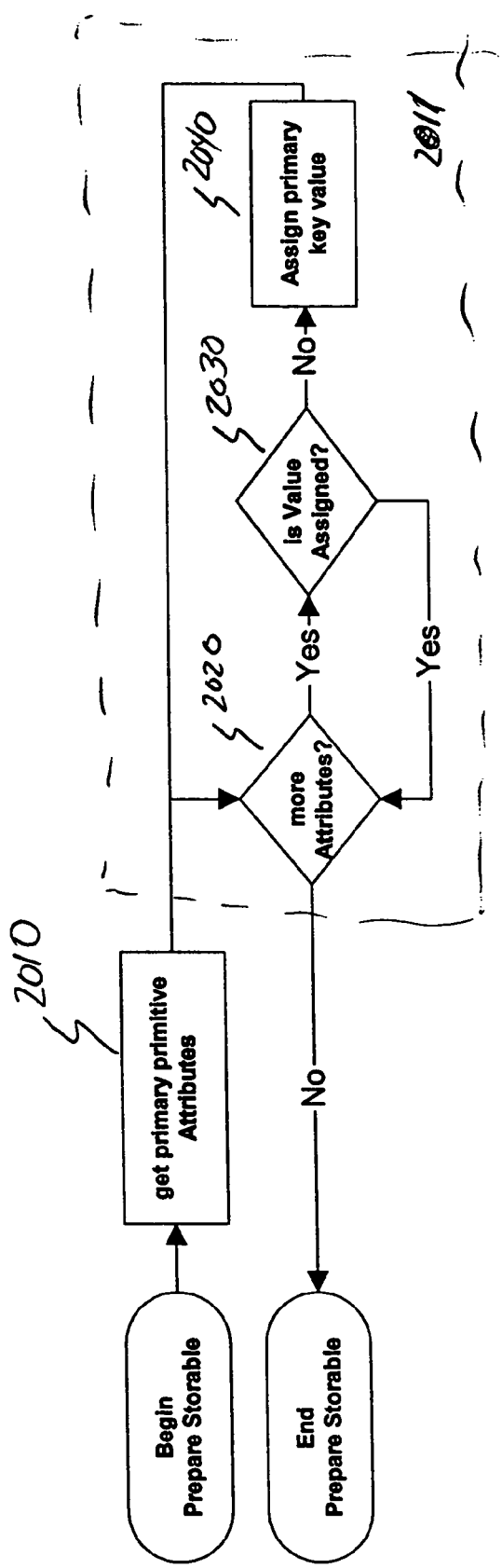
FIG. 20 is a flow diagram illustrating storable preparation processing used to conditionally assign a primary key value during save according to one embodiment of the present invention.

FIG. 20 is a flow diagram illustrating storable preparation processing of block 1850 according to one embodiment of the present invention. In this example, preparing a storable to be saved is a process that verifies all the primitive attributes, that represent primary values, have values assigned. A primitive attribute is specified as a primary using the attribute's AttributeProfile primary setting.

At block 2010, all primitive attributes that represent primary values are obtained. In block 2011, the primary primitive attributes are iterated over.

At decision block 2020, a determination is made regarding whether there are additional attributes to process. If so, it is determined, at decision block 2030, whether a value is assigned to the next attribute. If a value is not assigned to the attribute, then at block 2040 a unique value is obtained and associated with the attribute. According to one embodiment, DBAdmin tracks the next values to be assigned to an attribute that serves as a primary key. Next values are cached in association with PKey storable objects. The PKey storable contains attributes associated with a table, column and a range of values. When DBAdmin assigns all the values from the range of values, the PKey storable's range of values is advanced and the PKey storable is saved. DBAdmin saves PKey storables so that if the application is restarted, DBAdmin initializes its next values from the records associated with PKey and is guaranteed to assign unique values.

Using this technique, the storable's primary values that uniquely identify the storable are guaranteed to be available to the application, immediately after the storable has been saved.

Once the current storable's primary key values have been fully assigned, the SQL necessary to persist the current storable can be generated.

Figure 21:
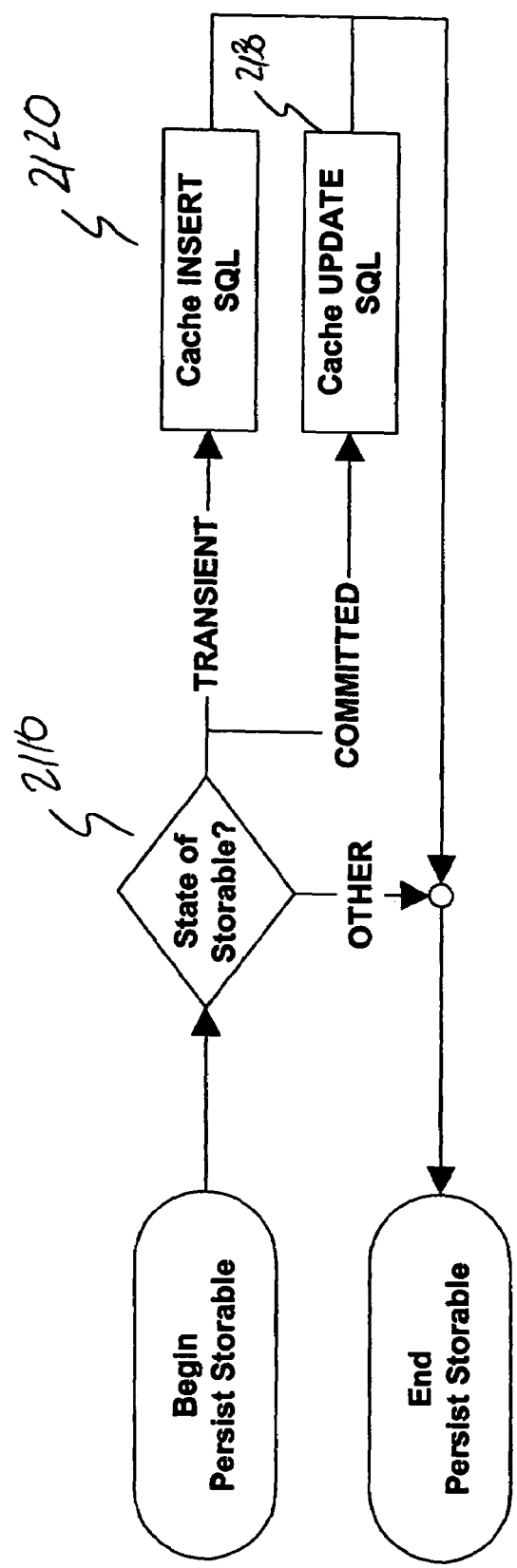
FIG. 21 is a flow diagram illustrating processing associated with persisting a storable according to one embodiment of the present invention.

FIG. 21 is a flow diagram illustrating processing of block 1860 associated with persisting a storable according to one embodiment of the present invention. In the present example, persisting a storable is the process of creating a SQL statement which when executed will store the data values associated with the current storable's attributes into a record belonging to the current table. Only the data values associated with the primitive attributes, belonging to the specific storable class, that corresponds to the current table are included. Primitive attributes that are not associated with data values in the current storable will not influence the formation of the SQL statement.

At decision block 2110, a determination is made regarding the state of the current storable. If the state of the current storable is TRANSIENT, then at block 2120 the data values are stored using an INSERT SQL statement. The INSERT is created and placed into the SQL cache.

If the state of the current storable is COMMITTED, then at block 2130 the data values are stored using an UPDATE SQL statement. The UPDATE is created and placed into the SQL cache.

If the current storable has any state other than TRANSIENT or COMMITTED, no SQL will be generated or cached.

Figure 22:
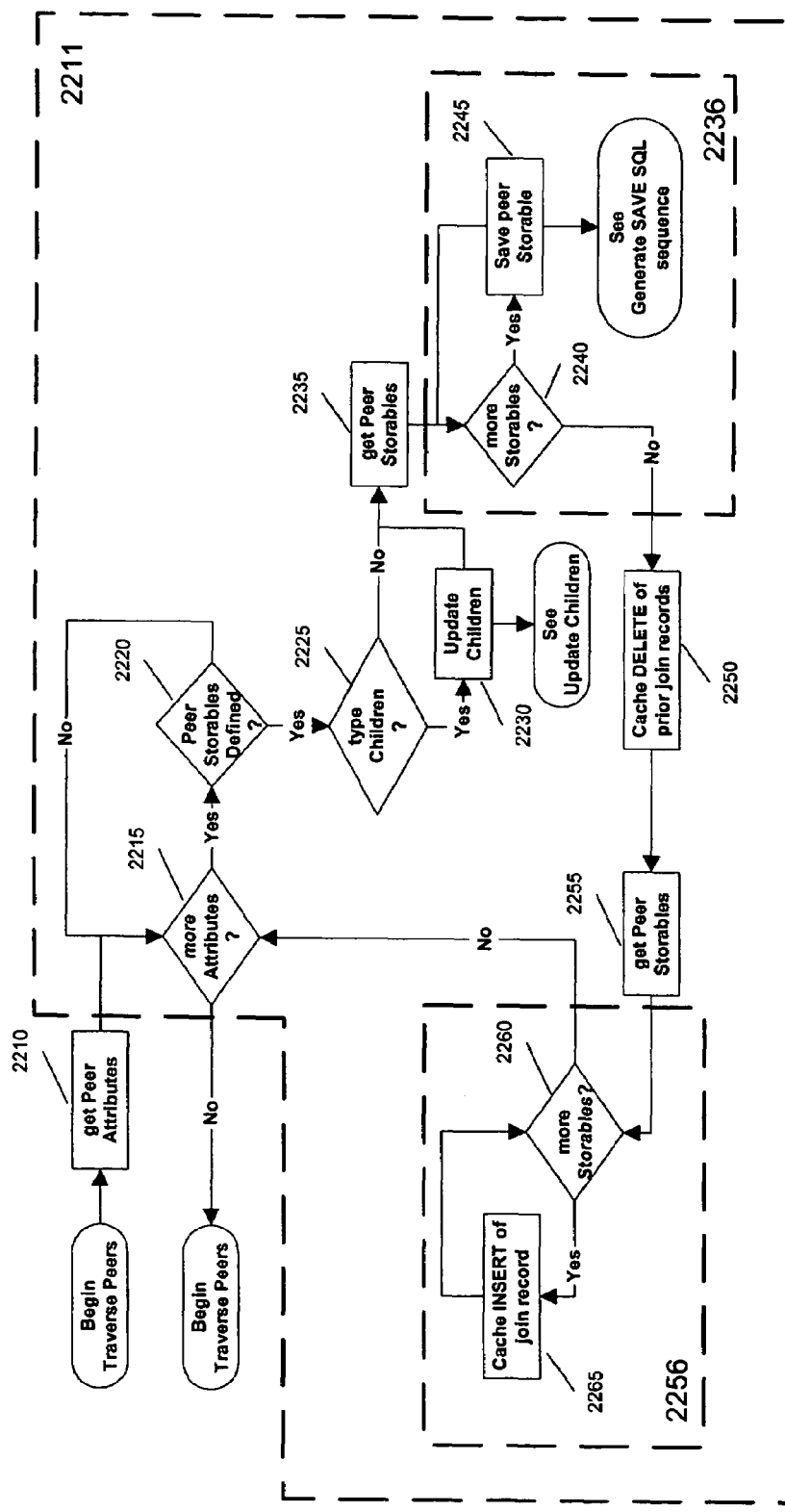
FIG. 22 is a flow diagram illustrating peer traversal processing according to one embodiment of the present invention.

FIG. 22 is a flow diagram illustrating peer traversal processing of blocks 1870 and 2535 according to one embodiment of the present invention. At block 2210, the peer attributes associated with the current table are obtained. In block 2211, the peer attributes associated with the current table are iterated over. The current peer attribute corresponds to the peer attribute of a given iteration cycle.

At decision block 2215, a determination is made regarding whether more attributes remain to be processed. If so, then processing continues with decision block 2220. At decision block 2220, a determination is made regarding whether peer storables are defined. The current peer attribute is skipped if peer storables are not defined, or otherwise specified.

At decision block 2225, a determination is made regarding whether the attribute is of type children. If the attribute is of type children, then the update process for children is performed at block 2230.

At block 2235, the peer storables associated with the current peer attribute are obtained from the current storable. In block 2236, the peer storables obtained are iterated over. The current peer storable corresponds to the peer storable of a given iteration cycle. At decision block 2240, a determination is made regarding whether more peer storables remain to be processed. If so, the current peer storable is saved at block 2245. According to one embodiment, because of foreign key references in the join table, all peer storables are first saved in the database. The current SQL cache is used to collect the SQL necessary to save the current peer storable.

Once the SQL cache includes statements to persist the collection of peer storables, a DELETE is created and added to the cache at block 2250. The DELETE will remove all current existing records from the join table where the columns in the join table, corresponding to the current peer attribute, contain rows corresponding to the current storable's primary data values.

At block 2255, the peer storables associated with the current peer attribute are obtained from the current storable. In block 2256, the peer storables associated with the current peer attribute are iterated over. The current peer storable corresponds to the peer storable of a given iteration cycle.

At decision block 2260, a determination is made regarding whether further peer storables associated with the current peer attribute remain to be processed. If so, at block 2265, an INSERT is created and added to the SQL cache that records in the join table the relationship between the current storable and the current peer storable.

At the end of the peer traversal process, the SQL cache contains statements that will result in the replacement of prior relationships to the current storable with the current specified peer relationships.

Figure 23:
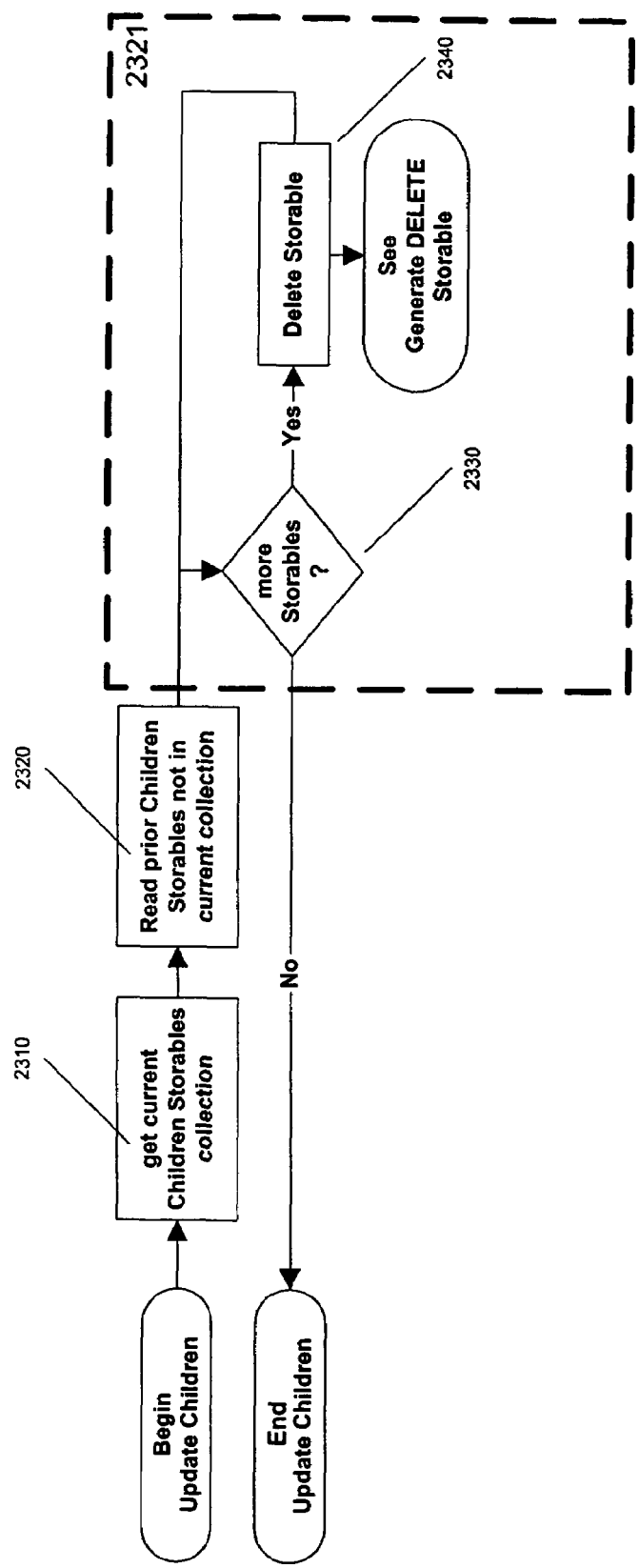
FIG. 23 is a flow diagram illustrating update children processing according to one embodiment of the present invention.

FIG. 23 is a flow diagram illustrating update children processing according to one embodiment of the present invention. According to the present example, the children attribute is a type of peer attribute with unique save semantics. The parent (storable) of storables through a children attribute is not intended to share ownership of the children storables. When a parent storable is saved, any storables that were related to the parent through children attribute that are not part of a current specified collection are deleted.

At block 2310, the current children storables collection is obtained. At block 2320, the children storables that are not part of the current specified collection are read.

In block 2321, each storable read is deleted. At decision block 2330, a determination is made with regard to whether more storables remain to be deleted. If so, at block 2340, the next storable is deleted.

Deleting an Object

Table 5 shows exemplary pseudo code for saving a storable object.

TABLE 5

Deleting a Storable Object

Figure 24:
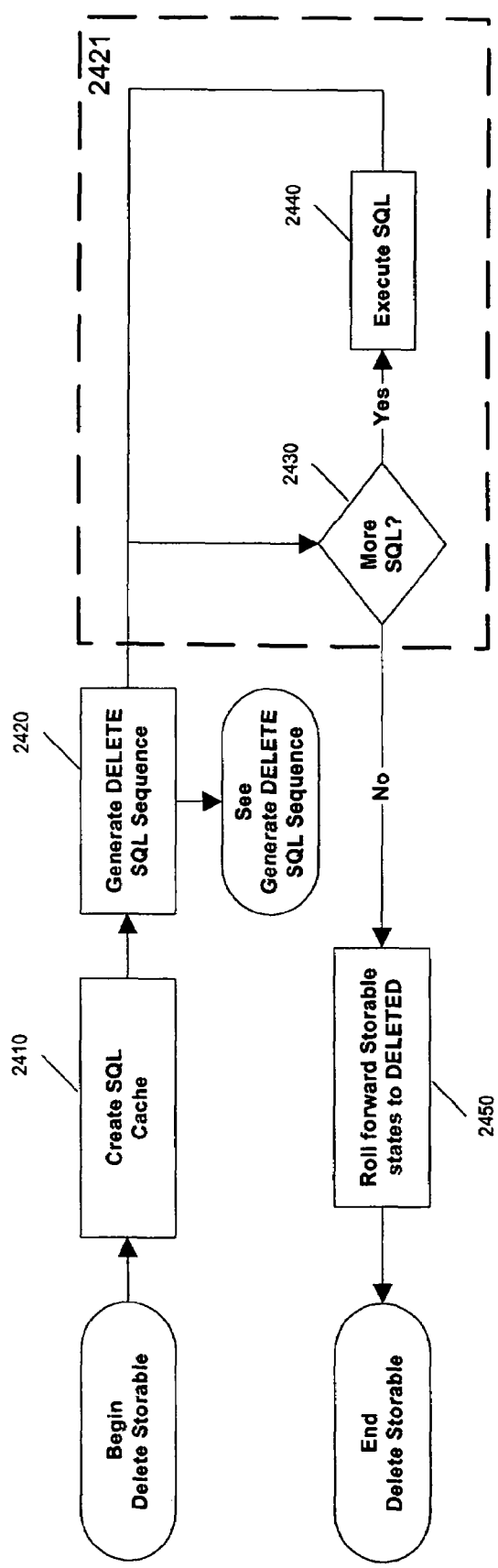
FIG. 24 is a flow diagram illustrating processing associated with deleting an object according to one embodiment of the present invention.

Storable storable = // Some Storable object, ORGANIZATION for example...
Storage dbAdmin = DBAdmin (username, password, url, schema);
dbAdmin.deleteAll ( storable );

FIG. 24 is a flow diagram illustrating processing associated with deleting an object according to one embodiment of the present invention. In the present example, a storable object is deleted by executing a series of SQL statements which taken in their entirety, result in the removal of a specific set of records from the database that reflect the deletion of the storable, and where appropriate, the removal of dependent records (objects) or nullifying foreign key references in accordance with the relational attributes and their AttributeProfiles.

The process begins at block 2410 by creating a SQL cache or FIFO. This cache is used to store SQL statements in the order they were placed into the cache.

At block 2420, the process of generating SQL statements to delete the storable is performed. Details regarding generation of data manipulation language statements to delete a storable object are discussed below with reference to FIG. 25. Similar statement generation methodologies may be employed for other forms of data manipulation expressions.

After block 2420, the cache contains a collection of SQL statements. In block 2421, each SQL statement in the cache is executed in the order the statements were place in the cache. At decision block 2430, a determination is made regarding whether more SQL statements remain to be executed. If so, at block 2440, the next SQL statement form the cache is executed. When execution of all SQL statements from the cache has been completed, processing continues with block 2450 where the rollback state of the current storable is set to DELETED.

Figure 25:
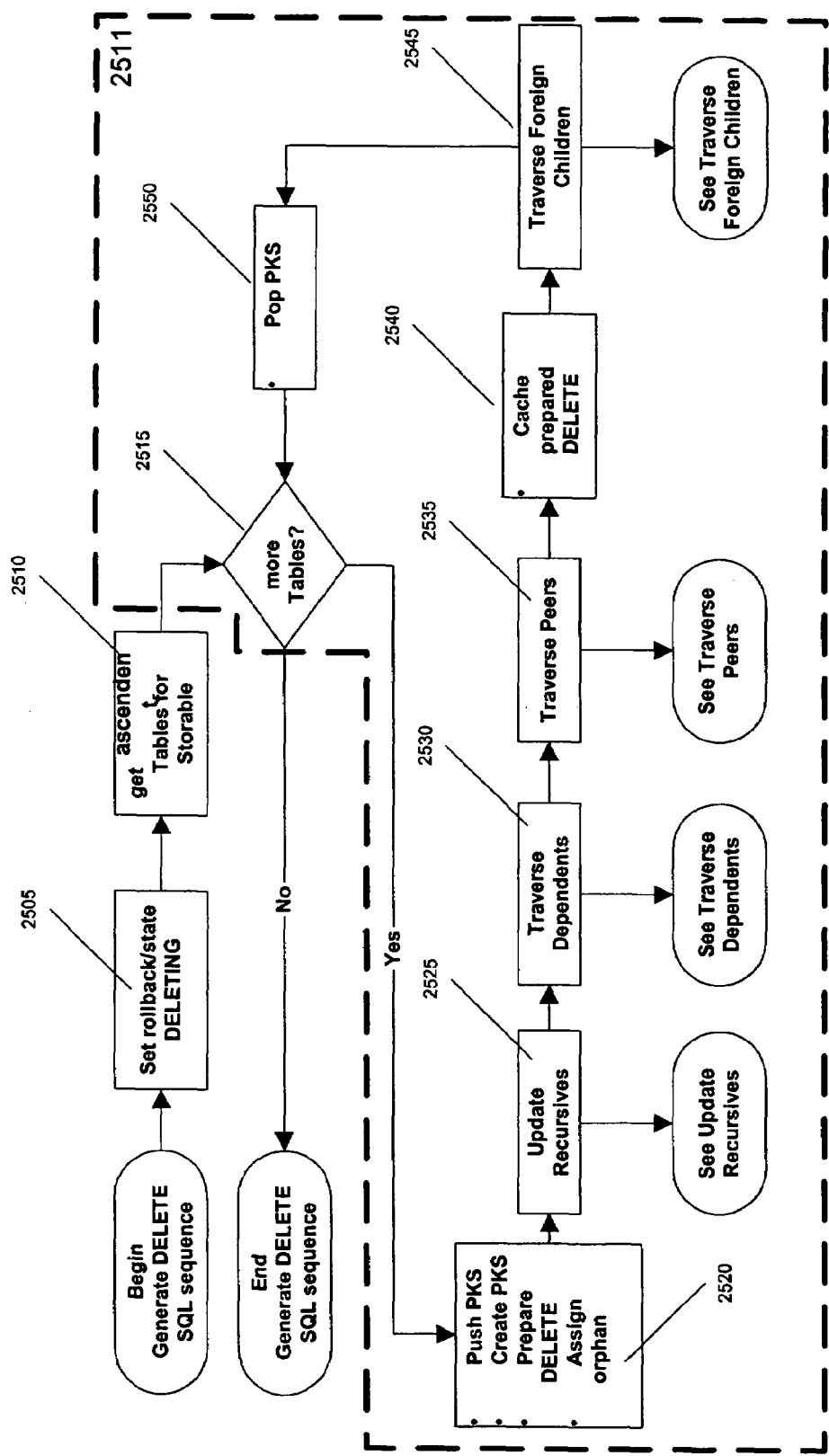
FIG. 25 is a flow diagram illustrating generation of data manipulation language statements to delete a storable object according to one embodiment of the present invention.

FIG. 25 is a flow diagram illustrating blocks 2340, 2670, 2830, and 2950 relating to generation of data manipulation language statements to delete a storable object according to one embodiment of the present invention. At block 2505, the rollback state of the current storable is set to DELETING.

At block 2510, the set of ascendant tables for the current storable is obtained. The storable is of a certain type, and Schema maps the class type to the table.

In block 2511, the ascendant tables are iterated over. The current table corresponds to the table of a given iteration cycle.

At decision block 2515, a determination is made regarding whether there are more tables to process. If so, then at block 2520, the Primary Key Specification (PKS) is pushed onto the PKS Stack, a new PKS is created, the orphan table is assigned, and a DELETE is created and retained for later inclusion in the SQL cache. The DELETE matches the primary keys of the current table to the current PKS.

At block 2525, the RecursiveParent relationships are updated. Details regarding processing associated with updating RecursiveParent relationships are discussed below with reference to FIG. 26.

At block 2530, dependent relationships are updated. These include parent and ForeignParent relationships. Details regarding processing associated with updating dependent relationships are discussed below with reference to FIG. 27.

At block 2535, peer relationships are updated. Details regarding processing relating to peer relationship traversal are discussed above with reference to FIG. 22.

At block 2540, the DELETE that was previously prepared for the current table is placed into the SQL cache.

At block 2545, ForeignChildren relationships are updated. Details regarding processing associated with updating ForeignChildren relationships are discussed below with reference to FIG. 29.

At block 2550, the previous PKS is popped off the PKS Stack and descendant table iteration continues with decision block 2515.

As some databases do not support self-referencing sub-queries, an alternate technique for generating a collection of SQL statements to delete a storable, and its corresponding records is also provided. According to this alternative technique, rather than using a hierarchy of nested SELECT sub-queries to identify affected records, the PKS of this algorithm does not use self-referencing sub-queries and emphasizes the use of primary key values to identify affected records.

According to the alternate technique that emphasizes the use of primary key values to identify affected records, the following processing is substituted for that described above with reference to block 2515. The current Primary Key Specification is pushed onto a PKS Stack and a new PKS is generated that contains a list of primary key values corresponding to the records to be deleted in the current table. If the current table is the super-table, the PKS primary key values are obtained using a SELECT statement based on the data values associated with the storable being deleted. The storable class may consist of multiple levels of inheritance, and the storable being deleted may have data values associated with inherited tables. If so, the SELECT statement that retrieves the primary key values includes terms to bind the data values to their respective columns and tables, and terms to bind the primary columns of a sub-table to the primary columns of the super-table. If the current table is not the super-table, then the new PKS is generated binding the values of the previously saved PKS to the primary columns of the current table. A DELETE statement is created and retained for later inclusion in the SQL cache. When executed, the DELETE statement will remove all records from the current table whose primary key values are included in the PKS.

Figure 26:
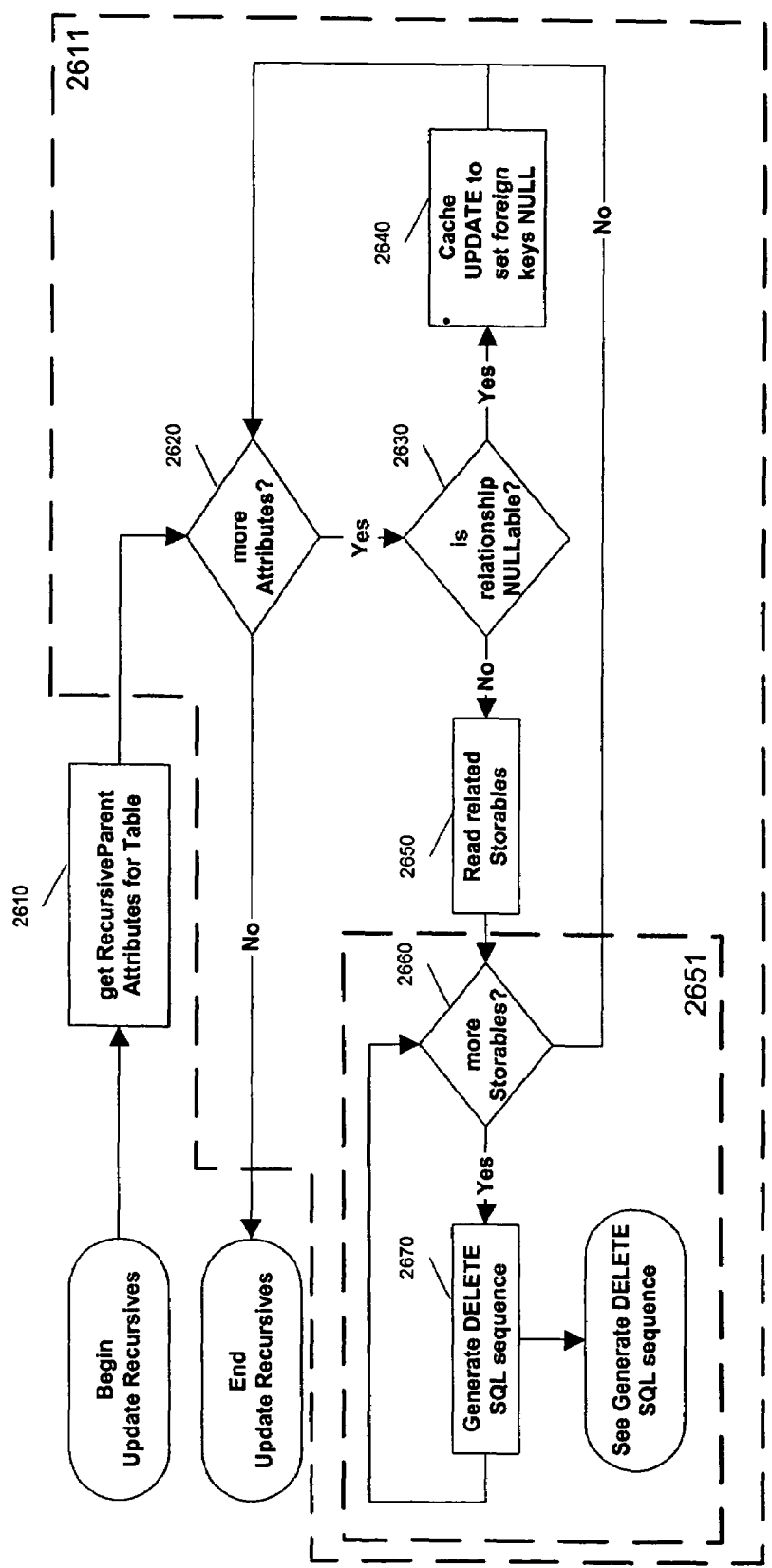
FIG. 26 is a flow diagram illustrating processing associated with updating RecursiveParent relationships during deletion of a storable object according to one embodiment of the present invention.

FIG. 26 is a flow diagram illustrating processing of block 2525 associated with updating RecursiveParent relationships during deletion of a storable object according to one embodiment of the present invention. In the present example, RecursiveParent relationships are updated during the delete process so that if a parent record is deleted, any child records are updated or deleted in accordance with the relationship and AttributeProfile.

At block 2610, all RecursiveParent attributes are obtained for the current table. In block 2611, all obtained Recursive-Parent attributes are iterated over. At decision block 2620, a determination is made regarding whether more attributes remain to be processed. If so, processing continues with decision block 2630.

At decision block 2630, a determination is made regarding whether the attribute allows a null reference. If so, at block 2640, an UPDATE is created and cached that sets the foreign key references in the child records to NULL.

If, however, the attribute does not allow a null reference, then at block 2650 all child storables of the current storable are read.

Figure 27:
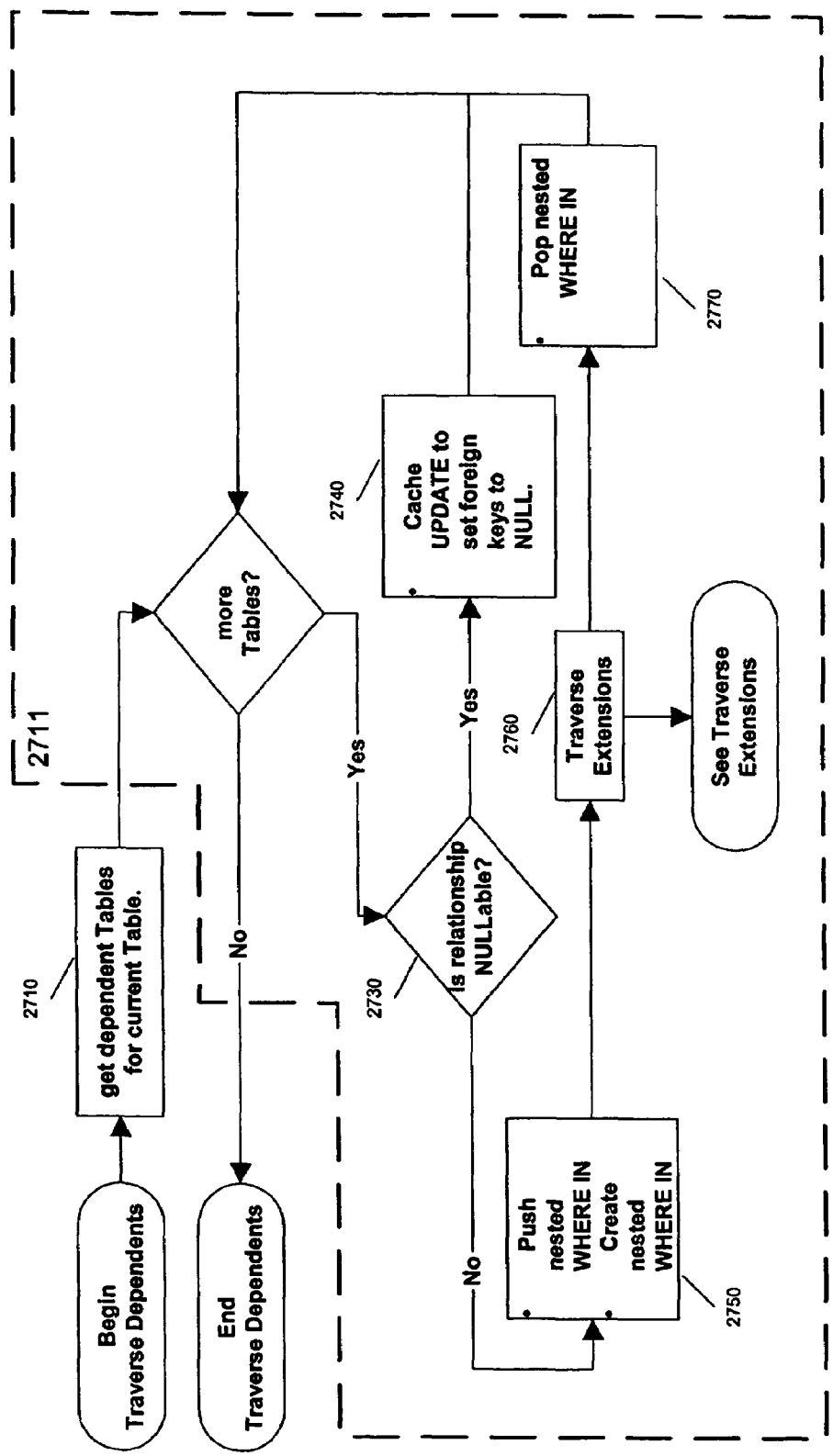
FIG. 27 is a flow diagram illustrating dependent traversal processing according to one embodiment of the present invention.

In block 2651, each child storable read is deleted. The current SQL cache is used to collect the SQL necessary to delete each storable read. At decision block 2660, a determination is made regarding whether more storables remain to be deleted. If so, at block 2670, the SQL statements for deleting the next storable are stored in the current SQL cache. FIG. 27 is a flow diagram illustrating dependent traversal processing of block 2530 according to one embodiment of the present invention. In the present example, records in a dependent table are updated and or deleted in accordance with the type of attribute and AttributeProfile.

At block 2710, the current table's dependent tables are obtained. In block 2711, the dependent relationships obtained are iterated over. At decision block 2720, a determination is made regarding whether more dependent relationships remain to be processed. If so, at decision block 2730, a determination is made regarding whether the AttributeProfile allows a null reference. If so, at block 2740, an UPDATE is created that sets the foreign keys of the dependent records to NULL.

If the AttributeProfile does not allow a null reference, then at block 2750 a nested WHERE IN clause is pushed onto a stack and a new nested WHERE IN clause is created.

The nested WHERE IN clause is an expression where the foreign key columns of the dependent table are in the set of values implied by the current PKS. Note in the context of this step, the PKS is a SELECT sub-query that represents the rows of primary columns from the current (a.k.a. parent or provider) table are affected by the delete operation. Therefore, the nested WHERE IN clause will be used to identify the affected records in the dependent table across the relationship. The nested WHERE IN clause identifies records in all tables that are related to the dependent table through inheritance relationships of the dependent table's associated storable class.

According to the alternate technique that emphasizes the use of primary key values to identify affected records, the following processing is substituted for that described above with reference to block 2750. The PKS for the current table is pushed onto the PKS Stack and a new PKS is created containing primary key values identifying records to be deleted from all tables associated with the dependent relationship. The primary key values for the new PKS are obtained using a SELECT statement containing terms that binds the primary key values of the saved PKS to the foreign columns of the dependent table, and binds the primary columns of all tables in the dependent inheritance hierarchy to the primary columns of their super-table, and returns primary key values from the dependent table's root-table.

At block 2760, the extensions of the dependent table are traversed and updated. Details regarding processing associated with extension traversal are discussed below with reference to FIG. 28.

At block 2770, the nested WHERE IN clause is popped off the stack and dependent table iteration processing continues with decision block 2720. Alternatively, if the primary key value based on the PKS is being used, then the previously saved PKS is popped off the PKS Stack.

Figure 28:
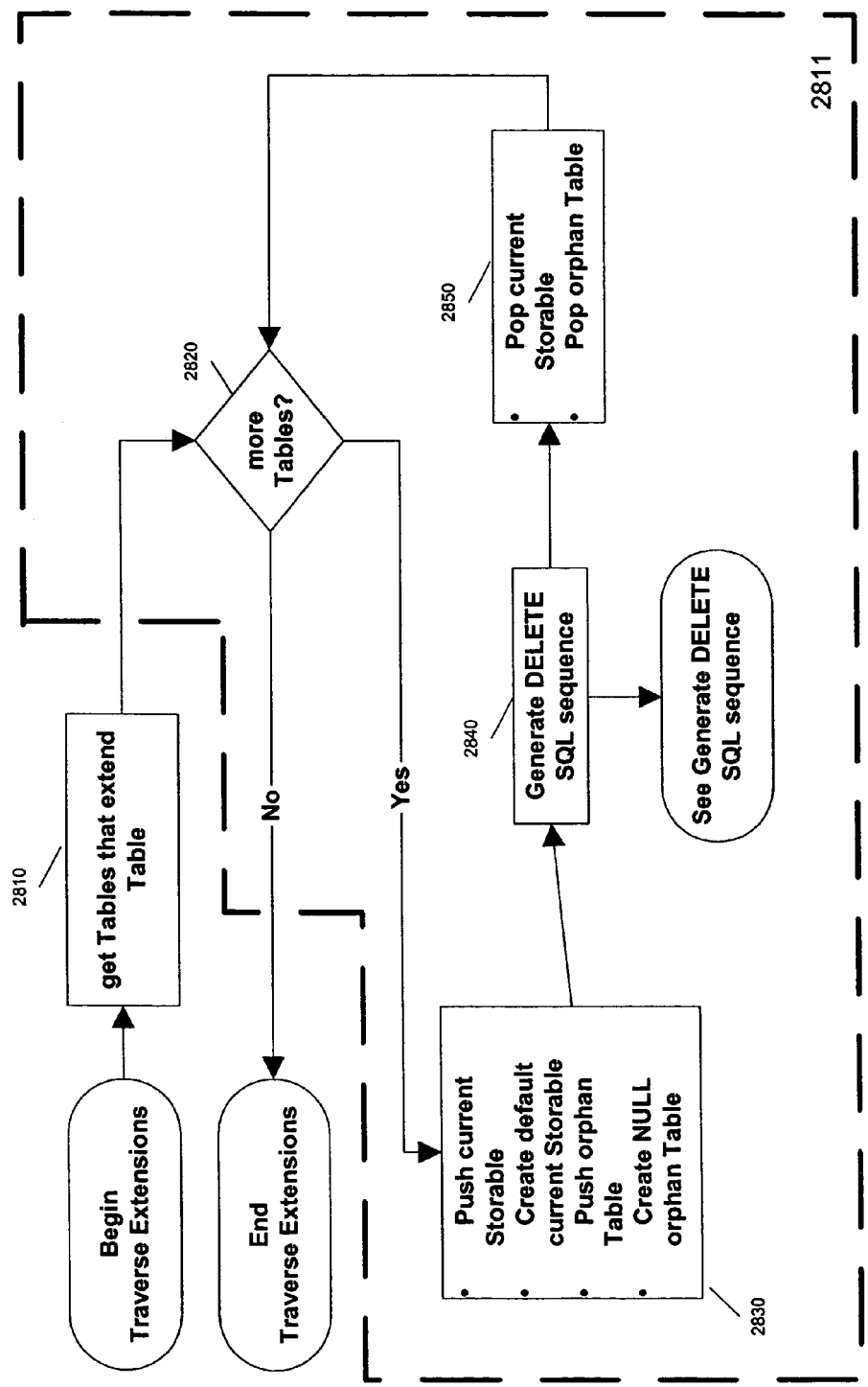
FIG. 28 is a flow diagram illustrating extension traversal processing according to one embodiment of the present invention.

FIG. 28 is a flow diagram illustrating extension traversal processing of block 2760 according to one embodiment of the present invention. In the traverse extensions step, a dependent table is involved in a delete operation that is spanning a dependent relationship. For example, parent and ForeignParent represent dependent relationships. Records in the dependent table are deleted in this process. The dependent table can be related to other tables through inheritance relationships of the dependent table's associated storable class. Other tables related to the dependent table, through inheritance relationships are defined as a table's extensions, or sub-tables. The dependent table is included in the collection of table extensions. If the records of a dependent table that are to be deleted are related to other records in extended tables, then related records in the extended tables are first deleted.

At block 2810, the table extensions for the dependent table are obtained. In block 2811 the table extensions obtained are iterated over. At decision block 2820, a determination is made regarding whether more table extensions remain to be processed. If so, at block 2830, the current storable is pushed onto a stack. Additionally, a new, default, current storable is created from the extended table. The table is aware of its storable class, and using this knowledge, a default storable may be created. The newly created storable has no data values associated with it, other than its class ID. Note that at this step, the nested WHERE IN clause sufficiently identifies affected records in the dependent table, which then will be used to identify records in the extended table.

The current orphan table is pushed onto a stack. The current orphan table is undefined.

At block 2840, the current (default) storable is deleted. The current SQL cache is used to collect the SQL necessary to delete the default storable.

At block 2850, the current storable is popped off the stack. The current orphan table is also popped off the stack. Then, table extension iteration processing continues with decision block 2820.

Alternatively, if the primary key value based on the PKS is being used, then the current table is pushed onto a stack. The table extensions for the dependent table are obtained. The table extensions are iterated over. A determination is made regarding whether more table extensions remain to be processed. If so, the extended table is assigned as current table and delete processing continues at block 2510.

Figure 29:
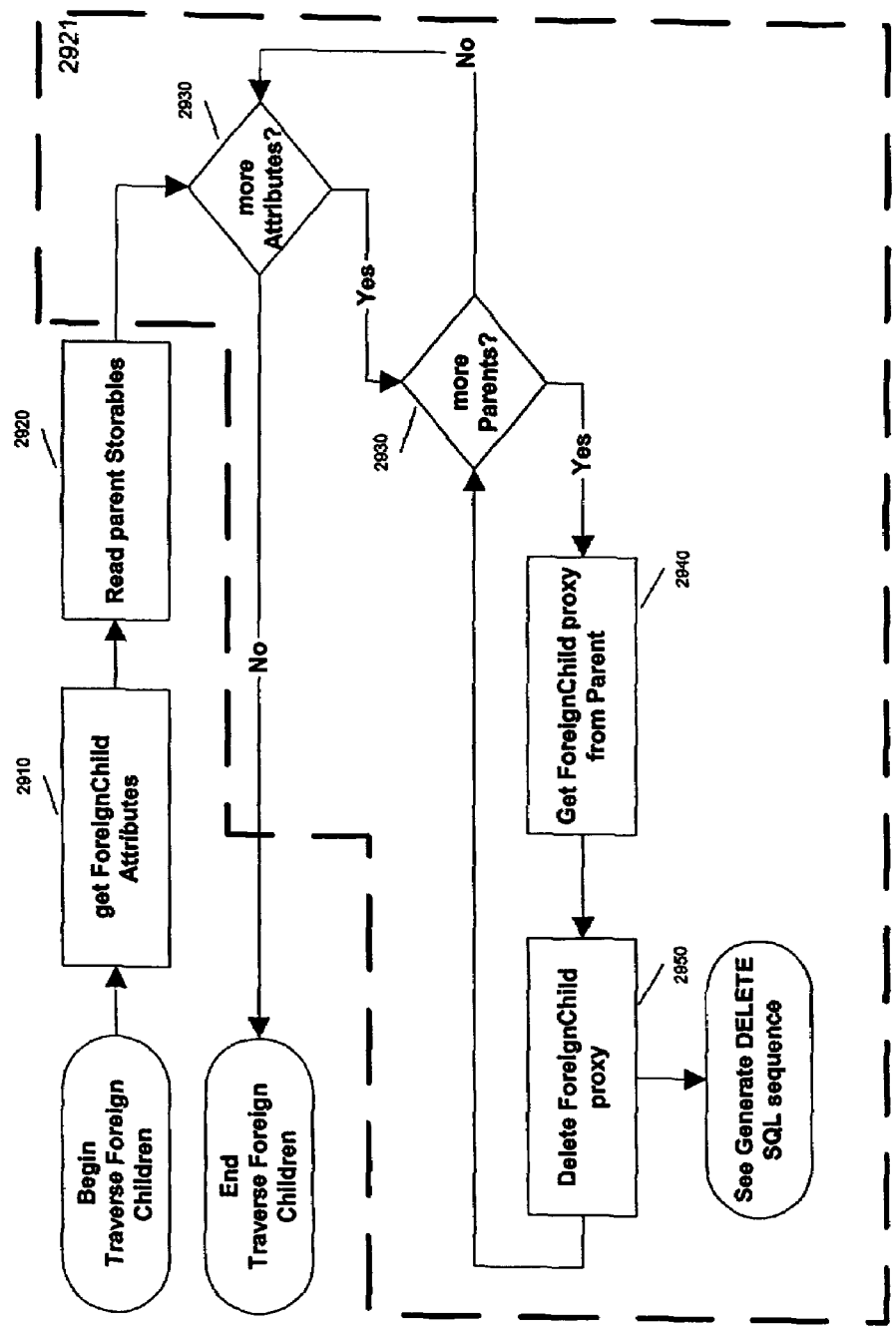
FIG. 29 is a flow diagram illustrating foreign child traversal processing according to one embodiment of the present invention.

FIG. 29 is a flow diagram illustrating foreign child traversal processing of block 2545 according to one embodiment of the present invention. According to the present example, in a ForeignChild relationship, the parent storable semantically owns the child storables, but structurally, in the database, a parent record is dependent on the child record. When a parent record is deleted, the child record is deleted as well. Because the parent record is deleted first, there will be no natural data relationship to identify the child record that is to be deleted. This process is designed to delete the child storables.

At block 2910, ForeignChild attributes are obtained from the current table. At block 2920, all the parent storable records are read using the PKS. The parent storables intrinsically contain all child proxy storables.

In block 2921, The ForeignChild attributes are iterated over. At decision block 2930, a determination is made regarding whether more ForeignChild attributes remain to be processed. If so, for each parent storable, and ForeignChild attribute, the corresponding child storable is deleted. At decision block 2930, a determination is made regarding whether parent storables remain to be processed.

If one or more parent storables remain to be processed, then at block 2940 the ForeignChild proxy is obtained from the next parent. At block 2950, The current SQL cache is used to collect the SQL necessary to delete the ForeignChild proxy storable.

Alternatively, using value-based PKS, ForeignChild attributes are obtained for the current table. All ForeignChild attributes are iterated over. A determination is made regarding whether more ForeignChild attributes remain to be processed. If so, the current PKS is pushed onto the PKS Stack and a new PKS is created containing primary key values identifying records to be deleted from the tables associated with the ForeignChild attribute. The primary key values for the new PKS are obtained using a SELECT statement containing terms that binds the primary key values of the saved PKS to the foreign columns of the ForeignChild table, and binds the primary columns of all tables in the ForeignChild inheritance hierarchy to the primary columns of their super-table, and returns primary key values from the ForeignChild table's root-table. The extensions for the corresponding ForeignChild table are traversed and updated. Using value based PKS, the previously saved PKS is popped off the PKS Stack.

Reading a Storable

Table 6 shows exemplary pseudo code for reading a storable object.

TABLE 6

Reading a Storable Object

Figure 30:
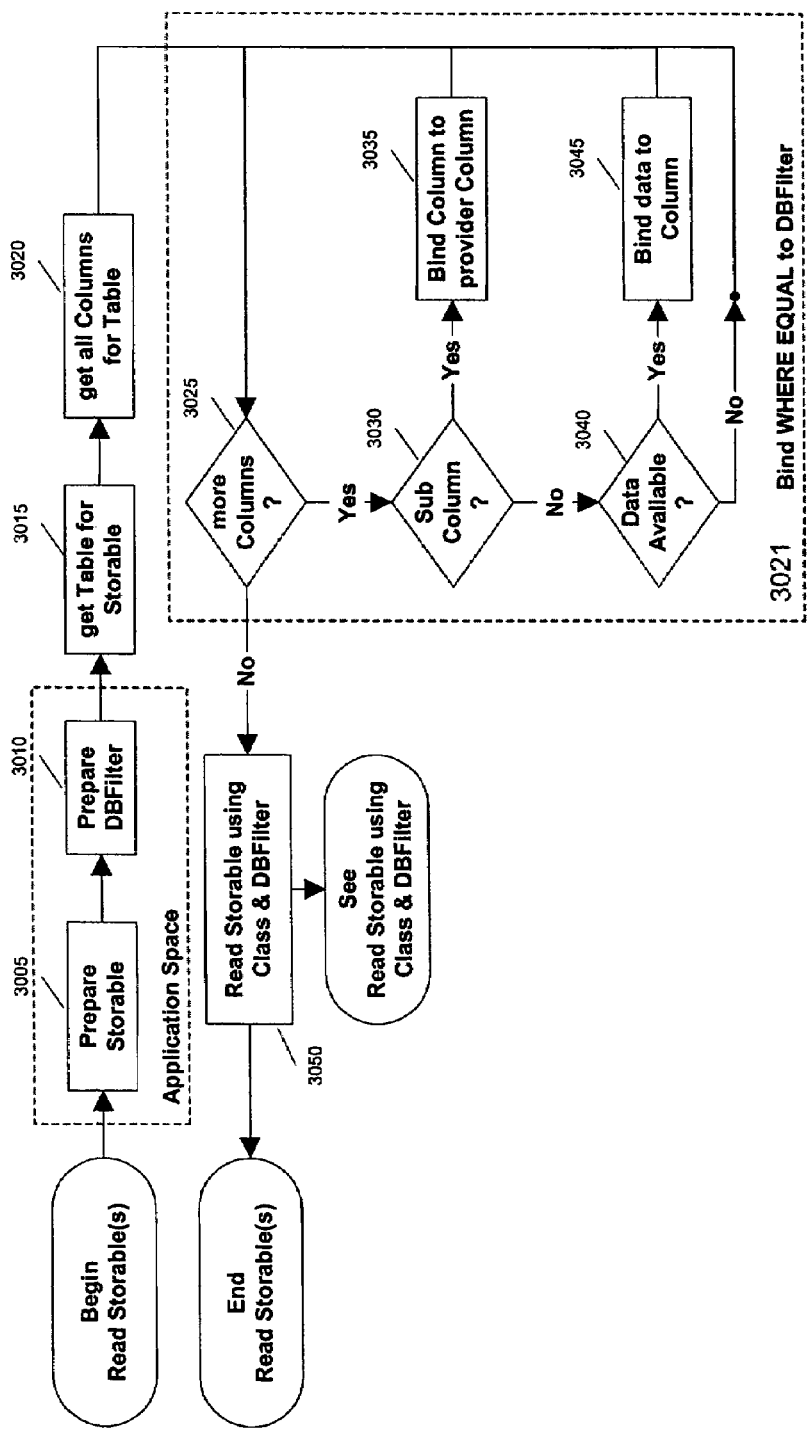
FIG. 30 is a flow diagram illustrating processing associated with reading an object according to one embodiment of the present invention.

Storage dbAdmin = DBAdmin (username, password, url, schema);
Storable storable = // Some Storable object, ORGANIZATION for example...
StorageFilter filter = dbAdmin.getFilter ( );
Storable[] storables = dbAdmin.readAll ( storable, filter );

FIG. 30 is a flow diagram illustrating processing associated with reading an object according to one embodiment of the present invention. According to the present example, reading storable objects from a database is done by creating an instance of a specific type of storable object, called the pattern storable, optionally associating data values with primitive attributes, and optionally creating and preparing a DBFilter. When a storable is read, all columns from the tables associated with the storable are read. Note that for each level of inheritance a specific storable class has, extending from storable, and containing attributes, there is a corresponding table.

Blocks 3005 and 3010 are performed in application space. At block 3005, the pattern storable is prepared. At block 3010, an optional DBFilter is prepared.

At block 3015, the table corresponding to the pattern storable is obtained. At block 3020, all columns are obtained for the table corresponding to the pattern storable. All columns include the columns from the related super-tables.

In block 3021, the columns are iterated over. At decision block 3025, a determination is made regarding whether more columns remain to be processed. If so, processing continues with decision block 3030.

At decision block 3030, it is determined if the column is a sub-column. If the column is a sub-column, having a foreign key reference to its super-column, then at block 3035 a WHERE EQUAL clause is added to the DBFilter that binds the sub-column to the super-column.

At decision block 3040, it is determined if the column corresponds to a primitive attribute and if the pattern storable contains a data value associated with the primitive attribute. If so, then at block 3045 a WHERE EQUAL clause is added to the DBFilter that binds the column corresponding to the primitive attribute to the data value.

Once all columns have been iterated over, at block 3050 the rows are read using the class corresponding to the pattern storable, called the pattern class, and the DBFilter. The result set of the database read operation creates a collection of storables that are returned to the application.

Figure 31:
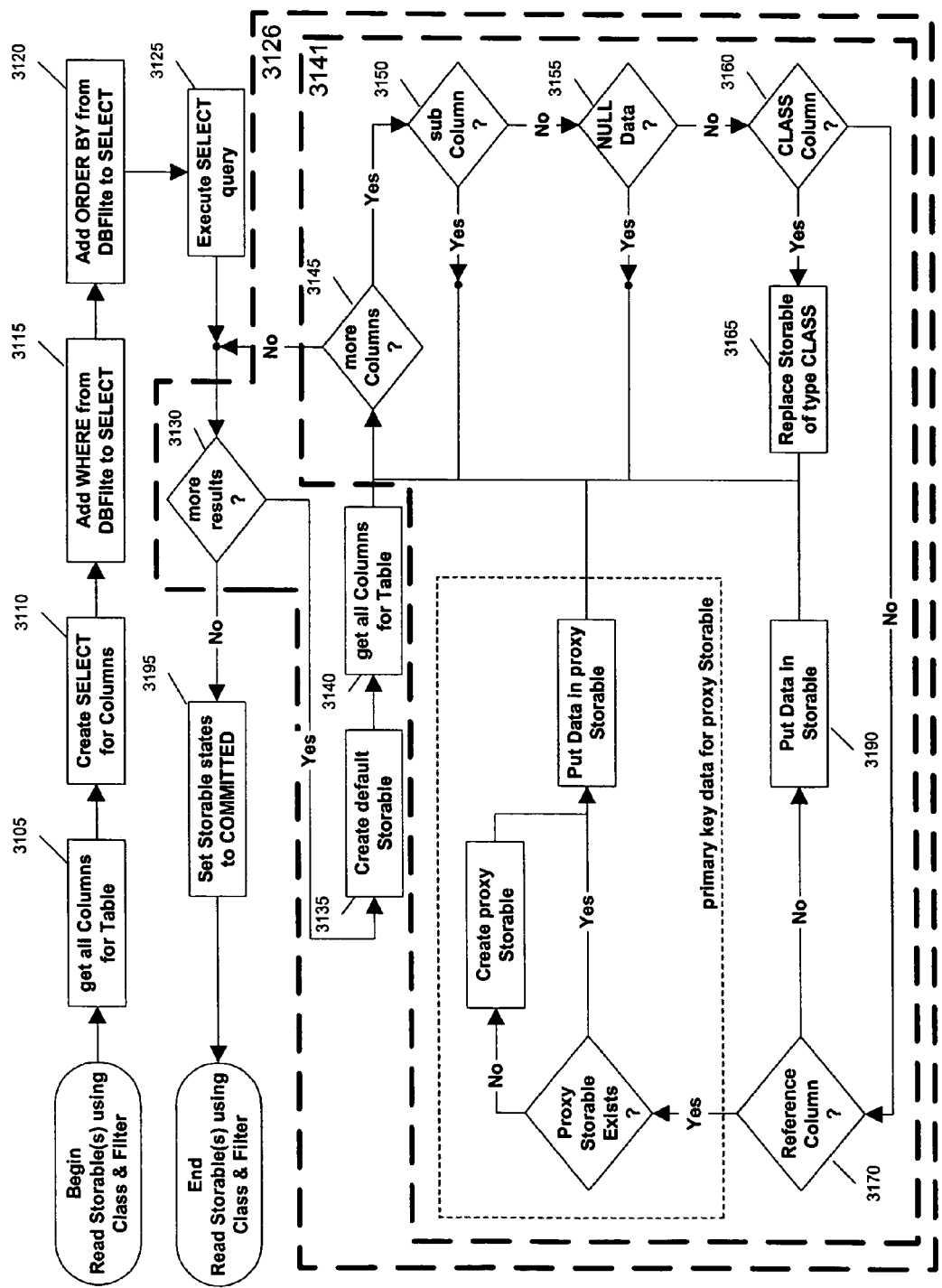
FIG. 31 is a flow diagram illustrating reading of storable object(s) using class and filter according to one embodiment of the present invention.

FIG. 31 is a flow diagram illustrating reading of storable object(s) using class and filter according to one embodiment of the present invention. In the present example, at block 3105, all columns are obtained for the table corresponding to the pattern class. At block 3110, a SELECT is created for all the columns. At block 3115, a WHERE clause is extracted from the DBFilter and added to the SELECT. At block 3120, an ORDER BY clause is extracted from the DBFilter and added to the SELECT.

At block 3125, the SELECT is executed and a result set is obtained. In block 3126, the result set is iterated over. At decision block 3130, a determination is made regarding whether more results remain to be processed. If so, at block 3135, a default storable is created of type corresponding to the pattern class.

At block 3140, all columns are obtained for the table corresponding to the pattern class. In block 3141, the columns obtained for the table corresponding to the pattern class are iterated over. At decision block 3145, a determination is made regarding whether more columns remain to be processed.

If more columns remain to be processed, then at decision block 3150 it is determined whether the column is a sub-column. If so, then there is no data in the result set, and the column is ignored as a sub-column references the same information that is associated with a super-column. The super-column will contain the necessary information.

At decision block 3155, it is determined if the result set for the column is null data. If so, then the column is ignored.

At decision block 3160, it is determined if the column represents the CLASS column. If so, then a new storable is created of a type corresponding to the class associated with the class ID data. The new storable is of the correct type when the original storable was last saved.

At decision block 3170, it is determined if the column is a reference column. If the column is a reference column, then the column references a primary key component of another storable object. At decision block 3175, it is determined if a proxy storable exists. If the current storable contains a storable object associated with the attribute, corresponding to the column then the data value is assigned to the referenced storable object. Note that this referenced storable object is called a proxy because it will contain primary identification data values and will be of the correct type corresponding to the relational attribute, but will not contain full data values, and may not be the correct class type with respect to inheritance. Thus, it is only a proxy.

If a proxy storable does not exist, then at block 3180 a proxy storable is created based on the class type associated with the table that the reference column belongs to. This proxy is then associated with the relational attribute of the current storable.

If the column corresponds to a primitive attribute then at block 3190 the data value or the result set is associated with the primitive attribute of the current storable.

Finally, at block 3195 the rollback state of the storable is set to COMMITTED.

In the foregoing specification, the present invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

At decision block 3170, it is determined if the column is a reference column. If the column is a reference column, then the column references a primary key component of another storable object. At decision block 3175, it is determined if a proxy storable exists. If the current storable contains a storable object associated with the attribute, corresponding to the column then the data value is assigned to the referenced storable object. Note that this referenced storable object is called a proxy because it will contain primary identification data values and will be of the correct type corresponding to the relational attribute, but will not contain full data values, and may not be the correct class type with respect to inheritance. Thus, it is only a proxy.

If a proxy storable does not exist, then at block 3180 a proxy storable is created based on the class type associated with the table that the reference column belongs to. This proxy is then associated with the relational attribute of the current storable.

If the column corresponds to a primitive attribute then at block 3190 the data value or the result set is associated with the primitive attribute of the current storable.

Finally, at block 3195 the rollback state of the storable is set to COMMITTED.

In the foregoing specification, the present invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

APPENDIX

Non-Lentils Technique

```
saveOrganization( ORGANIZATION org )
{
    INSERT INTO [DEMOGRAPHIC] ( [ID], [ADDRESS], [CITY], [ZIPCODE], [PHONE], [EMAIL], [STATE] ) VALUES (1000, '12345
    E. West Dr. #1234', 'Anytown', '80000], '720-123-4567',
    'info@info.com', 1005 )
    String sqlOrgProfile;
    DEMOGRAPHIC profile = org.profile;
    sqlOrgProfile = "INSERT INTO [DEMOGRAPHIC] ( [ID], [ADDRESS], [CITY], [ZIPCODE], [PHONE], [EMAIL], [STATE] )
    VALUES ('';
profile.id = DATABASE_SERVICE.getNextID("DEMOGRAPHIC"); // NOTE: DATABASE_SERVICE assumed to provide essentials.
    sqlOrgProfile += addInteger ( profile.id );
    sqlOrgProfile += appendString ( profile.address ); // NOTE: appendString adds comma and surrounds stick with tick marks.
    sqlOrgProfile += appendString ( profile.city );
```

```
sqlOrgProfile += appendString ( profile.zipcode );
sqlOrgProfile += appendString ( profile.phone );
sqlOrgProfile += appendString ( profile.email );
sqlOrgProfile += appendInteger ( profile.state.id );
sqlOrgProfile += ")";
INSERT INTO [ORGANIZATION] ( [ID], [NAME], [DOMAIN], [PROFILE] ) VALUES ( 1000, Software Company", 'swco', 1000 )
String sqlOrg;
sqlOrg = "INSERT INTO [ORGANIZATION] ( [ID], [NAME], [DOMAIN], [PROFILE] ) VALUES (";
org.id = DATABASE_SERVICE.getNextId ("ORGANIZATION");
sqlOrg += addInteger ( org.id );
sqlOrg += appendString ( org.name );
sqlOrg += appendString ( org.domain );
sqlOrg += appendInteger ( org.profile.id );
sqlOrg += ")";
String sqlPersonProfile[SIZEOFARRAY(org.personnel)];
String sqlPerson[SIZEOFARRAY(org.personnel)];
String sqlAccess[SIZEOFARRAY(org.personnel)];
For ( Integer i=0; i<SIZEOFARRAY(org.personnel); i++)
{
        Person person = org.persons[i];
        INSERT INTO [DEMOGRAPHIC] ( [ID], [ADDRESS], [CITY], [ZIPCODE], [PHONE], [EMAIL], [STATE] ) VALUES ( 1001,
        '12345 E. West Dr. #1234', 'Anytown', '80000', '720-123-4567',
        'info@info.com', 1005 )
        DEMOGRAPHIC profile = person.profile;
        profile.id = DATABASE_SERVICE.getNextID("DEMOGRAPHIC");
        sqlPersonProfile [i] = "INSERT INTO [DEMOGRAPHIC] ( [ID], [ADDRESS], [CITY], [ZIPCODE], [PHONE], [EMAIL],
        [STATE] ) VALUES (";
        sqlPersonProfile [i] += addInteger ( profile.id );
        sqlPersonProfile [i] += appendString ( profile.address );
        sqlPersonProfile [i] += appendString ( profile.city );
        sqlPersonProfile [i] += appendString ( profile.zipcode );
        sqlPersonProfile [i] += appendString ( profile.phone );
        sqlPersonProfile [i] += appendString ( Profile.email );
        sqlPersonProfile [i] += appendInteger ( profile.state.id );
        sqlPersonProfile [i] += ")";
        INSERT INTO [PERSON] ( [ID], [FIRST], [LAST], [PROFILE] ) VALUES ( 1000, 'Bob', 'Smith', 1001 )
        sqlPerson [i] = "INSERT INTO [PERSON] ( [ID], [FIRST], [LAST], [PROFILE] ) VALUES (";
        person.id = DATABASE_SERVICE.getNextID("PERSON");
        sqlPerson [i] += addInteger ( person.id );
        sqlPerson [i] += appendString ( person.first );
        sqlPerson [i] += appendString ( person.last );
        sqlPerson [i] += appendInteger ( person.profile.id );
        sqlPerson [i] += ")";
        INSERT INTO [ACCESS] ( [ID], [USERNAME], [PASSWORD] ) VALUES ( 1000, 'username', 'password' )
        sqlAccess [i] = "INSERT INTO [ACCESS] ( [ID], [USERNAME], [PASSWORD] ) VALUES (";
        USER user = (USER)person; // NOTE: Assumes language allows casting.
        ACCESS access = user.access;
        access.id = DATABASE_SERVICE.getNextID("ACCESS");
        sqlAccess [i] += addInteger (access.id );
        sqlAccess [i] += appendString (access,username );
        sqlAccess [i] += appendString (access.password );
        sqlAccess [i] += ")";
}
String sqlPageGroupPage [SIZEOFARRAY(org.pageGroups)][ ]; // Second dimension of array has dependencies
String sqlOldPageGroupPage [SIZEOFARRAY(org.pageGroups)];
String sqlPageGroup [SIZEOFARRAY(org.pageGroups)];
for ( Integer i=0; i<SIZEOFARRAY(org.pageGroups); i++)
{
        INSERT INTO [PAGEGROUP] ( [ID], [TITLE] ) VALUES ( 1000, 'Installation' )
        sqlPageGroup [i] = "INSERT INTO [PAGEGROUP] ( [ID], [TITLE] ) VALUES (";
        PAGEGROUP pageGroup = org.pageGroups[i];
        pageGroup.id = DATABASE_SERVICE.getNextID("PAGEGROUP");
        sqlPageGroup [i] += addInteger ( pageGroup.id );
        sqlPageGroup [i] += appendString ( pageGroup.title );
        sqlPageGroup [i] += ")";
        DELETE FROM [PAGEGROUP_PAGES] WHERE [PAGEGROUP_PAGES.PAGEGROUP_ID]=1000
        sqlOldPageGroupPage [i] = "DELETE FROM [PAGEGROUP_PAGES] WHERE [PAGEGROUP_PAGES.PAGEGROUP_ID]=";
        sqlOldPageGroupPage [i] += addInteger ( pageGroup.id );
        sqlPageGroupPage [i] = String[SIZEOFARRAY(pageGroup.pages)]; // Sizing second dimension of array
        for ( Integer j=0; j<SIZEOFARRAY(pageGroup.pages); j++ )
        {
        INSERT INTO [PAGEGROUP_PAGES] ( [PAGEGROUP_ID], [PAGEDESC_ID] ) VALUES ( 1000,1005 )
        INSERT INTO [PAGEGROUP_PAGES] ( [PAGEGROUP_ID], [PAGEDESC_ID] ) VALUES ( 1000,1006 )
        INSERT INTO [PAGEGROUP_PAGES] ( [PAGEGROUP_ID], [PAGEDESC_ID] ) VALUES ( 1000,1007 )
        INSERT INTO [PAGEGROUP_PAGES] ( [PAGEGROUP_ID], [PAGEDESC_ID] ) VALUES ( 1000,1008 )
        INSERT INTO [PAGEGROUP_PAGES] ( [PAGEGROUP_ID], [PAGEDESC_ID] ) VALUES ( 1000,1009 )
        INSERT INTO [PAGEGROUP_PAGES] ( [PAGEGROUP_ID], [PAGEDESC_ID] ) VALUES ( 1000,1010 )
        INSERT INTO [PAGEGROUP_PAGES] ( [PAGEGROUP_ID], [PAGEDESC_ID] ) VALUES ( 1000,1011 )
        INSERT INTO [PAGEGROUP_PAGES] ( [PAGEGROUP_ID], [PAGEDESC_ID] ) VALUES ( 1000,1012 )
```

APPENDIX-continued

```
            INSERT INTO [PAGEGROUP_PAGES] ( [PAGEGROUP_ID], [PAGEDESC_ID] ) VALUES ( 1000,1013 )
            INSERT INTO [PAGEGROUP_PAGES] ( [PAGEGROUP_ID], [PAGEDESC_ID] ) VALUES ( 1000,1014 )
            sqlPageGroupPage [i][j] = "INSERT INTO [PAGEGROUP_PAGES] ( [PAGEGROUP_ID], [PAGEDESC_ID] ) VALUES ("
            PAGEDESCRIPTOR page = pageGroup.pages[j];
            sqlPageGroupPage [i][j] += addInteger ( pageGroup.id );
            sqlPageGroupPage [i][j] += appendInteger ( page.id );
            sqlPageGroupPage [i][j] += ")";
        }
}
String sqlOldAccessPageGroup [SIZEOFARRAY(org.person)];
String sqlNewAccessPageGroup [SIZEOFARRAY(org.person)][ ]; // Second dimension of array has dependencies
String sqlUser[SIZEOFARRAY(org.personnel)];
for ( Integer i=0; i<SIZEOFARRAY(org.persons); i++ )
{
    DELETE FROM [ACCESS_PAGEGROUPS] WHERE [ACCESS_PAGEGROUPS.ACCESS_ID]=1000
    USER user = (USER)org.persons[i];
    ACCESS access = user.access;
    sqlOldAccessPage [i] = "DELETE FROM [ACCESS_PAGEGROUPS] WHERE [ACCESS_PAGEGROUPS.ACCESS_ID]=";
    sqlOldAccessPage [i] = addInteger ( access.id );
    for ( Integer j=0; j<SIZEOFARRAY(access.pageGroups); j++ )
    {
        INSERT INTO [ACCESS_PAGEGROUPS] ( [ACCESS_ID], [PAGEGROUP_ID] ) VALUES ( 1000, 1000 )
        sqlNewAccessPage [i][j] = "INSERT INTO [ACCESS_PAGEGROUPS] ( [ACCESS_ID], [PAGEGROUP_ID] ) VALUES (";
        sqlNewAccessPage [i][j] += addInteger ( access.id );
        sqlNewAccessPage [i][j] += appendInteger ( access.pageGroups[j] );
        sqlNewAccessPage [i][j] += ")";
    }
    INSERT INTO [USER] ( [ID], [PASSKEY] ) VALUES ( 1000, 1000 )
    sqlUser [i] = "INSERT INTO [USER] ( [ID], [PASSKEY] ) VALUES (";
    sqlUser [i] += addInteger ( user.id ); // User extends person, and uses person.id.
    sqlUser [i] += appendInteger ( access.id );
    sqlUser [i] += ")";
}
DELETE FROM [ORGANIZATION_PERSONNEL] WHERE [ORGANIZATION_PERSONNEL.ORGANIZATION_ID]=1000
String sqlOldOrgPerson;
sqlOldOrgPerson = "DELETE FROM [ORGANIZATION_PERSONNEL] WHERE [ORGANIZATION_PERSONNEL.ORGAN-
IZATION_ID]=";
sqlOldOrgPerson += addInteger ( org.id );
String sqlNewOrgPerson[SIZEOFARRAY(org.persons)];
for ( Integer i=0; i<SIZEOFARRAY(org.persons); i++ )
{
    INSERT INTO [ORGANIZATION_PERSONNEL] ( [ORGANIZATION_ID], [PERSON_ID] ) VALUES ( 1000, 1000 )
    PERSON person = org.persons[i];
    sqlNewOrgPerson [i] = "INSERT INTO [ORGANIZATION_PERSONNEL] ( [ORGANIZATION_ID], [PERSON_ID] ) VALUES (";
    sqlNewOrgPerson [i] += addInteger ( org.id );
    sqlNewOrgPerson [i] += addInteger ( person.id );
    sqlNewOrgPerson [i] += ")";
}
DELETE FROM [ORGANIZATION_PAGEGROUPS] WHERE [ORGANIZATION_PAGEGROUPS.ORGANIZATION_ID]=1000
String sqlOldOrgPageGroup;
sqlOldOrgPageGroup = "DELETE FROM [ORGANIZATION_PAGEGROUPS] WHERE [ORGANIZATION_PAGEGROUPS.ORGAN-
IZATION_ID]=";
sqlOldOrgPageGroup += addInteger ( org.id );
String sqlNewOrgPageGroup[SIZEOFARRAY(org.pageGroups)];
for ( Integer i=0; i<SIZEOFARRAY(org.pageGroups); i++ )
{
    INSERT INTO [ORGANIZATION_PAGEGROUPS] ( [ORGANIZATION_ID], [PAGEGROUP_ID] ) VALUES ( 1000, 1000 )
    PAGEGROUP pagegroup = org.pageGroups[i];
    sqlNewOrgPageGroup [i] = "INSERT INTO [ORGANIZATION_PAGEGROUPS] ( [ORGANIZATION_ID], PAGE-
    GROUP_ID] ) VALUES (";
    sqlNewOrgPageGroup [i] += addInteger ( org.id );
    sqlNewOrgPageGroup [i] += addInteger ( pageGroup.id );
    sqlNewOrgPageGroup [i] += ")";
}
DATABASE_SERVICES.beginTransaction ( );
DATABASE_SERVICES.executeSQL ( sqlOrgProfile );
DATABASE_SERVICES.executeSQL ( sqlOrg );
for ( integer i=0; i<SIZEOFARRAY(sqlPersonProfile); i++ )
    DATABASE_SERVICES.executeSQL ( sqlPersonProfile[i] );
for ( Integer i=0; i<SIZEOFARRAY(sqlPerson); i++ )
    DATABASE_SERVICES.executeSQL ( sqlPerson[i] );
for ( Integer i=0; i<SIZEOFARRAY(sqlAccess); i++ )
    DATABASE_SERVICES.executeSQL ( sqlAccess[i] );
for ( Integer i=0; i<SIZEOFARRAY(sqlPageGroupPage); i++ )
{
    String sql[ ] = sqlPageGroupPage[i];
    for ( j=0; j<SIZEOFARRAY(sql); j++ )
        DATABASE_SERVICES.executeSQL ( sql[j] );
}
```

APPENDIX-continued

```
for ( Integer i=0; i<SIZEOFARRAY(sqlOldPageGroup); i++ )
        DATABASE_SERVICES.executeSQL ( sqlOldPageGroupPage [i] );
for ( Integer i=0; i<SIZEOFARRAY(sqlPageGroup); i++ )
        DATABASE_SERVICES.executeSQL ( sqlPageGroup [i] );
for ( Integer i=0; i<SIZEOFARRAY(sqlOldAccessPageGroup); i++ )
        DATABASE_SERVICES.executeSQL ( sqlOldAccessPageGroup [i] );
    for ( Integer i=0; i<SIZEOFARRAY(sqlNewAccessPageGroup); i++ )
    {
        String sql[ ] = sqlNewAccessPageGroup [i];
        for ( j=0; j<SIZEOFARRAY(sql); j++ )
            DATABASE_SERVICES.executeSQL ( sql[j] );
    }
for ( Integer i=0; i<SIZEOFARRAY(sqlUser); i++ )
        DATABASE_SERVICES.executeSQL (sqlUser [i] );
    DATABASE_SERVICES.executeSQL ( sqlOldOrgPerson );
for ( Integer i=0; i<SIZEOFARRAY(sqlNewOrgPerson); i++ )
        DATABASE_SERVICES.executeSQL (sqlNewOrgPerson [i] );
    DATABASE_SERVICES.executeSQL ( sqlOldOrgPageGroup );
for ( Integer i=0; i<SIZEOFARRAY(sqlNewOrgPageGroup); i++ )
        DATABASE_SERVICES.executeSQL (sqlNewOrgPageGroup [i] );
    DATABASE_SERVICES.commitTransaction ( );
}
                                                         Lentils Technique
saveOrganization ( ORGANIZATION org )
{
    dbAdmin.save(org);
```

What is claimed is:

1. A method of creating a structure of a data store within a storage system comprising:

automatically and programmatically receiving from a software application by an intelligent framework coupled between a high-level language environment and the storage system (a) information regarding definitions of a plurality of data structures associated with a plurality of objects participating in the software application, and (b) information regarding relationships among the plurality of data structures, each object of the plurality of objects generated as a result of compilation of the software application by a compiler and representing an instance of a data structure of the plurality of data structures, wherein said programmatically receiving includes interrogating the plurality of objects;

based upon the information regarding definitions of the plurality of data structures and the information regarding relationships among the plurality of data structures, programmatically and dynamically generating a data definition expression (DDE) comprising one or more statements to define the structure of the data store inferred by the relationships; and in response to receipt of a request from the software application, the intelligent framework causing the storage system to create the structure of the data store by directing the storage system based on the one or more statements.

2. The method of claim 1, wherein the one or more statements comprise language statements associated with the storage system.

3. The method of claim 1, wherein the information regarding definitions of a plurality of data structures comprises definitions of a plurality of classes that are specified by semantics of a high-level, object-oriented programming language and generated by the compiler.

4. The method of claim 3, wherein the information regarding relationships is implemented as one or more properties of those of the plurality of classes that embody the relationships.

5. The method of claim 3, wherein complex relationships between classes of the plurality of classes are supported, and include one or more of child, parent, peer, children, recursive peer, recursive parent, foreign parent, foreign child, and constant.

6. The method of claim 4, wherein the storage system comprises a relational database management system.

7. The method of claim 2, wherein the language statements comprise Structured Query Language (SQL) data definition language statements.

8. The method of claim 6, wherein within the relational database management system, tables are used to represent the objects participating in the software application.

9. The method of claim 8, wherein each table has a primary key.

10. The method of claim 1, wherein the storage system comprises an extensible markup language (XML) database system.

11. The method of claim 1, wherein the storage system comprises an object-oriented database system.

12. A method of accessing a data store within a storage system comprising:

automatically and programmatically receiving from a software application by an intelligent framework coupled between a high-level language environment and the storage system (a) information regarding definitions of a plurality of data structures associated with a plurality of objects participating in the software application, and (b) information regarding relationships among the plurality of data structures, each object of a plurality of objects generated as a result of compilation of the software application by a compiler and representing an instance of a data structure of the plurality of data structures, wherein said programmatically receiving includes interrogating the plurality of objects;

in response to receipt of a request from the software application to read an object of the plurality of objects from the data store, programmatically and dynamically generating a data query expression (DQE) comprising one or more statements based at least in part upon the object's relationship with one or more other objects of the plurality of objects; and responsive to the request, the intelligent framework causing the storage system to retrieve information associated with the object from the data store by querying the storage system based on the one or more statements.

13. The method of claim 12, wherein the one or more statements comprise language statements associated with the storage system.

14. The method of claim 12, wherein the information regarding definitions of a plurality of data structures comprises definitions of a plurality of classes that are specified by semantics of a high-level, object-oriented programming language and generated by the compiler.

15. The method of claim 14, wherein the information regarding relationships is implemented as one or more properties of those of the plurality of classes that embody the relationships.

16. The method of claim 14, wherein complex relationships between classes of the plurality of classes are supported, and include one or more of child, parent, peer, children, recursive peer, recursive parent, foreign parent, foreign child, and constant.

17. The method of claim 15, wherein the storage system comprises a relational database management system.

18. The method of claim 13, wherein the language statements comprise Structured Query Language (SQL) data query language statements.

19. The method of claim 17, wherein within the relational database management system, tables are used to represent the objects participating in the software application.

20. The method of claim 19, wherein each table has a primary key.

21. The method of claim 12, wherein the storage system comprises an extensible markup language (XML) database system.

22. The method of claim 12, wherein the storage system comprises an object-oriented database system.

23. A method of manipulating a data store within a storage system comprising:

automatically and programmatically receiving from a software application by an intelligent framework coupled between a high-level language environment and the storage system (a) information regarding definitions of a plurality of data structures associated with a plurality of objects participating in the software application, and (b) information regarding relationships among the plurality of data structures, each object of a plurality of objects generated as a result of compilation of the software application by a compiler and representing an instance of a data structure of the plurality of data structures, wherein said programmatically receiving includes interrogating the plurality of objects;

in response to receipt of a request from the software application to manipulate an object of the plurality of objects, programmatically and dynamically generating a data manipulation expression (DME) comprising one or more statements based at least in part upon the object's relationship with one or more other objects of the plurality of objects; and responsive to the request, the intelligent framework causing the storage system to manipulate the data store by directing the storage system based on the one or more statements.

24. The method of claim 23, wherein the one or more statements comprise language statements associated with the storage system.

25. The method of claim 23, wherein the information regarding definitions of a plurality of data structures comprises definitions of a plurality of classes that are specified by semantics of a high-level, object-oriented programming language and generated by the compiler.

26. The method of claim 25, wherein the information regarding relationships is implemented as one or more properties of those of the plurality of classes that embody the relationships.

27. The method of claim 25, wherein complex relationships between classes of the plurality of classes are supported, and include one or more of child, parent, peer, children, recursive peer, recursive parent, foreign parent, foreign child, and constant.

28. The method of claim 26, wherein the storage system comprises a relational database management system.

29. The method of claim 24, wherein the language statements comprise Structured Query Language (SQL) data manipulation language statements.

30. The method of claim 28, wherein within the relational database management system, tables are used to represent the objects participating in the software application.

31. The method of claim 30, wherein each table has a primary key.

32. The method of claim 28, wherein the request to manipulate the object of the plurality of objects comprises one of (i) a request to insert the object into the data store; (ii) a request to update the object in the data store; or (iii) a request to delete the object from the data store.

33. The method of claim 23, wherein the storage system comprises an extensible markup language (XML) database system.

34. The method of claim 23, wherein the storage system comprises an object-oriented database system.

35. A method comprising:

automatically and programmatically receiving by an intelligent framework coupled between a high-level language environment and a relational database management system information regarding definitions of a plurality of classes associated with a plurality of objects participating in a software application, each class of the plurality of classes containing information regarding its relationships with one or more other classes of the plurality of classes, each object of the plurality of objects generated as a result of compilation of the software application by a compiler and representing an instance of a class of the plurality of classes, wherein said programmatically receiving includes interrogating the plurality of objects;

based upon the definitions of the plurality of classes, programmatically and dynamically generating one or more Structured Query Language (SQL) statements associated with the relational database management system, the one or more SQL statements defining the structure of a relational database inferred by the relationships;

causing the storage system to create the structure of the relational database by directing the relational database management system based on the one or more SQL statements;

in response to receipt of a request to read an object of the plurality of objects from the relational database:

programmatically and dynamically generating one or more SQL statements associated with the relational database management system based at least in part upon relationships of the object with one or more other objects of the plurality of objects; and causing the relational database management system to retrieve information associated with the object by querying the relational database management system based on the one or more SQL statements; and in response to receipt of a request to manipulate an object of the plurality of objects:

programmatically and dynamically generating one or more SQL statements associated with the relational database management system based at least in part upon relationships of the object with one or more other objects of the plurality of objects; and causing the relational database management system to manipulate the relational database by directing the relational database management system based on the one or more SQL statements.

36. A method of accessing a database within a relational database management system comprising:

automatically and programmatically receiving by an intelligent framework coupled between a high-level language environment and the relational database management system (a) information regarding definitions of a plurality of classes specified by semantics of a high-level, object-oriented programming language and generated by a compiler that are associated with a plurality of objects participating in a software application, and (b) information regarding relationships among the plurality of classes, wherein said programmatically receiving includes interrogating the plurality of objects;

in response to receipt of a request from the software application to read one or more objects of the plurality of objects from the database, the intelligent framework programmatically and dynamically generating one or more Structured Query Language (SQL) data query language statements based at least in part upon a relationship of an object template associated with the one or more objects with one or more other objects of the plurality of objects and a state of the object template; and the intelligent framework causing the relational database management system to retrieve information associated with the one or more objects by querying the relational database management system based on the one or more SQL data query language statements.

37. The method of claim 1, wherein said interrogating the plurality of objects comprises use of language reflection.

38. The method of claim 12, wherein said interrogating the plurality of objects comprises use of language reflection.

39. The method of claim 23, wherein said interrogating the plurality of objects comprises use of language reflection.

40. The method of claim 35, wherein said interrogating the plurality of objects comprises use of language reflection.

41. The method of claim 36, wherein said interrogating the plurality of objects comprises use of language reflection.

42. An article of manufacture comprising a computer-readable medium having stored thereon instructions, which when executed by one or more processors cause the method of claim 1 to be performed.

43. An article of manufacture comprising a computer-readable medium having stored thereon instructions, which when executed by one or more processors cause the method of claim 12 to be performed.

44. An article of manufacture comprising a computer-readable medium having stored thereon instructions, which when executed by one or more processors cause the method of claim 23 to be performed.

45. An article of manufacture comprising a computer-readable medium having stored thereon instructions, which when executed by one or more processors cause the method of claim 35 to be performed.

\* \* \* \* \*